(12) United States Patent
Newburn

(10) Patent No.: US 10,977,093 B2
(45) Date of Patent: *Apr. 13, 2021

(54) DECLARATIVE PROPERTIES FOR DATA COLLECTIONS

(71) Applicant: Intel Corporation, Santa Clara, CA (US)

(72) Inventor: Chris Newburn, Rockton, IL (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/554,072

(22) Filed: Aug. 28, 2019

(65) Prior Publication Data

US 2019/0384651 A1 Dec. 19, 2019

Related U.S. Application Data

(63) Continuation of application No. 15/068,376, filed on Mar. 11, 2016, now Pat. No. 10,474,510.

(51) Int. Cl.
*G06F 9/54* (2006.01)
*G06F 9/48* (2006.01)

(52) U.S. Cl.
CPC .............. *G06F 9/54* (2013.01); *G06F 9/4881* (2013.01); *G06F 2209/485* (2013.01); *Y02D 10/00* (2018.01)

(58) Field of Classification Search
CPC .................. G06F 9/54; G06F 9/4881
See application file for complete search history.

(56) References Cited

U.S. PATENT DOCUMENTS

| 7,243,355 | B2* | 7/2007 | Espino | G06F 9/548 |
| | | | | 707/999.003 |
| 7,533,368 | B1* | 5/2009 | Ford | G06F 9/542 |
| | | | | 707/999.1 |
| 9,602,329 | B1* | 3/2017 | Stehle | G06F 9/547 |

(Continued)

OTHER PUBLICATIONS

US 10,387,216 B2, 08/2019, Newburn (withdrawn)
(Continued)

*Primary Examiner* — Benjamin C Wu
(74) *Attorney, Agent, or Firm* — Schwegman Lundberg & Woessner, P.A.

(57) ABSTRACT

A system according one exemplary embodiment may receive instructions regarding a callee function that include a description of properties associated with arguments for the callee function, create a persistent representation of the callee function based on the received description of the callee function, receive instructions from a source describing a set of properties for a data collection, create a persistent representation of the data collection based on the set of properties for the data collection, receive an updated property for the data collection, and in response to receiving the updated property for the data collection: update the persistent representation of the callee function by associating the persistent representation of the callee function with the updated property of the data collection and update the persistent representation of the data collection by associating the persistent representation the data collection with the updated property of the data collection.

25 Claims, 15 Drawing Sheets

(56) References Cited

U.S. PATENT DOCUMENTS

| | | |
|---|---|---|
| 9,886,328 B2 | 2/2018 | Newburn |
| 10,437,649 B2 | 10/2019 | Newburn |
| 10,474,510 B2 | 11/2019 | Newburn |
| 10,572,305 B2 | 2/2020 | Newburn |
| 10,684,891 B2 | 6/2020 | Newburn |
| 2006/0093222 A1 | 5/2006 | Saffer et al. |
| 2006/0277391 A1 | 12/2006 | Bittner, Jr. |
| 2007/0011436 A1 | 1/2007 | Bittner, Jr. |
| 2011/0276977 A1 | 11/2011 | Van Velzen et al. |
| 2012/0180030 A1 | 7/2012 | Crutchfield et al. |
| 2012/0233612 A1 | 9/2012 | Beckett |
| 2014/0026111 A1 | 1/2014 | Stitt et al. |
| 2014/0040924 A1* | 2/2014 | Jordahl .................. G06F 9/547 719/330 |
| 2014/0068170 A1 | 3/2014 | Anderson |
| 2015/0295983 A1* | 10/2015 | Hu ........................... G06F 9/54 719/329 |
| 2015/0304634 A1 | 10/2015 | Karvounis |
| 2016/0274810 A1 | 9/2016 | Godard et al. |
| 2017/0004089 A1 | 1/2017 | Clemons et al. |
| 2017/0262174 A1 | 9/2017 | Newburn |
| 2017/0262312 A1 | 9/2017 | Newburn |
| 2017/0262319 A1 | 9/2017 | Newburn |
| 2017/0262320 A1 | 9/2017 | Newburn |
| 2017/0262321 A1 | 9/2017 | Newburn |

OTHER PUBLICATIONS

"U.S. Appl. No. 15/209,492, Examiner Interview Summary dated Jan. 15, 2020", 2 pgs.

"U.S. Appl. No. 15/209,492, Notice of Allowance dated Jan. 29, 2020", 20 pgs.

U.S. Appl. No. 15/068,358, U.S. Pat. No. 10,437,649, filed Mar. 11, 2016, Task Mapping for Heterogeneous Platforms.

U.S. Appl. No. 15/068,369, U.S. Pat. No. 9,886,328, filed Mar. 11, 2016, Flexible Binding of Tasks to Target Resources.

U.S. Appl. No. 15/068,376, U.S. Pat. No. 10,474,510, filed Mar. 11, 2016, Declarative Properties for Data Collections.

U.S. Appl. No. 15/068,390, filed Mar. 11, 2016, Multi-Grained Memory Operands.

U.S. Appl. No. 15/209,492, filed Jul. 13, 2016, Memory Operand Descriptions.

"U.S. Appl. No. 15/068,369, Non Final Office Action dated Jun. 14, 2017", 8 pgs.

"U.S. Appl. No. 15/068,369, Response filed Sep. 13, 2017 to Non Final Office Action dated Jun. 14, 2017", 8 pgs.

"U.S. Appl. No. 15/068,369, Notice of Allowance dated Sep. 21, 2017", 5 pgs.

"U.S. Appl. No. 15/068,369, Corrected Notice of Allowance dated Nov. 9, 2017", 2 pgs.

"U.S. Appl. No. 15/068,376, Non Final Office Action dated Mar. 21, 2019", 5 pgs.

"U.S. Appl. No. 15/068,358, Notice of Allowance dated Apr. 4, 2019", 14 pgs.

"U.S. Appl. No. 15/068,390, Non Final Office Action dated Apr. 30, 2019", 6 pgs.

"U.S. Appl. No. 15/209,492, Non Final Office Action dated Apr. 30, 2019", 31 pgs.

"U.S. Appl. No. 15/068,376, Response filed Jun. 21, 2019 to Non-Final Office Action dated Mar. 21, 2019", 9 pgs.

"U.S. Appl. No. 15/068,376, Notice of Allowance dated Jul. 8, 2019", 10 pgs.

"U.S. Appl. No. 15/068,390. Response filed Jul. 18, 2019 to Non-Final Office Action dated Apr. 30, 2019".

"U.S. Appl. No. 15/209,492, Response filed Jul. 30, 2019 to Non-Final Office Action dated Apr. 30, 2019", 10 pgs.

"U.S. Appl. No. 15/068,358, Corrected Notice of Allowability dated Aug. 29, 2019", 2 pgs.

"U.S. Appl. No. 15/209,492, Final Office Action dated Oct. 8, 2019", 33 pgs.

"U.S. Appl. No. 15/068,390, Notice of Allowance dated Oct. 10, 2019", 7 pgs.

"U.S. Appl. No. 15/209,492, Response filed Dec. 9, 2019 to Final Office Action dated Oct. 8, 2019", 11 pgs.

"U.S. Appl. No. 15/209,492, Advisory Action dated Jan. 2, 2020", 3 pgs.

* cited by examiner

```
void tiled_cholesky(double **A)
{
    int k, m, n;
    for (k = 0; k < T; k++) {
        A[k][k] = DPOTRF(A[k][k]);
        for (m = k+1; m < T; m++) {
            A[m][k] = DTRSM(A[k][k], A[m][k]);
        }
        for (n = k+1; n < T; n++) {
            A[n][n] = DSYRK(A[n][k], A[n][n]);
            for (m = n+1; m < T; m++) {
                A[m][n] = DGEMM(A[m][k], A[n][k], A[m][n]);
            }
        }
    }
}
```

```
void tiled_cholesky(double **A)
{
    int k, m, n;
    for (k = 0; k < T; k++) {
        hStreams_enqueue("DPOTRF", A[k][k], A[k][k], operand_descriptor);

for (m = k+1; m < T; m++) {
            hStreams_enqueue("DTRSM", A[m][k], A[k][k], A[m][k], descr);
        } for (n = k+1; n < T; n++) {
            hStreams_enqueue("DSYRK", A[n][n], A[n][k], A[n][n], descr);
            for (m = n+1; m < T; m++) {
                hStreams_enqueue("DGEMM", A[m][n], A[m][k], A[n][k], A[m][n], descr);
            }
        }
    }
}
```

- Task function is named vs. called
- Either declare as a buffer...
- Or describe it as an operand

FIG. 6

DECLARATIVE PROPERTIES FOR DATA COLLECTIONS

PRIORITY APPLICATION

This application is a continuation of U.S. application Ser. No. 15/068,376, filed Mar. 11, 2016, which is incorporated herein by reference in its entirety.

TECHNICAL FIELD

Embodiments disclosed herein relate generally to the field of parallel processing, and more particularly to managing task concurrency on computer platforms.

BACKGROUND

Each year, computer platforms offer an increasingly-richer set of computing resources for use by software applications. The concurrent execution of multiple instruction threads is known as "parallel processing," which allows software applications to simultaneously use sets of computing resources (such as multiple processors, memories, and software components) to perform various tasks. Managing and optimizing concurrent tasks to take advantage of available computing resources is sometimes referred to as "tuning."

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 6 shows a modified version of the function of FIG. 4 according to various examples.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Among other things, examples in the present disclosure aid in mapping a plurality of concurrent tasks onto a heterogeneous platform of computing resources, namely platforms having a mixture of computing node types, multiple processor cores, and multiple memory devices. The examples of the present disclosure can help even small tasks to utilize large numbers of cores efficiently, can provide in-order semantics in a simple, intuitive and debuggable interface, and can provide tuners and other users with a high level of transparency and control over the distribution of tasks and data among computing resources.

In some examples, examples described herein may provide a runtime process that can fully or partially automate the distribution of data and binding of tasks to computing resources, to help manage the movement of data and synchronization. In some examples, the resources that are used to enqueue tasks may be separable from the resources that execute the tasks. Additionally, some examples may provide dynamic scheduling (where tasks may be enqueued before they are data ready) and provide a runtime system that provides optimized scheduling decisions. Examples in the present disclosure may also provide a dependence system for managing task concurrency that can be integrated into, and operate with, various other concurrency-management systems.

Figure 1:
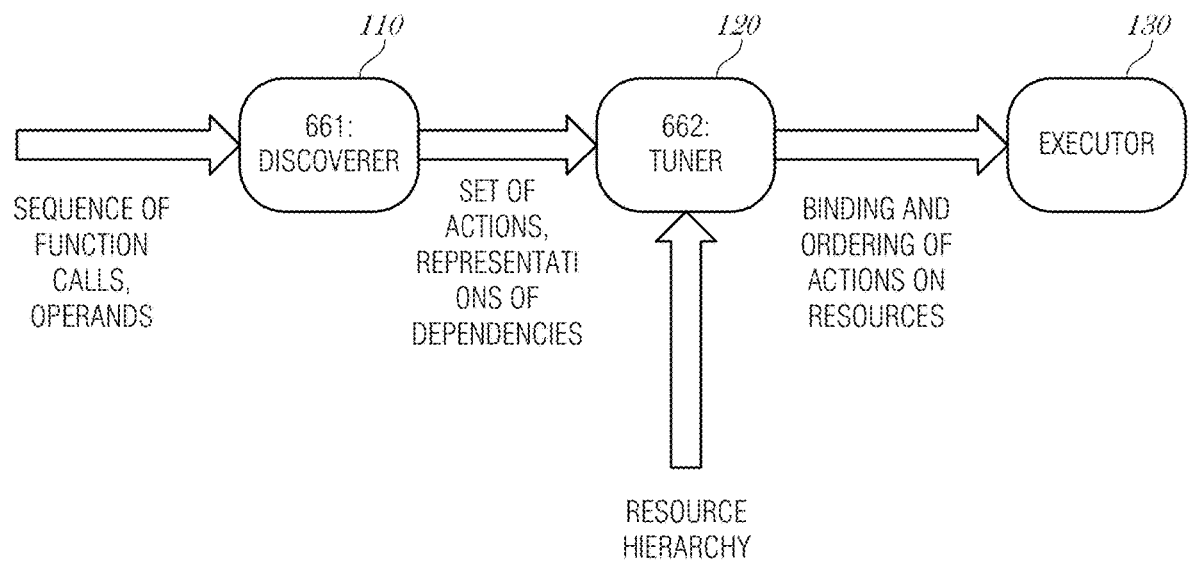
FIG. 1 is a block diagram of a task scheduling system according to various examples.

FIG. 1 is a block diagram showing an overview of an exemplary task-scheduling system according to various aspects of the present disclosure. In this example, a discoverer component 110 receives a sequence of function calls and operands and generates a set of actions and representations of dependencies among such actions, which are in turn passed to a tuner component 120. The tuner component 120 processes the actions and dependencies, based on a provided hierarchy of computing resources, to bind and order the actions among the computing resources. The ordered set of actions is executed by an executor component 130.

Figure 2:
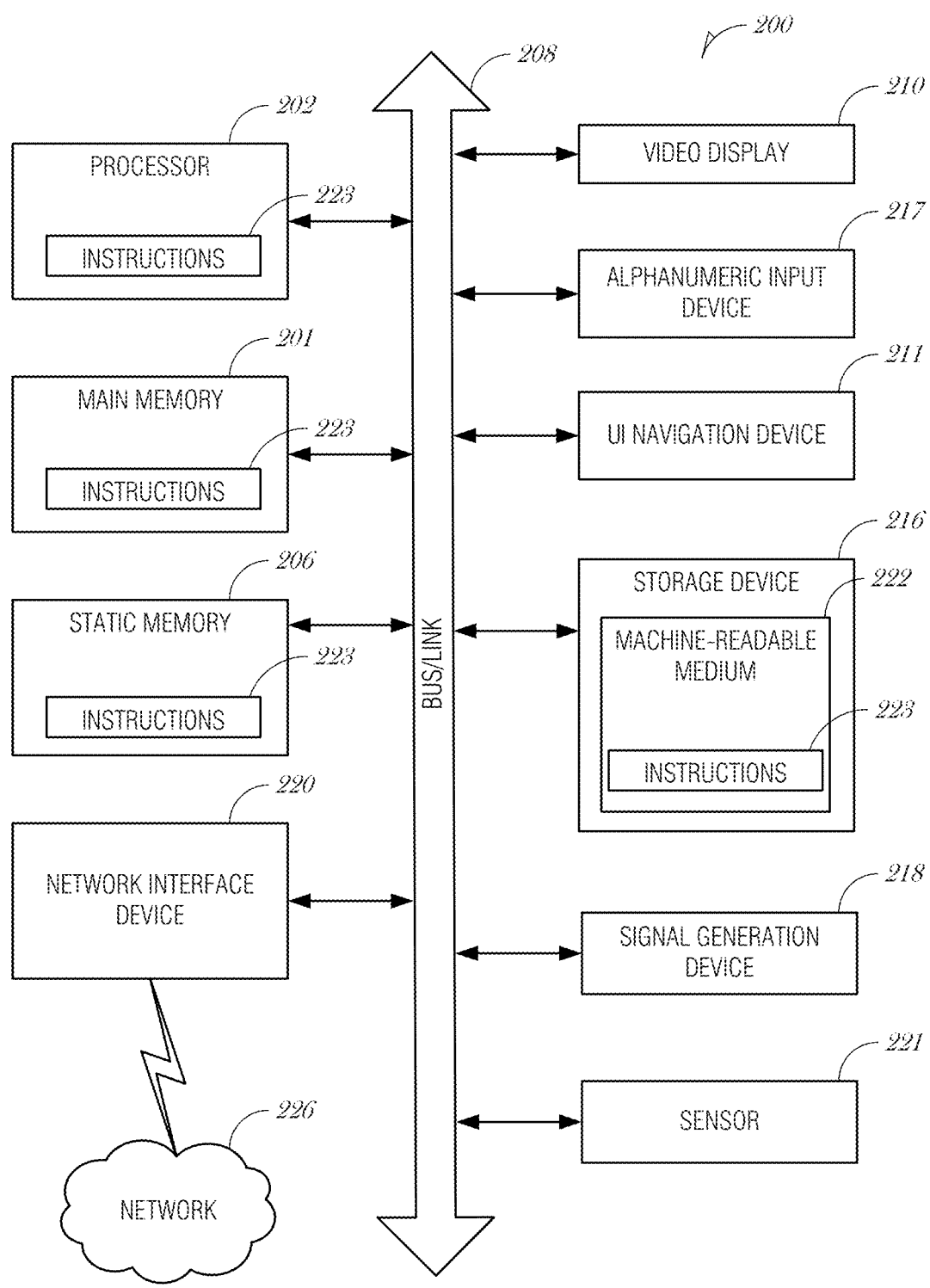
FIG. 2 is a block diagram of an exemplary system which may perform (in whole or in part) any one or more of the methodologies discussed herein.

FIG. 2 is a block diagram illustrating an exemplary system 200 upon which the functionality of any of the processes and methodologies discussed herein may be performed, whether in whole, in part, or in combination with each other. The system 200 may operate as a standalone device or may be connected (e.g., networked) to other machines. In a networked deployment, the system 200 may operate in the capacity of either a server or a client machine in server-client network environments, or it may act as a peer machine in peer-to-peer (or distributed) network environments. The system 200 may be (or include) a personal computer (PC), a tablet PC, a set-top box (STB), a Personal Digital Assistant (PDA), a mobile telephone, a web appliance, a network router, a switch, a bridge, and/or any machine capable of executing instructions (sequential or otherwise) that specify actions to be taken by that machine. Further, while only a single machine is illustrated, the term "machine" or "system" shall also be taken to include any collection of machines or and/or systems that individually or jointly execute a set (or multiple sets) of instructions to perform any one or more of the methodologies discussed herein.

In the example depicted in FIG. 2, computer system 200 includes a processor 202 (e.g., a central processing unit (CPU), a graphics processing unit (GPU) or both), a main memory 201 and a static memory 206, which communicate with each other via a bus 208. The computer system 200 may further include a display unit 210, an alphanumeric input device 217 (e.g., a keyboard), and a user interface (UI) navigation device 211 (e.g., a mouse). In one embodiment, the display unit 210, input device 217 and UI navigation device 211 are a touch screen display. The computer system 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor.

The storage device 216 includes a machine-readable medium 222 on which is stored one or more sets of data structures and instructions 223 (e.g., software) embodying or utilized by any one or more of the methodologies or functions described herein. The instructions 223 may also reside, completely or at least partially, within the main memory 201 and/or within the processor 202 during execution thereof by the computer system 200, with the main memory 201 and the processor 202 also constituting machine-readable media.

While the machine-readable medium 222 is illustrated in an example embodiment to be a single medium, the term "machine-readable medium" may include a single medium or multiple media (e.g., a centralized or distributed database, and/or associated caches and servers) that store the one or more instructions 223. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 223 may further be transmitted or received over a communications network 226 using a transmission medium via the network interface device 220 utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Figure 3:
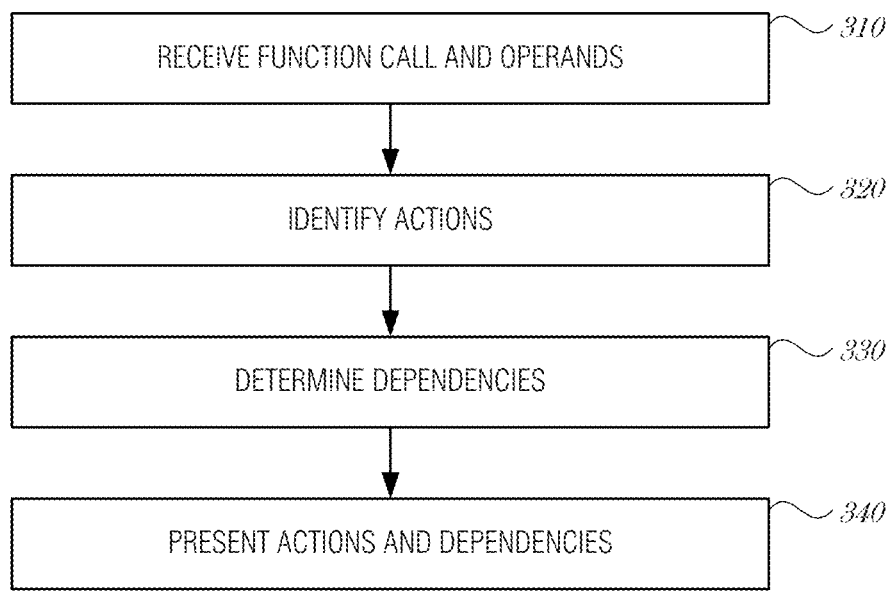
FIG. 3 is a flow diagram of a method according to various examples.

FIG. 3 is a flow diagram of an exemplary method 300 according to various aspects of the present disclosure. The exemplary method in FIG. 3 includes: receiving a function call including a plurality of operands (310), identifying a plurality of actions associated with the function call and operands (320), determining a set of dependencies among the actions for executing the actions on a set of computing resources (330), and presenting the set of actions and determined set of dependencies (340). The steps of method 300 may be performed in any suitable order, in whole or in part, and by any combination of hardware and software components, such as by the discoverer software component 110 in FIG. 1 operating on system 200 depicted in FIG. 2.

Among other things, the method 300 shown in FIG. 3 helps to provide a single, uniform, consistent interface for mapping a plurality of concurrent, tasks onto a heterogeneous platform. This interface may be referred to herein as a "heterogeneous stream," or an "hStream." In one exemplary embodiment, an hStream is represented as a queue with a first-in-first-out (FIFO) semantic. The plurality of actions identified from the function call and operands may in turn include one or more tasks, including computing tasks, data transfer tasks, and/or synchronization tasks. The "source" enqueues all three types of tasks (compute, data transfer, synchronize) into the stream. The "sink" of the stream is bound to a set of computing resources which execute those actions. The actions appear to happen in order, subject to dependences among the operands of the actions, but they may actually execute concurrently and complete out of order. These streams can be bound to individual subsets of resources. There may be many streams in each node, varying from one per hardware thread to a single stream per node. As used herein, the term "resources" or "computing resources" may refer to a hardware resource, a software resource, or combinations thereof.

The mapping of actions to streams can be done manually by tuning experts, automatically by the task scheduling system, or a combination of the two. In some embodiments, programmers may submit actions to a single, high-level interface (which may be referred to herein as "MetaQ") that maps the work to the whole system using a runtime, potentially under user guidance. Among other things, this offers users of the system full flexibility in binding of tasks to underlying subsets of computer resources, data distribution and movement, and synchronization.

Figure 4:
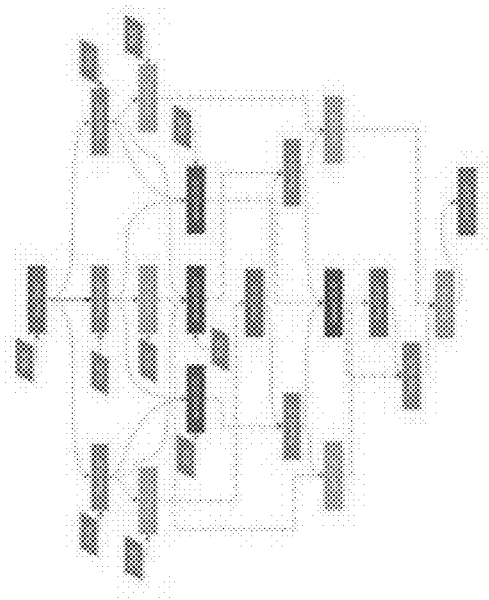
FIG. 4 illustrates an exemplary function with a corresponding task graph.
Figure 5:
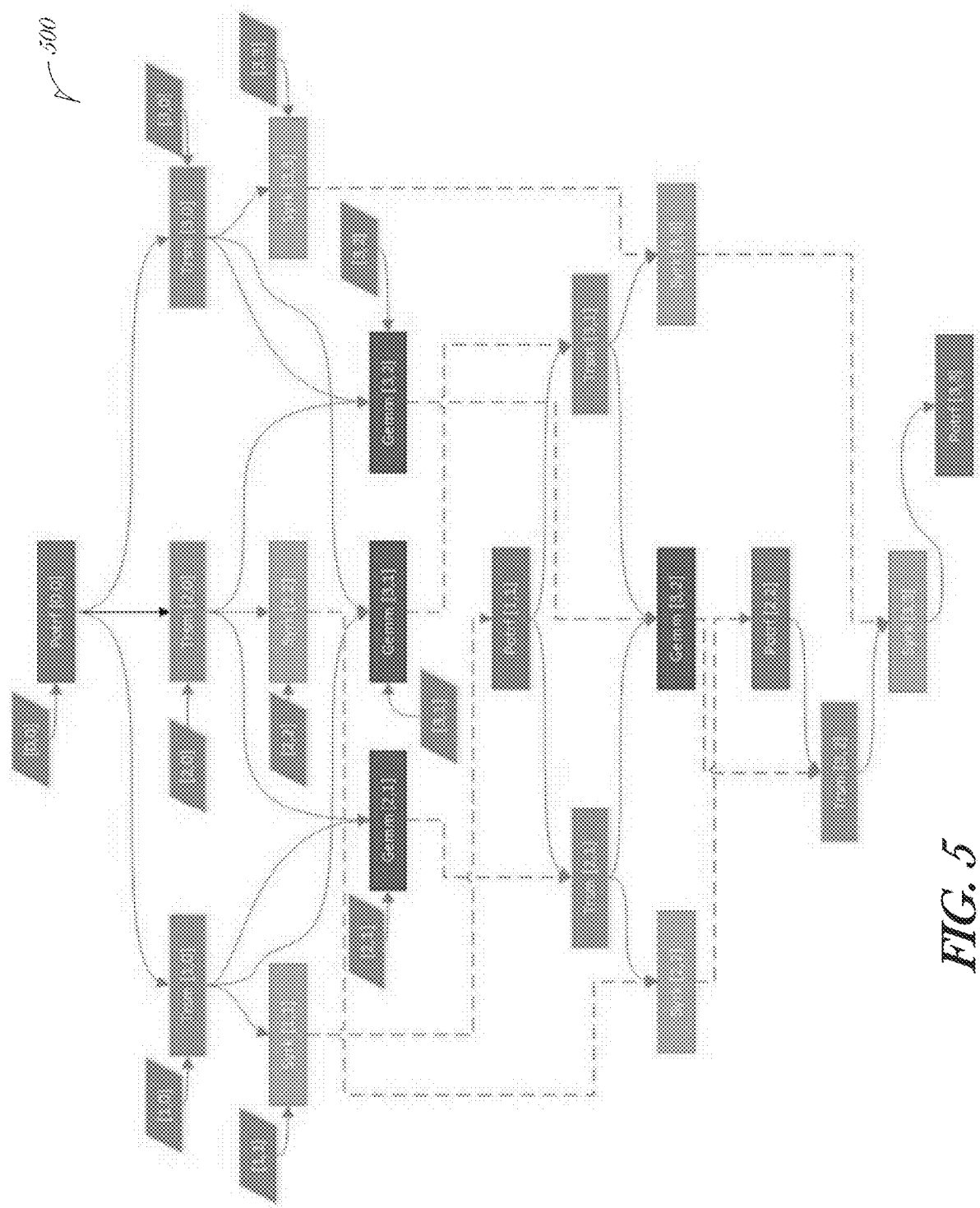
FIG. 5 provides a close-up view of the task graph in FIG. 4.

FIG. 4 illustrates an exemplary function (a "Cholesky factorization" function) with a corresponding task graph to the right. FIG. 5 provides a close-up view of the task graph in FIG. 4. FIG. 6 shows the Cholesky factorization function of FIG. 4 modified with "hstreams_enqueue" functions that describe operands and are received (310), by (for example) the discoverer component 110 in FIG. 1.

Each operand referenced by a function comprises a set of data elements. Dependences may be determined (330) for each operand that are referenced, at its finest granularity of data elements. For example, a data collection comprising a two-by-two matrix ("matrix A") includes four data elements, A.0, A.1, A.2, and A.3. Matrix A may be referenced in its entirety, or it may be referenced by its constituent groupings of data elements, which may be referred to herein as "tiles." Data structures and algorithms for managing data collections are discussed in more detail below.

Embodiments of the present disclosure may utilize vectors that have an element per finest-grained operand for tracking dependences. Dependences may be updated for various actions (compute, data transfer, synchronize) in the order in which they are presented via library calls, and this constitutes a valid execution order. The dependences induced constrain the order of the actions, but any order that maintains those dependence will be valid, thereby enabling out of order execution. In the example shown in FIGS. 4-7, The original math kernel library (MKL) calls in FIG. 4, like DPOTRF, are turned into hStreams_enqueue library application program interface (API) calls (as shown in FIG. 6) that specify the name of the function, its parameters, and an optional description of its operands.

Figure 7:
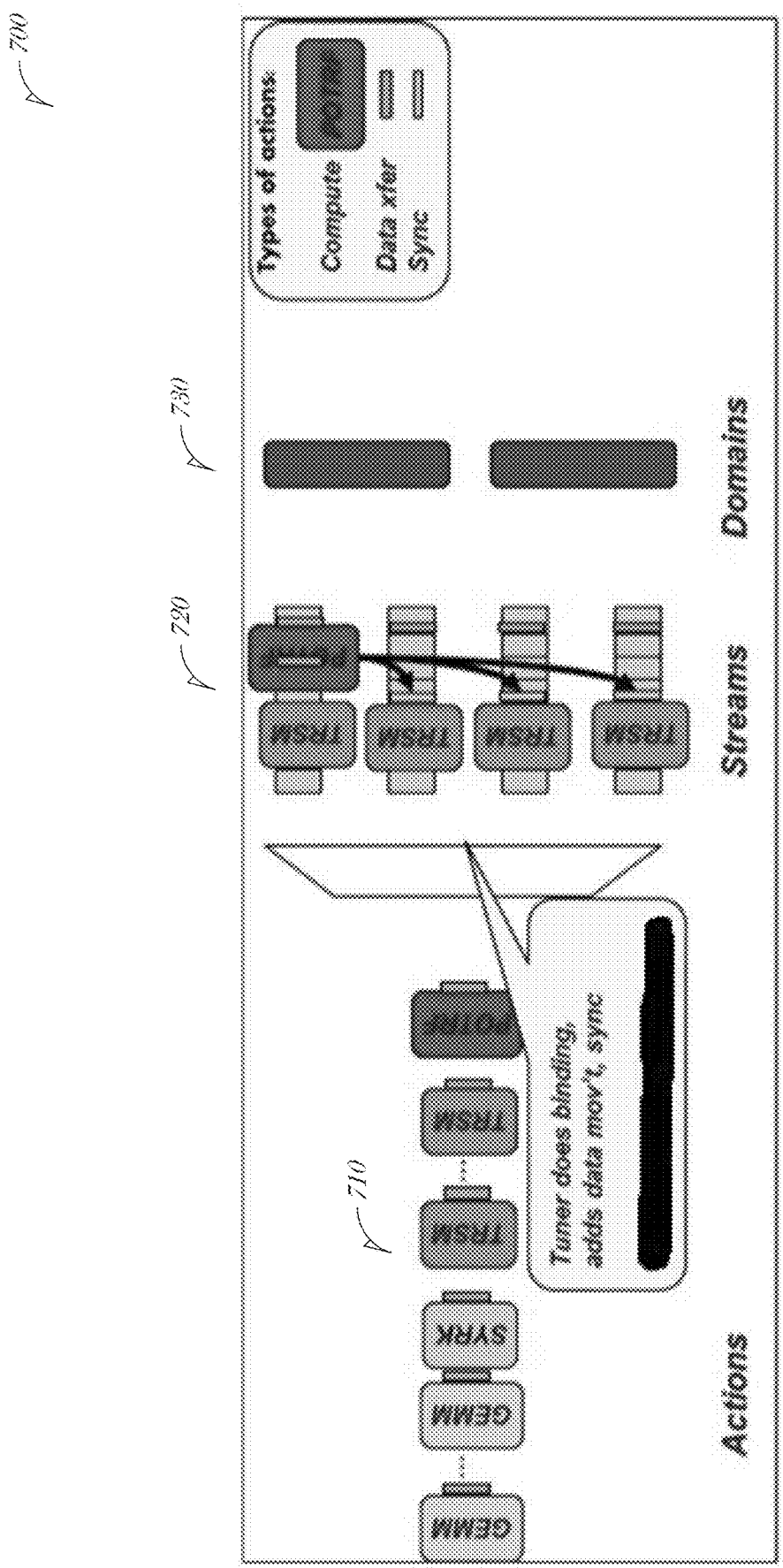
FIG. 7 illustrates tasks being mapped to computing resources according to various examples.

As depicted in FIG. 7, the library calls become visible to the runtime in the right to left order shown on the left 710 (POTRF thru GEMM), and are scheduled onto streams 720 shown in the middle, which are in turn bound to subsets of resources in one or more domains 730, shown at the right.

Determining the set of dependencies may include identifying an operand from the plurality of operands included in a function that is associated with a first action from the plurality of actions and includes a common data element with a second operand from the plurality of operands that is associated with a second action from the plurality of actions. As another example, consider the following sequence of actions:

1. Transfer data for A: x, y;
2. Compute A: z=f(x,y);
3. Transfer data for B: u; and
4. Compute B: w.0=f(u.0,x.0), w.1=f(u.1,x.1).

In this example, the data transfer for B can be done early, during Compute A, which is an out of order execution. Additionally, x is a read-only input for both Compute A and Compute B, and therefore Compute A and Compute B could execute concurrently. If, however, Compute A were to modify x, then Compute B would depend on Compute A, and they could not be executed concurrently.

Determining and managing dependences may be performed based on a variety of different criteria using a variety of different steps. For example, the set of dependencies among the plurality of actions may be determined based on a variable having a global scope within a software application containing the function.

Determination of dependencies may utilize vectors of data elements. For example, consider vectors with elements for each of u,x,y,z. One such vector can track the completion event of the last producer of that operand, another such vector can track the completion event of the last accessor. If only the accessor vector is maintained, the opportunity to overlap actions that only read the operands is lost. So as each action is enqueued, operands are identified, the action is made dependent on the completion events for the last producer or accessor for each operand, and then the vectors are updated with the producers and accessors of that action. In some embodiments (discussed in more detail below), the mapping from operand to vector index can be performed very quickly, thereby increasing the efficiency of the exemplary systems in this disclosure in comparison to conventional systems. Accordingly, presentation of the actions and dependencies (340) may include presenting a dependence vector that includes an action from the plurality of actions that produces one or more of the data elements for an operand from the plurality of operands.

In another example, consider the case where Compute B is performed in a tiled fashion, where variables u,w,x are tiled into parts 0 and 1, that are operated on independently. Upon the first reference to u.0 and u.1 instead of the whole of u, elements in the dependence vectors need to be split. The last producer and accessor for u is copied into the corresponding vector entries for each of u.0 and u.1. Subsequently, an action which updates one portion but not another, e.g. w.0 but not w.1, will have its completion event entered into just w.0's element of the vector, but not the element associated with w.1.

Examples disclosed herein provide a variety of advantageous features compared to conventional systems. For example, some embodiments may allow remote invocation where actions are enqueued at the source, and appear to execute at the sink, but there is significant flexibility in where the actions actually occur. In one specific example, computes may occur on sink-side computation resources, but data transfers could be initiated on direct memory access (DMA) resources owned by either the sink or the source, and any marshalling needed for data transfers could happen at either the source of sink.

Another advantage of the examples disclosed herein is dynamic scheduling at the source or sink. A distinction can be made between actions that are data ready, i.e., they can execute immediately, and those that are not. A ready queue and a wait queue are common abstractions for these cases. Waiting to move actions from the wait queue to the ready queue may enable a simpler and more-efficient FIFO implementation of the ready queue, and multiple ready queues may be used to implement priorities.

In a specific example of dynamic scheduling, consider the case of a stencil, where tasks to compute cells in the middle of the subdomain are always data ready, but tasks to compute cells in the halo may depend on communication with some remote message passing interface (MPI) rank which may be referred to for purposes of this example as "input cells." Furthermore, a subset of the halo cells may produce data needed for other ranks, which may be referred to for purposes of this example as "output cells."

Tasks for cells that are not input cells may be immediately placed on the data ready queue, while tasks for input cells go on the wait queue, and get moved to the ready queue as their input data becomes ready. Tasks for cells in the ready queue which are for output cells are higher priority, since they may be on the critical path for the time step. For stencil problems, users may provide a function that differentiates between cells that are input, output, or neither, thereby allowing the system to place tasks for cells into the wait queue, high-priority ready queue, or low-priority ready queue. Tasks are then chosen from the high-priority ready queue if they are available.

The assessment of data readiness could be made at either the source, (e.g. before putting the work in a FIFO ready queue), or at the sink, in a reorderable queue. Such assessment may be made based a variety of criteria. For example, if the management of the completion of events is all at the source, then the former approach may be selected. If, however, the management of the completion of events is distributed, and can happen at any one of several sinks, then a more distributed system may be more efficient. For example, if both the dependence predecessor and the dependence successor are at the sink, then the communication about the completion of the predecessor need not incur the round-trip delay from the sink back to the source.

Some exemplary implementations may have multiple queues, some of which use source-side scheduling and others which use sink-side scheduling, based on where results are produced from dependence predecessors. Furthermore, the dependence management system can be augmented to track producer-consumer relationships, by, for example, maintaining a list of consumers for each dynamic instance of a completion event. In such cases, when an event completes, it can look up who its consumers are, and ultimately where its consumers are, and can use point-to-point communication to minimize latency and bandwidth overhead for synchronization. Among other things, these features help embodiments of the present disclosure provide efficient system scalability. Trade-offs can then be made about whether to track producers and consumers, whether to use point-to-point communication for event completion, and whether to perform the dynamic scheduling at the source or sink. Furthermore, the produce/consumer information may be used by a scheduler that selects where to perform work so as to minimize completion time, based on model of communication costs.

As described previously, embodiments of the present disclosure may utilize an interface (such as the "MetaQ" referenced above) that maps the work to the whole system using a runtime. Embodiments of the present disclosure may perform a variety of operations on actions that are pending in the MetaQ. For example, consider the difference between the time that actions are enqueued and when they are executed as "the event horizon." If the event horizon is large, there may be many actions that are pending, but not yet executing, and there may be more opportunity for optimization.

One possible optimization includes decomposition, where a large task may be decomposed into smaller tasks to increase concurrency. Decomposition may be most appropriate for operations like matrix multiply, Cholesky factorization, and lower-upper (LU) decomposition. Another possible optimization is aggregation, where a plurality of tasks may be aggregated into a "meta-task" to reduce invocation overheads, reduce data transfer overheads by aggregating data, and/or by pre-sorting for efficiency. Another optimization is specialization, where a sample application of presorting would be to group likesized tasks (e.g. all those that operate on 512×512 vectors) into one chunk, and invoking code that was specialized to operate on that size. For example, the MetaQ could recognize that the matrix size is small, and use a matrix multiplication mechanism to invoke matrix multiply code that's customized for that size.

Another possible optimization includes prework, such as error checking, address translation for operands of tasks that are to be executed in a different address space, and other operations that can be performed before the input dependences are satisfied. Prework may occur while the actions are sitting in the MetaQ waiting for execution.

Embodiments of the present disclosure may be integrated with input-output (TO) communication layers. Today, conventional systems for communication (e.g. MPI send/recv) and IO (e.g. HDFS) tend to operate independently from task scheduling frameworks. The result is that even if an asynchronous MPI recv is used, the user writes code that eventually blocks all progress in the thread at a wait. In exemplary embodiments of the present disclosure, by contrast, dependence predecessors can be identified and instructed to trigger a completion event when their dependence successors can proceed. If MPI or other IO and comms interfaces are augmented with a mechanism that lets them cause the triggering of the completion event themselves, and the completion event is used by dependence successors within the general framework of the dependence management system, then the blocking waits need to limit concurrency. Instead, the dependence predecessors can complete asynchronously, dependence successors can asynchronously begin their execution as soon as possible, and other tasks not involved in those dependences can proceed independently. In some exemplary embodiments, callbacks provide an implementation mechanism for this.

In some embodiments, determining the set of dependencies includes identifying an asynchronous completion event associated with a respective action from the plurality of actions, and completion of the respective action triggers the completion event. The asynchronous completion event may be associated with a respective action from the plurality of actions that accesses an operand. Triggering the completion event associated with the action accessing the operand may be performed via a callback function initiated by a storage system in communication with the system that performs accesses to storage. Any suitable type of storage device may be utilized in conjunction with the embodiments of the present disclosure, including a magnetic storage device, an optical storage device, and/or a solid state storage device for performing an asynchronous prefetch to random-access memory.

In some embodiments, the asynchronous completion event is associated with a respective action from the plurality of actions that produces an operand. Triggering the completion event associated with the action producing the operand may be performed via a callback function initiated by a write to memory by the action producing the operand. Triggering the completion event associated with the action producing the operand may also be performed via a callback function initiated by a software component that is performing a busy-wait operation on a computing resource, and/or a callback function initiated by an interrupt handler.

The callback function could also be initiated by a message passage system in communication with the system via a communications link, in which case the callback function initiated by the message passage system may include information from a packet received via the communications link that identifies a type of the packet. In such cases, a communication link may receive a packet that contains information that is used to identify its type, and that type information is passed as an argument to the callback. The callback function initiated by the message passing system may be selected based on a type of a packet received via the communications link, and the type of the packet is identified from information within the packet. The message passing system may be integrated with other systems and components, such as one of: a processor, a package on which a processor resides, or a chassis in which a processor resides.

The set of actions and determined set of dependencies may be presented (340) to any desired system, device, and software component. For example, as depicted in FIG. 1, the actions and dependencies may be presented from the discoverer software component 110 to the tuner software component 120. In some examples, presenting the determined set of dependencies includes updating an entry in the dependence vector in response to completion of an action, such as means replacing one entry with one or more other entries.

As introduced above, one or more dependence vectors may be used in presenting the actions and dependencies. In some embodiments, presenting the determined set of dependencies includes presenting a first dependence vector that includes an action that produces one or more of the data elements for a respective operand from the plurality of operands, and a second dependence vector that includes an action that accesses one or more of the data elements for the respective operand from the plurality of operands. The second dependence vector may include a first action that accesses a first operand from the plurality of operands and a second action that accesses the first operand, wherein the dependencies for the first action and the second action allow the first action and the second action to be executed concurrently.

Additionally, a set of consumers associated with a respective producer of a data element in the first dependence vector may be updated in response to a new action in the first dependence vector. In such cases, presenting the determined set of dependencies may include presenting consumer actions for the set of consumers associated with the respective producer in response to a query received from the respective producer. Furthermore, a data movement software component may monitor triggering of a completion event by the respective producer, and in response to the triggering of the completion event by the respective producer, push data from the respective producer to the set of consumers. Among other things, this helps enable software components, operating in distributed subsystems, to communicate directly with one another in a decentralized way without the need for centralized coordination around tracking the availability of data from producers and which consumers the data needs to be shipped to. Software components managing the scheduling of actions at the producer can react to data being pushed to them that is tagged with an identification of the producer, without having to busy-wait poll for the availability of data from the producer.

Figure 8:
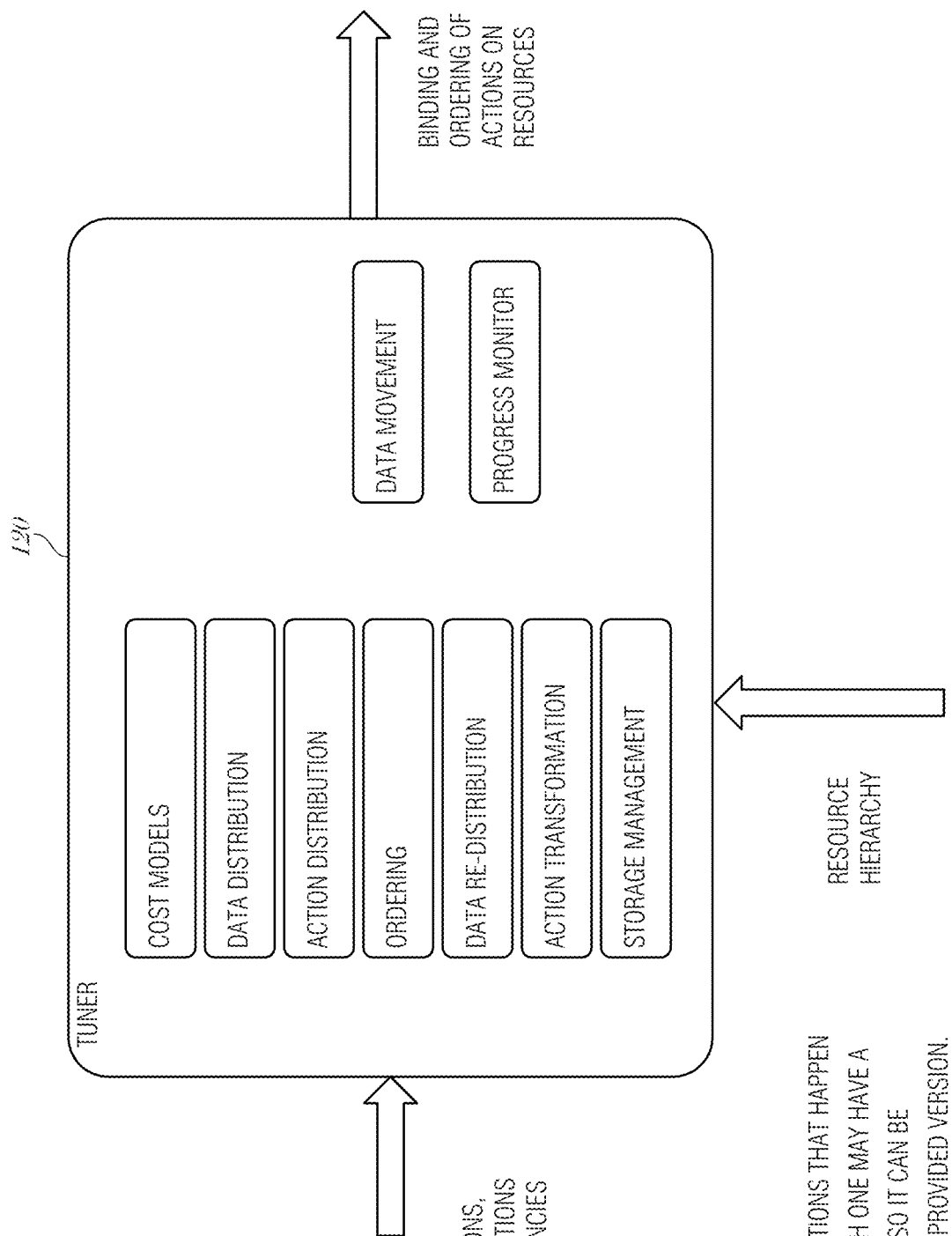
FIG. 8 depicts a detailed block diagram of an exemplary tuner component from FIG. 1 according to various examples.
Figure 9:
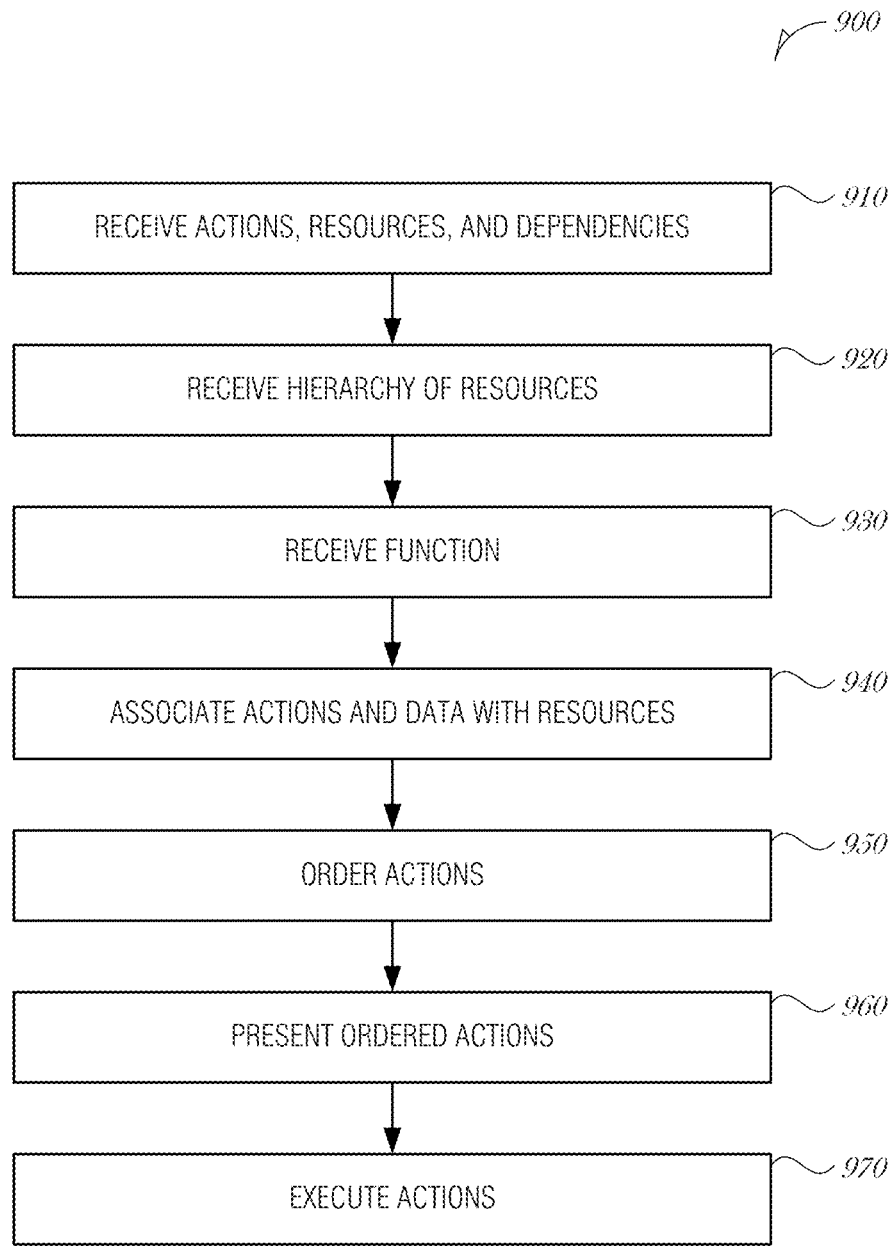
FIG. 9 is a flow diagram of a process according to various examples.

FIG. 8 depicts a detailed block diagram of an exemplary tuner component 120 from FIG. 1 according to various aspects of the present disclosure, while FIG. 9 is a flow diagram of an exemplary process 900 that may, for example be performed (in whole or in part) by the tuner component 120 and/or by other systems and components in accordance with the present disclosure. In these examples, tasks are exposed as an imperative sequence of actions (compute, data transfer, synchronize—as described above), each with a set of operands and relationships between such task may be inferred from that sequence (e.g., as represented in the task graph shown in FIG. 5.

There are many operations that happen within the tuner. Each one may have a pluggable interface, so it can be replaced with a user-provided version. A tuning expert and/or runtime process discovers the available concurrency, and maps actions to parallel computing resources: to achieve load balance, to tune trade-offs between the degree of tiling and number of streams, to tune the trade-offs between the number of MPI ranks and the number of threads per rank, and to tune thread affinity. Among other things, embodiments of the present disclosure provide for the flexible management of tasks among computing resources. Actions can be bound to streams, as introduced previously, and the binding of streams to underlying resources may be performed separately from the mapping of actions to streams. The tuner can map actions to any set of target resources, in any order, as long as that mapping observes dependences and compute capability restrictions.

This helps provide users with a uniform interface that can be used to map tasks onto heterogeneous computing resources (e.g., Peripheral Component Interconnect Express (PCIe) devices, nodes over fabric, the localhost, field-programmable gate arrays (FPGAs), and/or systems on a chip (SoC)).

Embodiments of the present disclosure help to select computing resources to map work to, to qualify the paths to those computing resources by fabric type and by subsets of computing resources within those nodes, to associate computing resources that enhance portability for load balancing and tuning, to manage memory at granularities that map to underlying physical structures, and to associate the controls over thread affinity for ease of use.

In the example shown in FIG. 9, method 900 includes receiving a set of actions, an identification of a set of computing resources to associate with the set of actions, and a set of dependencies among the set of actions (910), and receiving a description of a hierarchy of the computing resources (920). Method 900 further includes receiving identification of a function (930), associating the set of actions and data elements related to the set of actions with the set of computing resources (940), ordering the set of actions for execution (950), presenting the ordered set of actions (960), and executing the ordered set of actions (970).

The actions, computing resources, and dependencies may be received (910) from any suitable system, device and/or component, such as from the discoverer software component 110 depicted in FIG. 1. The identification of the hierarchy for the computing resources may likewise be received (920) from any desired source and the association of actions and data elements with the computing resources (940), as well as the ordering of actions (950) may be performed based on the hierarchy.

For example, the description of the hierarchy of the computing resources may be received from one or more of: a discovery of the computing resources in the system, a specification in a file, a specification in environment variables, and a specification using APIs. The identification of the set of computing resources may include an identifier for each computing resource, with the identifier including one or more of: an internet protocol address, a node name, a qualifier describing a communications fabric used to resource a particular set of computing resources, a qualifier that specifies a subset of computing resources to use within a node, and a qualifier that species a mode in which a subset of computing resources should operate.

Furthermore, a subset of the computing resources may be identified with logical numbers, where the logical numbers define an ordered subsequence of the computing resources. Among other things, the ordered sequence can be referred to, variously by the tuner component and by a programmer, thereby creating a separation of concerns between the user of the resources and the specifier of the resources. The programmer may refer to resources by their logical number, and a tuner may in turn control which actual resources, or portion of a resource, that that logical number refers to.

The identifiers of the computing resources may include one or more: a memory type, an amount of a memory type that is used, and configuration information for a memory resource. The identifier of the computing resources may also include an amount of a memory type to be allocated based on an amount of memory that has been previously consumed. The identification of the set of computing resources may also include a number of memory buffers that are available for temporary use to be shared among computing tasks, wherein allocation of the temporary buffers is one or more of: explicitly specified by the set of actions, and dynamically allocated by a runtime software component. Accordingly, associating the set of actions and the data elements with the set of computing resources (940) may include selecting a hardware computing resource based on an identifier of the hardware computing resource received by the software component via one or more of: a file, an environment variable, an application programming interface, and a node identifier.

In some embodiments, associating the set of actions and the data elements with the set of computing resources (940) includes mapping a plurality of logical devices to hardware computing resources based on an order of occurrence of the hardware computing devices in the set of computing resources received by the software component.

In some embodiments, associating the set of actions and the data elements with the set of computing resources (940) includes selecting a memory computing resource from the set of computing resources, wherein the memory computing resource is selected based on one more of: a type of the memory computing resource, a size of memory to be used within the memory computing resource, and a current utilization of the memory computing resource.

Association of the set of actions and data elements with the computing resources (940) may also include associating an action with a memory component from the set of computing resources, based on the hierarchy of the computing resources, to minimize a latency associated with accessing the memory component.

The hierarchy of computing resources may arrange resources across physical and logical domains. For example, the description of the hierarchy of the computing resources may include an arrangement of computing resources that includes one or more of: a group of central processing units, a plurality of groups of central processing units arranged as a stream, and groups of streams that share a memory domain. The description of the hierarchy of the computing resources may also include an arrangement of memory resources, the arrangement including one or more of: an amount of memory for a type of memory resource, a partitioning of memory into variables, and tiles of variables.

The hierarchy may identify the largest-possible set of resources across which a single memory coherence domain can be shared. Specific examples of this include a cluster node with coherent XEON sockets, a XEON PHI card or socket, and an FPGA with private memory. The hierarchy may also identify resources across a logical domain that is a disjoint subset of a single physical domain. Resources in a logical domain may, for example, have an association with a physical domain, a CPU mask that indicates which subset of computing resources that they use, and optionally, an indication of which subset of memory they use. Specific examples include a sub-non-uniform memory access (sub-NUMA) cluster, the portion of resources used by a given programming model, and the portion of resources that use high-bandwidth memory rather than DDR.

Accordingly, association of the set of actions and data elements with the computing resources (940) may include mapping, based on the hierarchy of the computing resources, a set of logical memory domains across a plurality of physical memory components from the set of computing resources. Among other things, this allows the tuner component 120 to easily remap the set of actions and data elements onto different systems, ranging from small, simple systems, to large, scaled systems with a variety of hardware components, without changing the inputs from the discoverer system 110. Association of the set of actions and data elements with the computing resources may also include localizing actions, based on the hierarchy of the computing resources, among a subset of the set of computing resources.

The computing resources of the hierarchy may be arranged according to any desired criteria. For example, the computing resources may be divided based on one or more of: an even distribution of computing resources among partitions of the hierarchy, and a distribution that balances capabilities of computing resources within partitions of the hierarchy. Among other things, this allows a greater number of slower resources to be added to a partition compensate for one or more relatively faster resources in another partition.

Ordering the actions in the plurality of actions (950) may include ordering the actions among a plurality of subsets of computing resources identified by the hierarchy of the computing resources, wherein each subset of computing resources may be managed with a respective instance of the software component. The plurality of respective instances of the software component may also be recursively and hierarchically instantiated.

Furthermore, ordering actions among the plurality of subsets of computing resources (950) may be performed in response to one or more of: an action completing, a plurality of actions completing, and a determination by the software component that the number of actions to be executed is below a predetermined threshold. In some cases, at least a portion of the actions associated with a subset of computing resources may be unordered. In other cases, the actions are statically associated and ordered for execution based on instructions received by a software component (such as the tuner component 120) implementing features of the present disclosure. In still other examples, the actions may be dynamically associated and ordered based on instructions received by the software component that describe one or more of: computing resource availability, computing resource proximity, costs of moving data operands from producers on which an action depends, a capability of a computing resource, and prioritizations in the instructions. In this context, such "capabilities" may include computing performance as well as power and energy efficiency related to a particular action.

In some examples, actions may be dynamically associated (940) and ordered (950) according to a policy for distributing available actions on the computing resources in the hierarchy, wherein the policy describes one or more of: an exhaustive ordering of actions on the computing resources, a partial ordering of actions on the computing resources based on actions that have already been distributed to the computing resources but are still pending execution, and a partial ordering of actions based on actions left to be distributed. Dynamic association and ordering of actions may also include: classifying pending actions according to a priority scheme that includes one or more of: user-specified priorities for specific actions, user-specified priorities for specific classes of actions, user-specified priorities; grouping the pending actions into a respective queue associated with each respective classification; and ordering the pending actions in each respective queue according to the respective classification for the respective queue. In some cases, the "user-specified priorities" identifies a user-specified function that is evaluated over properties of the actions and current system conditions.

Streams, as introduced above, may be a disjoint subset of resources in a logical domain. In some exemplary embodiments, streams may be specified as either a proportional fraction of a logical domain, or as a specific CPU mask. Multiple streams may be used to enhance efficiency, since small tasks may execute with less overhead on fewer resources, or to enable greater concurrency among tasks on different streams. This layering, particularly of logical on physical domains, and of proportional sub partitioning of resources into streams provides embodiments with a variety of advantages over conventional systems, including increases in efficiency and ease of use for users.

The physical domains which a tasking framework is permitted to use may be specified in a variety of ways, including a list of node names and/or Internet protocol (IP) addresses, as an environment variable (e.g. set by a runtime resource manager), as read from a file, as looked up from a service, or as specified through a programmatic API. Since some nodes may be reached by various paths, each with their own interconnect type, embodiments of the present disclosure may provide an optional qualifier on nodes that lists the interconnect by which they are reached. The sequence of entries in, for example, the lists noted above, may be used to establish an enumerated order of logical device identifiers. Furthermore, there may be cases where a runtime resource manager wants to specify the entire set of resources that a set of cooperating processes use (e.g. all of the MPI ranks in a job), but then wants to further qualify the subset of those to be used by a specific process (e.g. 1 MPI rank). This may be accomplished by specifying a subset of logical IDs, according to the enumeration order above, that the specific processes requested physical domains will be modulo-mapped to.

In addition to specifying the node, the resources within a node may be partitioned, and assigned to one process or agent and not others. For example, four MPI ranks running on a host may each be assigned ¼ of a modular interface card (MIC) for their exclusive use. The qualification of the subset of resources within a node that are to be used could be specified as part of the node list, or as part of the list of logical identifiers.

Embodiments of the present disclosure may also map logical domains onto physical domains, and map streams onto logical domains. Logical domains and streams are programmatic objects that may be created with user-level APIs. Logical domains may have a many-to-one mapping to physical domains, and streams may have a many-to-one mapping to logical domains. Logical domains and streams can be created individually, by specifying their association (physical domain for logical domains, and logical domain for streams) and CPU mask. Alternatively, logical domains and streams can be created all at once, through (for example) APIs that specify how resources are to be divided between them. In yet other examples, streams and logical domains can be added selectively and incrementally.

Embodiments of the present disclosure may operate in conjunction with a variety of different hardware and software computing resources, such as a host computing resource, a target computing resource, a central processing unit, a graphics processing unit, a field-programmable gate array, and a system-on-a-chip.

Embodiments of the present disclosure may provide APIs with varying levels of flexibility and control. One example of such an API includes a "STREAMSET" object that represents a collection of streams described in more detail below. This object can be used as a synchronization object and can be optionally supplied to, and filled in by, the API that creates streams. The object can also be used for synchronization.

The STREAMSET's streams may be limited to a single logical domain, or across multiple logical domains. In one exemplary embodiment, when app init leagues fills in a STREAMSET, it is always limited to a single logical domain. An exemplary data structure definition of the STREAMSET is shown below:

```
typedef struct HSTR_STREAMSET {
    uint32_t num_streams;
    HSTR_LOG_STR *log_stream_ID; // array of logical stream IDs, one per stream
} HSTR_STREAMSET;
```

The preceding collection of streams is distinct from the threading properties that streams have when they are created, so an exemplary data structure for defining such streams is shown below:

```
typedef struct HSTR_THREAD_PROP {
    uint32_t *starting_thread; // array of starting thread IDs, one per stream
    uint32_t *num_threads; // array of number of threads, one per stream
    KMP_AFFINITY kmp_affinity; // KMP_AFFINITY setting at the time of league creation
} HSTR_ THREAD_PROP;
```

In the API that follows, arrays of values are supplied, where the size of the array corresponds, in some cases to the number of logical domains to be added, in some cases to the number of physical domains to have logical domains added, as indicated in the comments on parameters below:

```
HSTR_RESULT
hStreams_app_init_leagues(
    uint32_t in_NumLogDomains,
    int32_t in_NumPhysDomains,
    uint32_t *in_pLogDomainsPerPhysDomain, //perphysical domain array
    uint32_t *in_pStreamsPerLogDomain, // perlogical domain array
    float **in_ppFractionOfThreads; //perlogical domain*stream array: % threads in ea stream
    uint32_t in_LogStreamOversubscription,
    HSTR_ STREAMSET *out_pStreamSets,
    HSTR_THREAD_PROP *out_pThreadProps);
```

Embodiments of the present disclosure may provide a variety of features to support portability and tuning. For example, algorithms may be expressed in a tiled, data-decomposed form. Once this has been done, trade-offs can be made in the number of tiles with a simple tiling parameter, the number of streams to be used can be specified using APIs like those above, and tiles can be easily modulo-mapped to streams:

for (i=0, tile_num−1) {map tile i to i % nstreams}

Embodiments of the present disclosure may also allow loads to be balanced across physical domains that have different performance in a variety of ways, such as by changing the number of logical domains per physical domain, or by changing the number of streams per a logical domain. Accordingly, associating the set of actions and the data elements with the set of computing resources (940) may include balancing loads across a plurality of memory computing sources by dynamically changing one or more of: a number of logical memory domains mapped to a physical memory domain, and a number of streams associated with a logical memory domain.

Figure 10:
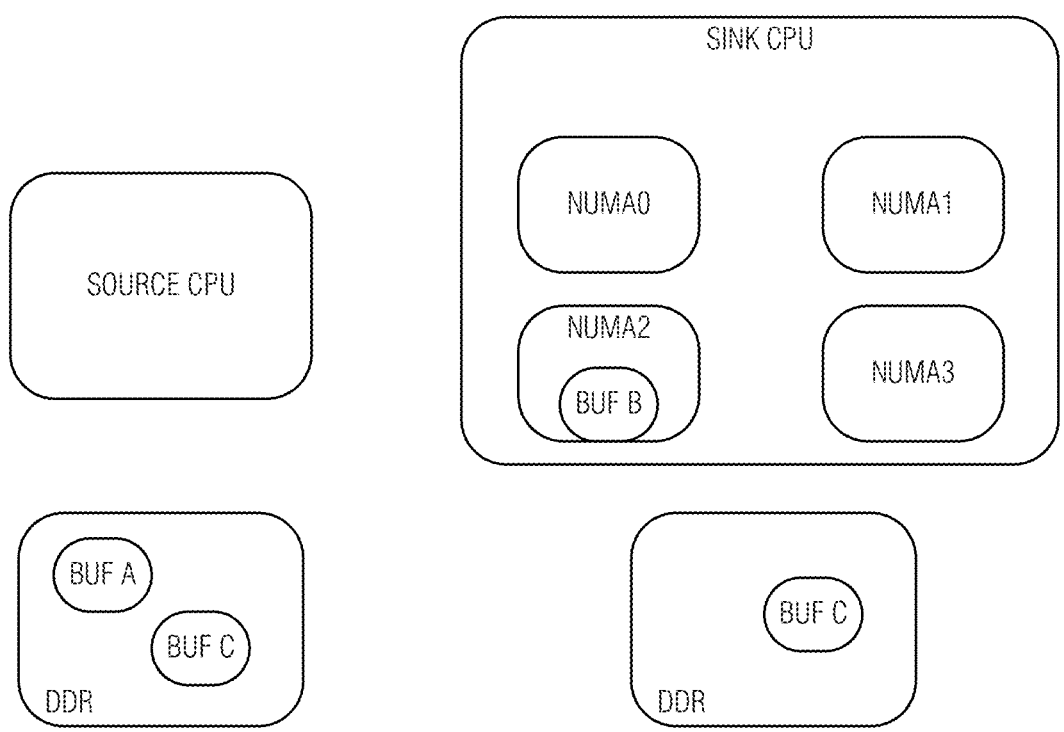
FIG. 10 illustrates the instantiation of buffers in selected logical domains according to various examples.

As noted above, resources within a given node can be subdivided among processes (e.g., MPI ranks). A logical domain can be assigned to each such rank, and the resources within that logical domain can be used by hStreams or OPENMP tasks and threads. Additionally, when users allocate memory, they can wrap that memory in buffers, as described in more detail below. Buffers may be instantiated in selected logical domains, as shown in FIG. 10. In this example, buffer A is instantiated only on the source CPU (host), buffer B is instantiated only on the sink CPU, and buffer C is instantiated in both. For this particular example, the sink CPU is booted in sub-NUMA cluster (SNC) mode.

Because there may be a double-digit performance implication for the SNC a buffer is allocated and used in, it may be desirable to control such allocation and use. In one exemplary embodiment, each SNC may be made a different logical domain. Then the instantiation of buffers can be controlled at a granularity (logical domains) which can be mapped to relevant physical structures (SNCs).

In some applications, performance may be better for using just one or two threads per core than all four, but this varies by application characteristic (e.g. the degree of constructive interference, and degree of available instruction-level parallelism). The policy of how many threads per core should be used is a controllable, abstracted tuning parameter.

Embodiments of the present disclosure may receive the identification of a variety of different functions (930) callable by, for example, the tuner component 120 (or other component implementing the functionality of the present disclosure). Such functions may server a variety of purposes, such as for performing one or more of: modeling costs for computation, modeling costs for data communication, modeling costs for synchronization, modeling costs for resource re-configuration, distributing data, distributing actions, ordering actions, redistributing unscheduled actions onto alternate subsystems for execution, redistributing failed actions onto alternate subsystems for execution, transforming sets of actions that are pending distribution for execution, dynamic allocation of memory, dynamic selection of storage from a pool of pre-determined memory resources, selection of memory structures to use based on properties of a computation, data movement, data synchronization, and managing completion of actions that have been scheduled.

In one example, a function callable by the software component is for modeling costs based on one or more of the following characteristics: a number of elements in memory operands, a shape of memory operands, a layout of memory operands, capabilities of computing resources used to execute an action, characteristics of computing resources used to execute an action, a type of an interconnect used to transmit data from a producer to its consumer, and a performance characteristic of an interconnect used to transmit data from a producer to its consumer. In this example, the characteristics for the function callable by the software component may be provided by one or more: a fixed table that is part of the software component, a user-supplied table, a table populated with profiling data collected from current and past executions, a fixed routine which evaluates a metric based on inputs and dynamic conditions, and a user-supplied routine which evaluates a metric based on inputs and dynamic conditions.

In another example, the function callable by the software component is for transforming sets of actions by performing one or more of: decomposition of an original action into a set of actions of finer granularity which cover functionality equivalent to the original action, aggregation of a set of actions into a single action of coarser granularity, conversion of an action from one implementation to another implementation of equivalent functionality, specialization of a set of actions into a simpler set of actions, and pre-work for a set of actions. In a further example, the function callable by the software component is for transforming sets of actions via aggregation based on one or more of: suitability and efficiency of aggregation for a particular computing target, similarity of computation among actions, size and shape of data, and locality of data.

In another example, the function callable by the software component is for pre-work for a set of actions, wherein the pre-work includes one or more of: error checking, selection of a particular implementation, pre-processing of a subset of available operands, preconditioning and reformatting of data, preparation for transmission of input operands, and preparation for transmission of output operands.

In another example, the function callable by the software component is for the specialization of a set of actions into a simpler set of actions, wherein the specialization is performed based on one or more of: operands of the set of actions, conditions of the set of computing resources, a type of an action to be performed, characteristics of a computing resource on which an action is to be performed.

In another example, the function callable by the software component is for moving data from a source storage area to a destination storage area, and wherein the moved data is not contiguous. In some cases, the non-contiguous data may be marshalled into a contiguous chunk of data at the source. In other cases, a contiguous superset of the data is sent to the destination and a subset of data is extracted at the destination.

In another example, the function callable by the software component is for moving data from a source storage area to a destination storage area, wherein the moved data is not contiguous, and non-contiguous data is marshalled using one or more of: a function provided by the tuner runtime, a function for optimizing performance and efficiency, a user-provided function for performing marshaling at the source, and a user-provided function for performing marshaling at the destination. The non-contiguous data may be marshalled using a function for optimizing performance and efficiency based on one or more of: data layout, data size and shape, a characteristic of a computing resource that is sending the data, and a characteristic of a computing resource that is receiving the data.

In another example, the data is moved from one source storage area to another destination storage area in response to one or more of: operands being generated by a producing action, on demand to a request by a consuming action for data, and optimization criteria being met, and wherein the optimization criteria includes one or more of: any communication link being available, a preferred communication link being available, a communication link being available that will minimize consumption of time, a communication link being available that will minimize consumption of energy, and buffering resources being available at a receiving end of a communications link.

Embodiments of the present disclosure may present the ordered set of actions (960) and execute the ordered set of actions (970) in a variety of ways. For example, presenting the ordered set of actions (960) may be performed via one or more of: a computer program, an ordered sequence of application program interface calls, a set of comments for an executor software component, and a graphical display Additionally, executing the ordered set of actions (970) may include: receiving a query from a consumer of an operand regarding availability of data from a producer of the operand; and transferring the data from the producer to the consumer in response to the produced data being available, wherein the query is received by one or more of: computing resources on which the producer actions execute, a software component running on computing resources on which the producer actions execute, and a centralized software component that tracks when actions have completed.

In another example, executing the ordered set of actions (970) includes tracking, via an action that produces an operand, a consumer action that uses the produced operand, and transferring the data from the producer to the consumer in response to the produced data being available.

In yet another example, executing the ordered set of actions (970) includes: attempting to execute, by the software component, an action from the ordered set of actions on a first subset of the computing resources; identifying, by the software component, a failure of the action to execute on the first subset of computing resources; and in response to identifying the failure, executing the action on a second subset of computing resources, wherein the first subset of computing resources and candidates for the second subset of computing resources are identified in a hierarchy of the computing resources received by the software component. In this example, the candidates for the second subset of computing resources may be selected based on one or more of: a predetermined computing resource identified by input received by the software component a prioritized list of computing resources identified by input received by the software component, a proximate resource identified from a description of a hierarchy of the computing resources, an available computing resource, a computing resource whose capabilities enable the action to be completed sooner than another computing resource. Candidates may be selected based on any different combination of the above criteria (and others), and such selection may take into account the availability, capabilities, communication costs, priorities and policies provided as inputs to the tuner component 120.

Figure 11:
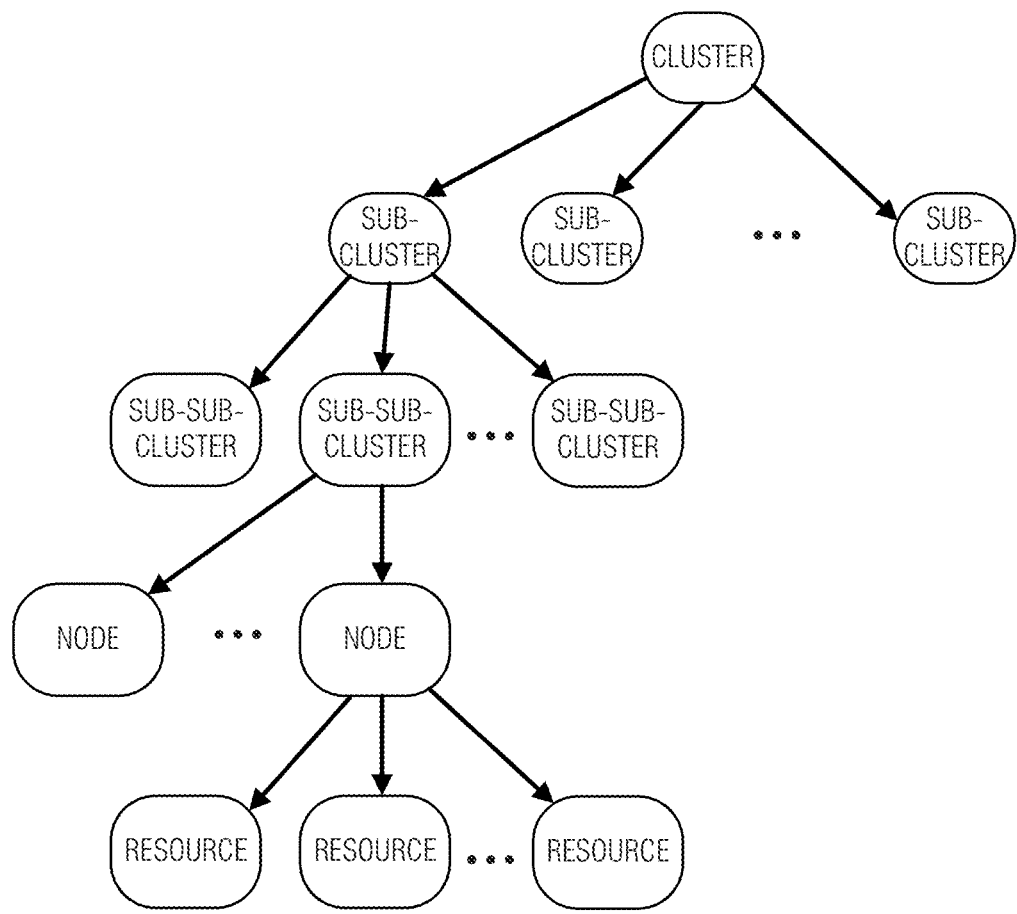
FIG. 11 illustrates an example of a hierarchy of tuning components.

FIG. 11 illustrates an example of a hierarchy of tuning components according to various aspects of the disclosure. The tuning may be applied at the whole-cluster level to map work onto sub-clusters, then again at the sub-cluster level to map work onto sub-subclusters, and so on, down to specific, lowest-level computing resources.

In a further example, executing the ordered set of actions (970) may include dynamically allocating and deallocating computing resources from the set of computing resources based on a demand for computing resources from the executed actions.

Each year, with new memory types to choose from (including high bandwidth and non-volatile memory), platform complexity and heterogeneity is increasing, with different node types, different amounts, and different kinds of memory per node. Furthermore, some platforms have memory hierarchies where some computing resources have lower latencies and higher bandwidth to some memory components than other computing resources. On such platforms, appropriately affinitizing tasks and their data can have a double-digit performance impact, e.g. in sub-NUMA clustering on KNL. Embodiments of the present disclosure may be used to help take optimal advantage of these memory resources by managing where memory is allocated and how it is affinitized.

Additionally, runtime systems are growing in their ability to apply metadata about objects in memory to achieve performance gains. Tracking that a buffer is already pinned can improve DMA performance by 5% or more. Applying knowledge that a buffer is read-only in a program phase creates an opportunity for concurrency among tasks that only read that buffer, without needing to have operands annotated as read-only at every call site. And tracking which buffers and which portions of a buffer have been modified can reduce the cost of dirty writebacks and flushing in FPGA systems with non-coherent memory.

Among other things, embodiments of the present disclosure help allow memory buffers be created with certain properties, or have those and other properties modified, in response to various requests and instructions. The embodiments of the present disclosure provide various advantages over conventional systems, including offering a declarative interface that lets the runtime system provide the best-available method for implementing the declared property as opposed to imperatively specifying a method of data allocation.

Embodiments of the present disclosure also provide properties not offered by other conventional systems, such as affinitization, pinning, access type, and coherence state. Some of those properties may be mutable by the embodiments described herein, whereas conventional systems may only specify immutable properties at allocation time, but don't provide interfaces to modify buffer metadata across different phases, e.g. transitioning a buffer to read only once it has been initially populated. Additionally the property declarations that some conventional systems provide are associated with caller operands, rather than with the buffers to which the operands refer, thereby requiring that every call site needs to be modified, rather than just the stored objects themselves.

Memory objects such as variables, or multi-dimensional tiles of larger arrays, may be represented as memory buffers. These buffers may have properties associated with them. Some properties are mutable, some are not. Such buffer properties may include, for example: whether that buffer is instantiated in a given domain (as introduced above); whether the buffer memory is pinned (e.g., to facilitate DMAs); whether the buffer is allocated from a given type of memory, (e.g., high-bandwidth memory, non-volatile memory, memory hidden from the OS, scratchpad memory, etc.); the policy for allocating that memory (e.g., it must be of the specified type or the allocation fails, or whether the specified type is a preference); whether extra steps should be taken to affinitize the memory with a given set of computing resources; size, shape and layout of the memory; coherence properties, such as read-only, writable, modified, write-with-reduction, incoherent, invalid, not initialized, etc.; and whether multiple instances within the same physical coherence domain are allowed to alias, to save memory and to optimize away unnecessary copies.

In exemplary embodiments of the present disclosure, properties such as those listed above can be specified or requested in a declarative manner. A runtime component may provide the implementation that carries out the specified requests. Embodiments of the present disclosure may thus provide a declarative interface for getting memory allocated where it will be affinitized to a designated set of compute resources using various allocators for a variety of different memory types. Embodiments of the present disclosure also allow allocation of the specified memory type to be either required or opportunistic, and provide control over default allocation for different kinds of memory (heap, static, stack, etc.). Furthermore, exemplary embodiments may keep track of: which data is modified vs. clean or in other states, at the granularity of buffers or operands; which of many instances of a buffer has the latest copy (others may be shared copies or invalid); and whether memory is initialized or not.

As used herein, the term a "buffer" or "memory buffer" may be used to denote a logical entity that refers to a given block of memory. There may be multiple instances of such buffers. Referring again to FIG. 10, the buffer may have started in one device, like the host source in FIG. 10, and gotten copied elsewhere, such as to a card. The buffer may be a read-only buffer that gets replicated and shared. A buffer may be instantiated in any subset of places—all or a few.

In the example shown in FIG. 10, Buffer A is instantiated only at the source, in DDR. Buffer B is instantiated only in one of the sub-NUMA domains at the sink, and Buffer C is instantiated in DDR for both the source and sink. Selective instantiation may be used to save memory by only using memory that is needed. Each instance of the buffer can be allocated by either the user or the runtime. Many "real codes" can allow memory they've allocated to be wrapper as a buffer but can't cede control over allocation. When a function can run on any one of several devices, its operands are referred by an address which indicates which abstract buffer that operand lives in, and the runtime maps that abstract "proxy address" to the real address in the appropriate instances. Having one name for multiple instantiations of a buffer offers a big reduction in programming complexity. Furthermore, using that proxy address can allow the runtime to find the nearest-available shared copy, or last-written instance, without the user having to micromanage that if they don't wish to.

Direct Memory Access (DMA) transfers require that memory be pinned. But if too much physical memory is pinned, the whole system, not just the process, can become unstable. Embodiments allow memory to be selectively pinned and unpinned at the buffer granularity to help avoid this problem.

Embodiments of the present disclosure allow a variety of memory types to be specified, such as high-bandwidth memory, non-volatile memory, and other types. This feature goes beyond many programming languages' capabilities (such as C's static qualifier for read-only memory, and FAST FORWARD's _attribute_((section("l1scratchpad")). The request can be made with a "must" (error if not fulfilled) or "may" (best effort) policy.

Figure 12:
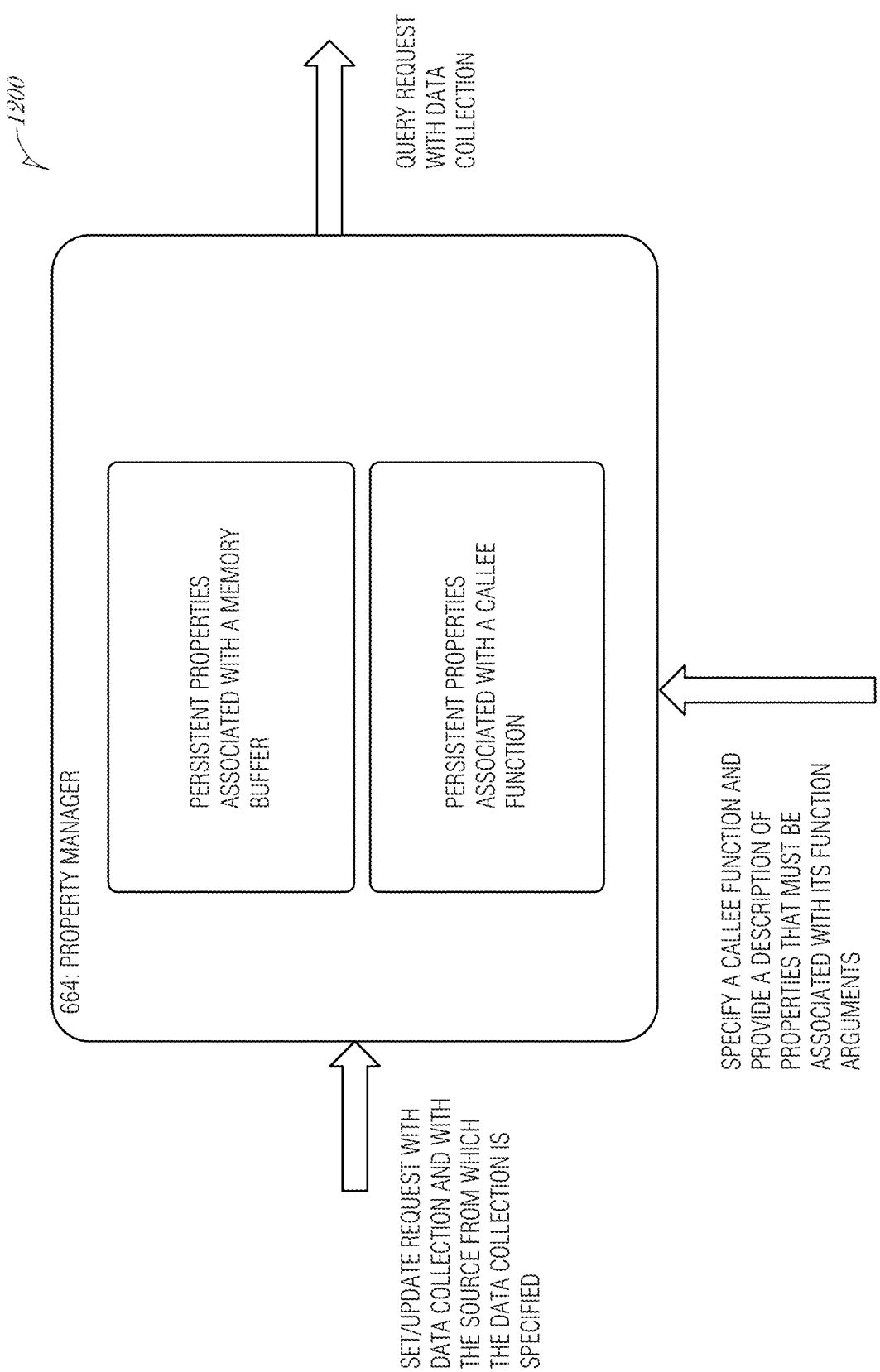
FIG. 12 depicts an exemplary operand property manager component according to various examples.
Figure 13:
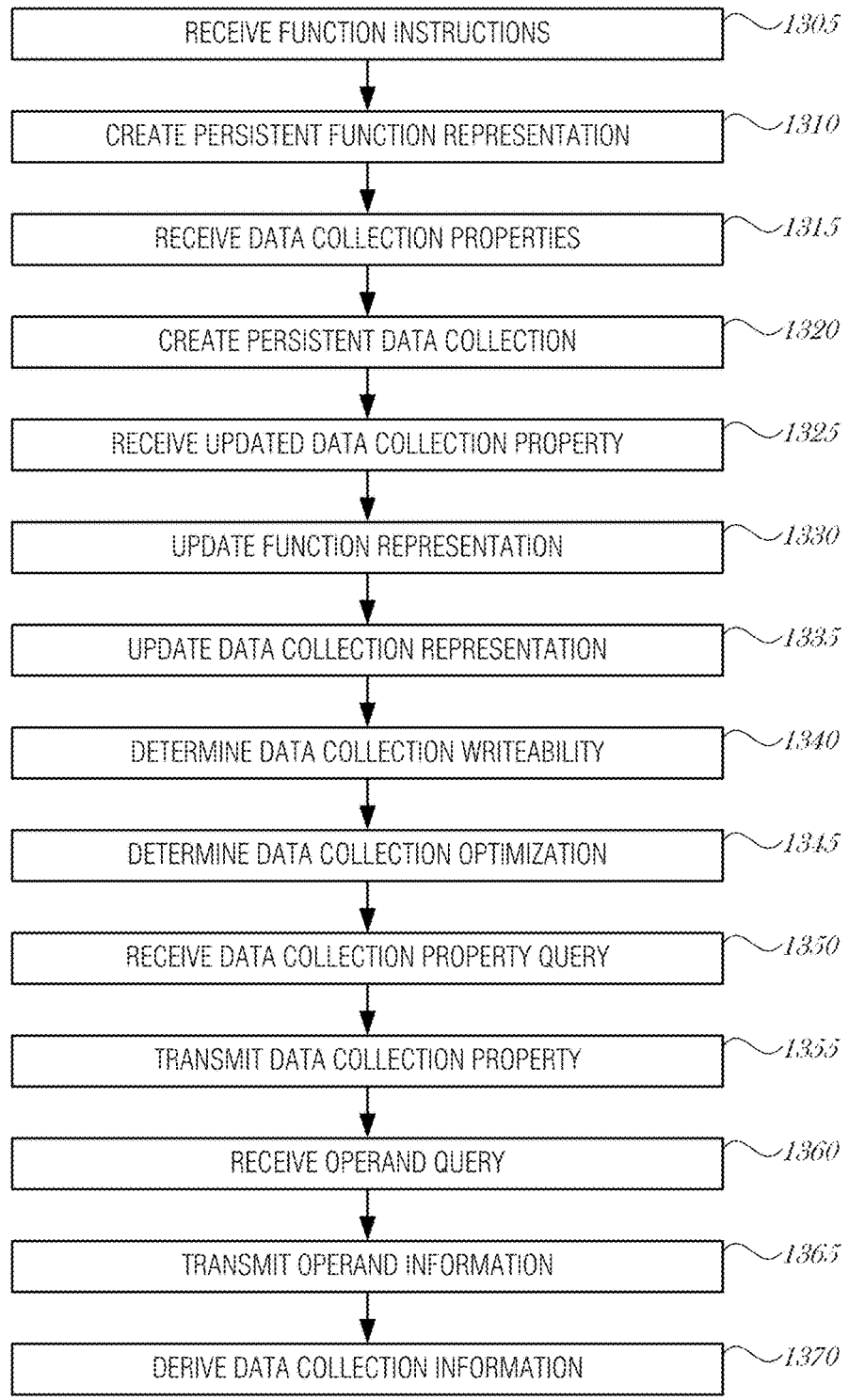
FIG. 13 is a flow diagram of a process according to various examples.

FIG. 12 depicts an exemplary operand property manager component 1200 according various aspects of the present disclosure. FIG. 13 is a flow diagram of an exemplary process that may be performed by, or in conjunction with, the operand property manager 1200. In these examples, method 1300 includes the operand property manager: receiving instructions regarding a callee function (1305), creating a persistent representation of the callee function (1310), receiving instructions describing properties for a data collection (1315), creating a persistent representation of the data collection (1320), receiving an updated property for the data collection (1325), updating the callee function representation (1330), updating the data collection representation (1335), determining the writeability of the data collection (1340), determine an optimization for the data collection (1345), receiving a query regarding a property of the data collection (1350), transmitting the queried property of the data collection (1355), receiving a query regarding an operand (1360), transmitting information regarding the queried operand (1365), and deriving information regarding the data collection (1370).

The data collection may include, and/or be associated with, a variety of types of memory buffers. In one exemplary embodiment, the data collection is an operand of an action that includes one or more of: a computing task, a data transfer task, and a synchronization task. The data collection may include any type of memory construct, including one or more of: a variable, a buffer, and an array.

The operand property manager component 1200 depicted in FIG. 12 may receive and transmit information in any suitable manner, such as via APIs. Accordingly, in some exemplary embodiments, the component 1200 receives, via an application programming interface, instructions from a source describing a set of properties for a data collection, as well as instructions regarding a callee function that include a description of properties associated with arguments for the callee function. The queries (1350), (1360) and responses thereto (1355), (1365) may also utilize an API.

In sub-NUMA cluster mode, which physical memory controller is used by a given core/HW thread can have >10% impact. Getting onto the right thread from which to perform the first touch can be complex—beyond the reach of many programmers. Embodiments of the present disclosure, by contrast, help make such thread selection easy and declarative.

Embodiments of the present disclosure may allow the layout of storage to be specified (e.g. Array of Structures, Structure of Arrays, Hilbert Curve, strided, etc.). The specification of such layouts is described in more detail below. This can affect the addressing scheme, and hence the order of traversal for memory accesses to data structures. The data in the same buffer can also be manipulated in place. A call to a function with an operand that falls within a buffer can use the buffer's specified data layout to decide how to traverse the data. This can allow the data layout to be independent of the caller, which is a powerful abstraction. How the data is expected to be accessed (random, sequential, use once, etc.) can also be provided as a hint that can help manage the selection of the memory type (banked, cached, SW-managed, etc.) and even best SW version to use to access that data. The data layout can be modified by a tuner as a property of the storage itself rather than at all of its references, and runtime code can adapt to that new layout in all the places that storage is referenced.

Embodiments of the present disclosure allow a variety of different properties of the data collection (referred to as a memory buffer in FIG. 12), such as one or more of: a memory buffer that subsumes the data collection and that persists the properties of that data collection, a caller of the callee function, and a callee of the callee function.

The description of the properties associated with arguments for the callee function may be received from any suitable source, such as from an interface that is one or more of: part of a declaration of the callee function, a wrapper function around the callee function that adds descriptive parameters, and a function that registers properties of the callee function and the callee function's arguments. The description of the properties associated with arguments for the callee function may include one or more of: descriptions that are applied to the callee function as a whole, and descriptions that are applied to individual parameters that serve as operands to the callee function. For example, the properties from a callee of the callee function may include a description of the function to be called, and the arguments of that function.

The set of properties for the data collection may also be based on one or more of: the persistent representation of the data collection, the persistent representation of the callee function, and a data collection associated with an operand of a caller function In the exemplary method 1300 depicted in FIG. 13, the operand property manager component 1200 determines whether the data collection is writeable (1340), and based on the determination whether the data collection is writeable, determines an optimization. A variety of different optimizations may be determined, including one or more of: executing a first action that refers to the data collection concurrently with a second action that only reads the data collection, and marking the data collection as modified to indicate the data collection is in need of being written back to memory and transferred to consumers of data from the data collection. In some exemplary embodiments, operands associated with the data collection are inferred to be read only in response to a declaration that the data collection is never writeable by one or more of: the description of properties associated with arguments for the callee function, the set of properties for the data collection, and properties specified by a caller function for an operand that corresponds to the data collection.

Updated properties for the data collection may be received (1325) and, in response to receiving the updated property for the data collection, the operand property manager component 1200: updates the persistent representation of the callee function by associating the persistent representation of the callee function with the updated property of the data collection; and updates the persistent representation of the data collection by associating the persistent representation the data collection with the updated property of the data collection.

Updating the properties of the data collection may be performed in a variety of ways. For example, updating the properties of the data collection may include enforcing the properties of the data collection for a single use of the data collection. Updating the properties of the data collection may also be performed in response to a referencing of an operand associated with an action. Updating the properties of the data collection may also include tracking a series of updates to the data collection. Updating the properties of the data collection may also be performed in response to a request to modify the properties of the data collection received via the application programming interface, wherein properties classified as mutable are permitted to be updated, and properties classified as immutable, will produce an error, by the component 1200, in response to an attempt to update the immutable properties.

Method 1300 further includes receiving, by the operand property manager component 1200 via the application programming interface, a query regarding the properties of the data collection (1350) and, in response to the query, transmitting the properties of the data collection via the application programming interface (1355). The method 1300 additionally includes receiving, by the operand property manager component 1200 via the application programming interface, a query regarding an operand associated with an action (1360) and, in response to the query, transmit information pertaining to the operand via the application programming interface (1365).

In some embodiments, the operand may be associated with a computing task, and the information pertaining to the operand includes a total number of data collections associated with the computing task. In some embodiments, the operand is associated with a computing task, and the information pertaining to the operand provides data layout information that includes the number of dimensions, size, shape, arrangement, stride, regularity and sparsity of data collections specified by the operand.

The state of memory may be tracked, and used for various optimizations. For example, some FPGA memory may not be fully cache-coherent, and tracking whether a buffer has been modified can be used to know whether to flush its contents. In an alternate usage, the timestamp of the last write to a buffer may be maintained to help figure out which instance has the freshest version of data. Whether the buffer has ever been written since it was invalidated can be tracked to know whether the data is valid.

As introduced above, a buffer according to various embodiments of the disclosure may comprise a data object which collects a set of meta-data for a describable chunk of memory and having a member for each buffer property. Buffer properties may have a default value, which can be overridden upon buffer creation. A subset of properties may be mutable, that is, they may be updated after buffer creation. For example, a buffer may be pinned while it is being used for a DMA, and later unpinned so that different memory can be pinned. Some properties may be immutable, such as the kind of memory (HBM vs. non-volatile) used to hold a given instance of the buffer.

APIs may be provided by the runtime that enable buffer creation, and modification of mutable properties. Those APIs may also manage consistency checking, as appropriate.

The "granularity" of a buffer instance is a logical domain, as discussed above. Logical domains may have a many-to-one relationship with physical domains, and the logical to physical buffer mapping may be changed. For example, in one mapping, logical domains A and B each have its own physical domain, e.g. for a XEON and a KNC, and those two logical domains may be remapped to the same physical domain when that code is ported to a KNL.

Figure 14:
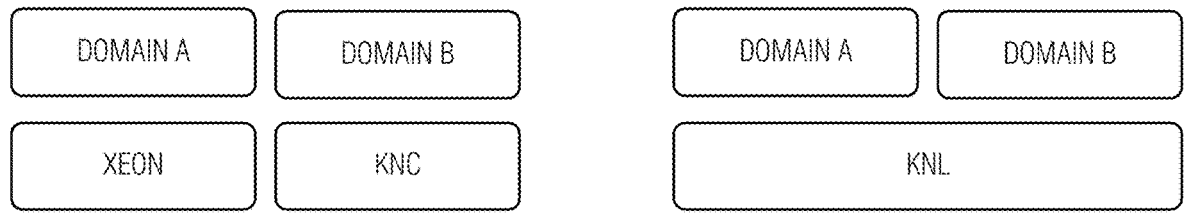
FIG. 14 illustrates the mapping of memory buffers within logical domains according to various examples.

Referring now to FIG. 14, the first mapping, at the left, buffer instances for domains A and B are distinct. In the second mapping at the right, buffer instances could alias (i.e., they could really be the same memory). In some embodiments, aliasing is only permissible if the user indicates it, thereby promising that data in different instances at corresponding locations within the buffer can never have different values. In such cases, aliasing may be one of the user-specified buffer properties, whose default value is unaliased. A benefit of buffer aliasing is that any copies that might have needed to occur in the case on the left can be optimized away when instances are aliased, e.g., for the configuration on the right. The runtime would still maintain transitive dependences implied by the copies. This offers powerful optimizations in an implementation via a straightforward and intuitive API.

The code used to implement the establishment of given properties may be complex and even distributed. For example, if the affinitized buffer property is set, the runtime has to find or create a thread running on resources that affinity is to be set to, and code running in such a thread would need to perform the first touch of the allocated memory. Such inter-thread communication may be beyond the capability of many programmers, but is a mechanical implementation task to a coder of the runtime who has the appropriate expertise.

Within a given logical domain, such as (for example) a subset of KNL cores that primarily use a sub-NUMA cluster of MCDRAM, embodiments of the present disclosure may be used to control allocation policies. Those policies could extend beyond heap memory that's wrapped in buffers. They may also specify the allocation parameters that should be used for the program stack, for statics and globals. These allocation parameters may refer to the type of memory, e.g. MCDRAM or non-volatile memory or regular DDR, or to the type of page, e.g. 4 KB vs. 2 MB, or other such properties. These properties could be controlled using libhugetlbfs, for example, and applied to the dynamic library (.so) that's loaded to execute as a process on that particular subset of resources.

Referring again to FIG. 13, method 1300 includes deriving information regarding the data collection (1370). Any information regarding the data collection may be derived in any suitable manner. In one exemplary embodiment, deriving information regarding the data collection includes generating a description for a plurality of data collections within the data collection. Information may also be derived for any number of different data collections. For example, information may be derived for a first data collection and a second data collection, wherein the information derived for the first data collection and the second data collection includes one of: a determination that the first and second data collections do not overlap, a determination that the first and second data collections match exactly, a determination that the first data collection subsumes the second data collection, and a determination that the first and second data collections partially overlap.

The data collection may include any number and type of properties, such as one or more of: writeability of the data collection, whether local storage needs to be updated on a write, whether a partial result needs to be combined with other distributed operations, whether access is atomic, whether access requires strict ordering, a reference pattern, a hardware characteristic, a type of memory associated with the data collection, a memory allocation policy, a size of the data collection, and a state of the data collection. In some embodiments, the properties may include information on a type of memory (which may include one or more of volatile or persistent memory, large or small capacity, high- or low-bandwidth memory, streamed or random-accessed, cached memory, HW-coherent or software-managed memory, special structures for gather/scatter, and structures customized to particular access patterns).

The set of properties for the data collection may also include a list of logical domains in which the data collection is instantiated. The properties may also describe the set of all possible logical domains, and any subset that the tuner selects, as logical domains the data collection could be instantiated in. The set of properties for the data collection may also: describe a plurality of logical instances for the data collection mapped to a single physical memory space, identify a logical instance from a plurality of logical instances for the data collection that contains a last-written version of data, indicate whether a new instance of the data collection should be added in response to a logical domain being added, and/or identify a software routine for handling non-contiguous data in the data collection.

In some exemplary embodiments, creating the data collection (1320) includes pre-pinning a portion of memory in the data collection based on the instructions. In some embodiments, updating the properties of the data collection (1335) includes dynamically pinning a portion of memory in the data collection based on the instructions describing the set of properties for the data collection.

Among other things, the ability of various embodiments to associate properties with storage instead of operands makes code modification less invasive than conventional systems, and the ability to revise mutable properties long after allocation is fundamentally different than past approaches. These provide for runtimes that can perform more powerful and (semi-)automatic optimization by leveraging insights and controls provided by a tuner, while minimizing the coding and tuning effort required. Those tuner-provided insights can pertain to each phase's access patterns and other characteristics for which performance can be tuned, not just the allocation-based controls that are offered by existing frameworks.

Embodiments of the present disclosure may be used to infer dependencies among tasks and take into account a wide variety of factors affecting such dependencies, such as: task operands may have different sizes and shapes; their data collections may be multi-dimensional, strided, blocked; they may be sparse, rather than dense; operands may partially overlap; and operand granularity may vary from one use to another. Many conventional systems are incapable of addressing these factors.

As introduced above, each operand is some subset of a variable or memory buffer that may be represented, for example, as a forest of trees. In such examples, there is a tree for each buffer, where a buffer has meaning in the context of user code, e.g. a single allocation, or a variable. The elements in each tree may be partitioned into layers of subtrees, such that the leaves represent disjoint subsets that cover all elements. Subtrees get partitioned whenever necessary, such that operands to tasks (sets of elements) correspond exactly to sets of these leaves. Subsets in those leaves remain as large as possible, thereby minimizing the number of leaves.

Among other things, embodiments of the present disclosure provide: a hierarchical representation of [sub]sets of data elements; a generality of support for different kinds of regular structures: (i.e., regular, irregular or sparse); efficient operations to look up what corresponds to an operand (i.e., an enclosing buffer, or set of leaves that define the granularity at which dependences are tracked); efficient operations to incrementally update that hierarchical representation when subsets of elements are referenced at a new granularity, or in different overlapping patterns; support for partially-overlapping operands; support for operands of varying granularity; use of leaves of the tree as the granularity at which inter-task dependences are maintained; associating properties with subtrees of this representation; and support for optimized marshalling and unmarshalling.

Figure 15:
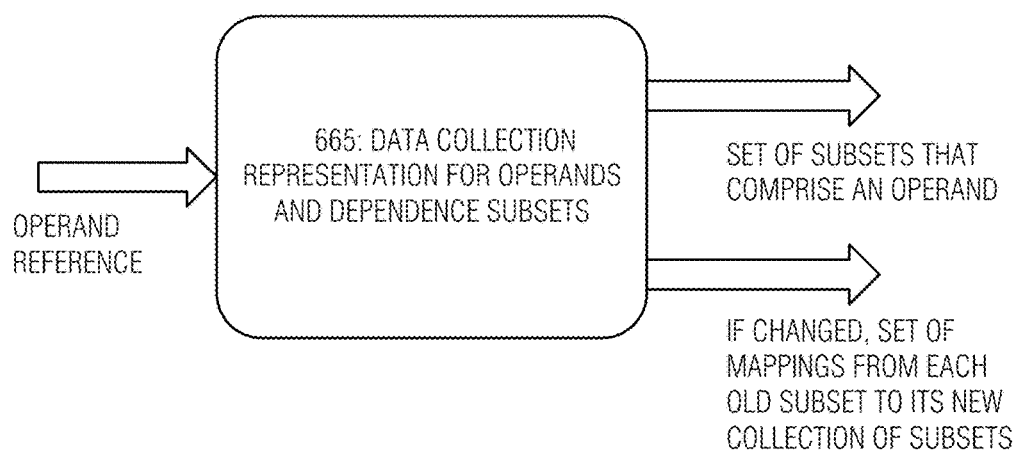
FIG. 15 depicts an exemplary data collection component according to various examples.
Figure 16:
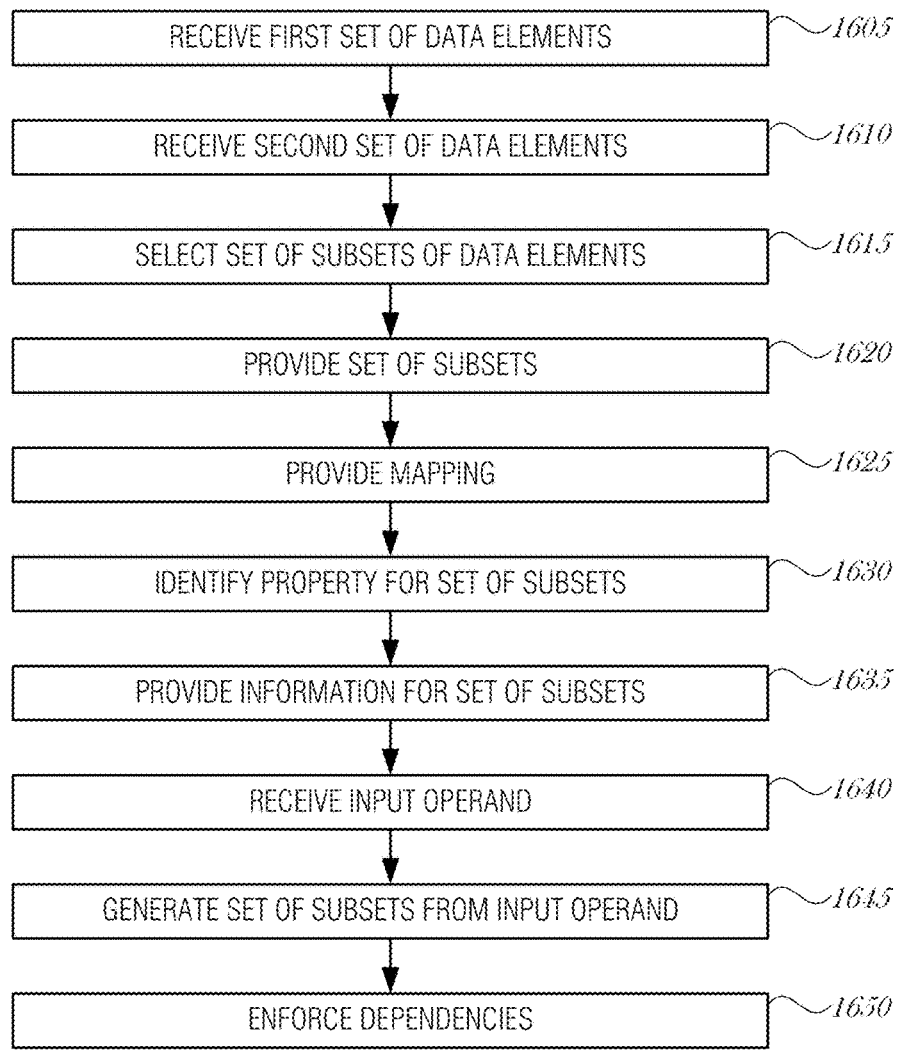
FIG. 16 is a flow diagram of a process according to various examples.

FIG. 15 depicts an exemplary data collection component 1500 according to various aspects of the present disclosure. FIG. 16 is a flow diagram depicting an exemplary process that may be performed by, or in conjunction with, the data collection component 1500. The exemplary method 1600 of FIG. 16 includes: receiving a description of a first set of data elements referenced in a first operand (1605), receiving a description of a second set of data elements referenced in a second operand (1610), and selecting a set of subsets of data elements that are included in both the first set of data elements and the second set of data elements, wherein selecting the set of subsets of data elements includes optimizing a size of the set of subsets of data elements (1615). Method 1600 further includes providing, by the data collection component 1500 via an application programming interface, the set of subsets of data elements (1620), and in response to a reference by the second operand that modifies the set of subsets of data elements, provide, by the data collection component 1500 via the application programming interface, a respective mapping from each previous subset in the set of subsets to a respective new collection of subsets in the set of subsets (1625). Method 1600 also includes identifying a property associated with the set of subsets of data elements (1630), and providing information regarding the set of subsets of data elements in response to a query (1635). Method 1600 also includes receiving an input operand (1640), generating a set of subsets of data elements associated with the operand (1645), and enforcing dependences on the set of subsets that comprise the operand, wherein the dependencies are enforced based on partially-overlapping operands in an action and operands of different granularity in an action (1650).

For example, consider a set of 12 data elements arranged into array A with 3 rows and 4 columns:

{0,1,2,3,
4,5,6,7,
8,9,10,11}.

In this example: any task operand that refers to array A is referring to all 12 elements; any task operand that refers to sub-array A[0,*] is referring to {0,1,2,3}; and any task operand that refers to sub-array A[*,1] is referring to {1,5, 9}.

Consider an example of partially-overlapping operands: if operand X consists of elements {0,1,2} and operand Y consists of elements {1,2,3}, then the overlapping subset of elements of X and Y is {1,2}. So a hierarchical representation that includes the following subsets can be sufficient: {0},{1,2},{3}. In a second example, only the elements near the edge, or halo, might be referenced separately, e.g. {0,4,8},{1,5,9,2,6,10},{3,7,11}, where the leftmost elements, {0,4,8} might be a halo of elements shared with the left neighbor, and the rightmost elements, {3,7,11}, might be a halo of elements shared with the right neighbor. This is common for stencil applications.

Inter-task dependences are induced by overlapping operands, i.e., a subset of conflicting elements. In embodiments of the present disclosure, dependences may be expressed in terms of a set of leaves (which subsets of elements in a variable or buffer), where the union of the set of subsets completely covers the elements of interest, and the intersection of each pair of subsets is null (i.e. the subsets represented by each leaf are disjoint). Following up on the first partially-overlapping example above, task W may initialize {0,1,2,3}, then task X may produce {0} and {1,2}, and then task Y may consume {1,2},{3}. So task Y depends on W for {3} and task Y depends on X for {1,2}. Leaves in the tree are {0},{1,2},{3}, and these work for dependences.

Embodiments of the present disclosure may also handle operands of varying granularity. For example, one task may refer to array A in its entirety, and another task may refer to only a tile of A. Thus array A could be represented as {0,4,8},{1,5,9},{2,3,6,7,10,11}. A formulation of a tiled matrix multiply might move all of input matrices A and B at the start, and then operate only on columns of A and rows of B to compute result C. So the first granularity, i.e., the whole matrix, is larger than the second, i.e., just a row or column. Dependences may have been initially maintained for elements {0,1,2,3,4,5,6,7,8,9,10,11} as a whole, but then that whole set can be subsequently broken up into smaller subsets, like columns {0,4,8},{1,5,9},{2,6,10},{3,7,11}, or some other tile shape. In this manner, the system may provide a respective mapping (1625) from each previous subset in the set of subsets (i.e., initially the entire matrix in the example above) to a respective new collection of subsets in the set of subsets (i.e., {0,4,8},{1,5,9},{2,3,6,7,10,11} in the first iteration and then {0,4,8},{1,5,9},{2,6,10},{3,7,11} in the next iteration).

Referring again to FIG. 16, method 1600 includes receiving an input operand (1640), generating a set of subsets of data elements associated with the operand (1645), and enforcing dependences (1650) on the set of subsets that comprise the operand, wherein the dependencies are enforced based on partially-overlapping operands in an action and operands of different granularity in an action. Additionally, a set of mappings may be provided from each previous subset in the set of subsets to each respective new subset in the set of subsets in response to a change in the set of subsets of data elements for the input operand, and a representation of the dependencies may be updated to reflect the new set of subsets.

Data collections associated with each operand may be represented as an optimized-small set of subsets of data elements, and dependences among actions may be represented with respect to those subsets of data elements. Among other things, this allows the dependence relationships to be evaluated efficiently, and in a minimized-small amount of space to represent those dependence relationships.

In one exemplary embodiment, the first operand comprises a first data collection of data elements, and the second operand comprises a second data collection of data elements which is a proper subset of the first data collection. The data collections (including the first and second data collection referenced in method 1600) used in conjunction with embodiments of the present disclosure may be, or include, any desired memory construct, such as one or more of: a variable, an array, and a memory buffer.

Additionally, one or more of the first data collection and the second data collection may include one or more of the following characteristics: multiple dimensions, strided data (elements occur at fixed intervals), blocked data (at each fixed interval, there are one or more contiguous elements), sparse data that is block-dense (subsets of data are contiguous, but gaps occur among those subsets, with intervals that vary), sparse data that is regular and describable with linear functions, and irregular matrices.

In some exemplary embodiments, the first operand comprises a first data collection of data elements, and the second operand comprises a second data collection of memory elements, and an intersection of the first and second data collections is neither empty, nor equal to, both the first and second data collection.

Various properties may be maintained for subsets of data elements. Among these properties could be the location where a result was last computed. Buffer properties and buffer instances are discussed above, where such instances may be associated with different subsets of computing resources, e.g. different nodes in a cluster or different MIC cards. So one tile of a matrix (e.g. {0,4,8}) could have been last updated in one instance (say card X), and another tile (e.g. {1,5,9}) could have been last updated in another instance (say card Y). So this last-producer meta-data could be maintained in either the main hierarchical representation of these subsets, or in a separate data structure that is indexed by the smallest subsets (leaves of the tree). Another potential properties that could be tracked include whether data is dirty or read-only. Only when these properties may be efficiently looked up, represented in an easily-traversed hierarchy, do operations like "find the last producer of this particular subset of data" or "flush dirty data on device X" become possible. In some exemplary embodiments, the property may identify data that is modified and/or data that is read-only.

When the data to be transferred is contiguous, a single, simple, linear memcpy or direct memory access (DMA) may be sufficient. But if the data is not contiguous, some code needs to be executed to extract and re-layout the data. This is performed by marshalling and unmarshalling functions. In embodiments of the present disclosure, implementations may be provided by a runtime to perform marshalling and unmarshalling of regular data structures. Additionally, users may provide their own optimized versions, by providing pointers to those functions that get associated with data collections. For example, a generalized version may be prepared to deal with strides, blocks, and ranks of arbitrary size. Specialized versions may avoid the specialized processing needed for that generality.

Additional Examples and Notes

Example A.1 includes subject matter (such as a device, apparatus, or machine) comprising: a processor; and memory coupled to the processor and storing instructions that, when executed by the processor, cause the system to: receive, by a first software component operating on the system, a function call including a plurality of operands, each operand in the plurality of operands comprising a set of data elements; identify, by the first software component, a plurality of actions associated with the function call and the plurality of operands; determine, by the first software component, a set of dependencies among the plurality of actions for executing the actions using a set of computing resources, wherein the determined set of dependencies includes identifying an operand from the plurality of operands that is associated with a first action from the plurality of actions and includes a common data element with a second operand from the plurality of operands that is associated with a second action from the plurality of actions; and present, by the first software component to a second software component, the set of actions and the determined set of dependencies, wherein presenting the determined set of dependencies includes presenting a dependence vector that includes an action from the plurality of actions that produces one or more of the data elements for an operand from the plurality of operands.

In Example A.2, the subject matter of Example A.1 may include, wherein the plurality of actions include one or more of: a computing task, a data transfer task, and a synchronization task.

In Example A.3, the subject matter of any one of Examples A.1 to A.2 may include, wherein the set of dependencies among the plurality of actions are determined based on a variable having a global scope within a software application containing the function.

In Example A.4, the subject matter of any one of Examples A.1 to A.3 may include, wherein determining the set of dependencies includes identifying an asynchronous completion event associated with a respective action from the plurality of actions, and wherein completion of the respective action triggers the completion event.

In Example A.5, the subject matter of any one of Examples A.1 to A.4 may include, wherein the asynchronous completion event is associated with a respective action from the plurality of actions that accesses an operand.

In Example A.6, the subject matter of any one of Examples A.1 to A.5 may include, wherein triggering the completion event associated with the action accessing the operand is performed via a callback function initiated by a storage system in communication with the system that performs accesses to storage.

In Example A.7, the subject matter of any one of Examples A.1 to A.6 may include, wherein the storage includes one or more of a magnetic storage device and an optical storage device.

In Example A.9, the subject matter of any one of Examples A.1 to A.8 may include, wherein the asynchronous completion event is associated with a respective action from the plurality of actions that produces an operand.

In Example A.10, the subject matter of any one of Examples A.1 to A.9 may include, wherein triggering the completion event associated with the action producing the operand is performed via a callback function initiated by a write to memory by the action producing the operand.

In Example A.11, the subject matter of any one of Examples A.1 to A.10 may include, wherein triggering the completion event associated with the action producing the operand is performed via a callback function initiated by a software component that is performing a busy-wait operation on a computing resource.

In Example A.12, the subject matter of any one of Examples A.1 to A.11 may include, wherein triggering the completion event associated with the action producing the operand is performed via a callback function initiated by an interrupt handler.

In Example A.13, the subject matter of any one of Examples A.1 to A.12 may include, wherein triggering the completion event associated with the action producing the operand is performed via a callback function initiated by a message passage system in communication with the system via a communications link.

In Example A.14, the subject matter of any one of Examples A.1 to A.13 may include, wherein the callback function initiated by the message passage system includes information from a packet received via the communications link that identifies a type of the packet.

In Example A.15, the subject matter of any one of Examples A.1 to A.14 may include, wherein the callback function initiated by the message passing system is selected based on a type of a packet received via the communications link, and wherein the type of the packet is identified from information within the packet.

In Example A.16, the subject matter of any one of Examples A.1 to A.15 may include, wherein the message passing system is integrated into one of: a processor, a package on which a processor resides, or a chassis in which a processor resides.

In Example A.17, the subject matter of any one of Examples A.1 to A.16 may include, wherein presenting the determined set of dependencies includes presenting: a first dependence vector that includes an action that produces one or more of the data elements for a respective operand from the plurality of operands; and a second dependence vector that includes an action that accesses one or more of the data elements for the respective operand from the plurality of operands.

In Example A.18, the subject matter of any one of Examples A.1 to A.17 may include, wherein the second dependence vector includes a first action that accesses a first operand from the plurality of operands and a second action that accesses the first operand, and wherein the dependencies for the first action and the second action allow the first action and the second action to be executed concurrently.

In Example A.19, the subject matter of any one of Examples A.1 to A.18 may include, wherein a set of consumers associated with a respective producer of a data element in the first dependence vector is updated in response to a new action in the first dependence vector.

In Example A.20, the subject matter of any one of Examples A.1 to A.19 may include, wherein presenting the determined set of dependencies includes presenting consumer actions for the set of consumers associated with the respective producer in response to a query received from the respective producer.

In Example A.21, the subject matter of any one of Examples A.1 to A.20 may include, wherein a data movement software component: monitors triggering of a completion event by the respective producer, and in response to the triggering of the completion event by the respective producer, pushes data from the respective producer to the set of consumers.

In Example A.22, the subject matter of any one of Examples A.1 to A.21 may include, wherein presenting the determined set of dependencies includes updating an entry in the dependence vector in response to completion of an action.

In Example A.23, the subject matter of any one of Examples A.1 to A.22 may include, wherein the computing resource is one or more of: a hardware resource and a software resource.

Example A.24 includes subject matter (such as a method, means for performing acts, machine readable medium including instructions that when performed by a machine cause the machine to performs acts, or an apparatus to perform) comprising: receiving, by a first software component operating on a computer system, a function call including a plurality of operands, each operand in the plurality of operands comprising a set of data elements; identifying, by the first software component, a plurality of actions associated with the function call and the plurality of operands; determining, by the first software component, a set of dependencies among the plurality of actions for executing the actions using a set of computing resources, wherein the determined set of dependencies includes identifying an operand from the plurality of operands that is associated with a first action from the plurality of actions and includes a common data element with a second operand from the plurality of operands that is associated with a second action from the plurality of actions; and presenting, by the first software component to a second software component, the set of actions and the determined set of dependencies, wherein presenting the determined set of dependencies includes presenting a dependence vector that includes an action from the plurality of actions that produces one or more of the data elements for an operand from the plurality of operands.

In Example A.25, the subject matter of Example A.24 may include, wherein the plurality of actions include one or more of: a computing task, a data transfer task, and a synchronization task.

In Example A.26, the subject matter of any one of Examples A.24 to A.25 may include, wherein the set of dependencies among the plurality of actions are determined based on a variable having a global scope within a software application containing the function.

In Example A.27, the subject matter of any one of Examples A.24 to A.26 may include, wherein determining the set of dependencies includes identifying an asynchronous completion event associated with a respective action from the plurality of actions, and wherein completion of the respective action triggers the completion event.

In Example A.28, the subject matter of any one of Examples A.24 to A.27 may include, wherein the asynchronous completion event is associated with a respective action from the plurality of actions that accesses an operand.

In Example A.29, the subject matter of any one of Examples A.24 to A.28 may include, wherein triggering the completion event associated with the action accessing the operand is performed via a callback function initiated by a storage system in communication with the computer system that performs accesses to storage.

In Example A.30, the subject matter of any one of Examples A.24 to A.29 may include, wherein the storage includes one or more of a magnetic storage device and an optical storage device.

In Example A.32, the subject matter of any one of Examples A.24 to A.31 may include, wherein the asynchronous completion event is associated with a respective action from the plurality of actions that produces an operand.

In Example A.33, the subject matter of any one of Examples A.24 to A.32 may include, wherein triggering the completion event associated with the action producing the operand is performed via a callback function initiated by a write to memory by the action producing the operand.

In Example A.34, the subject matter of any one of Examples A.24 to A.33 may include, wherein triggering the completion event associated with the action producing the operand is performed via a callback function initiated by a software component that is performing a busy-wait operation on a computing resource.

In Example A.35, the subject matter of any one of Examples A.24 to A.34 may include, wherein triggering the completion event associated with the action producing the operand is performed via a callback function initiated by an interrupt handler.

In Example A.36, the subject matter of any one of Examples A.24 to A.35 may include, wherein triggering the completion event associated with the action producing the operand is performed via a callback function initiated by a message passage system in communication with the computer system via a communications link.

In Example A.37, the subject matter of any one of Examples A.24 to A.36 may include, wherein the callback function initiated by the message passage system includes information from a packet received via the communications link that identifies a type of the packet.

In Example A.38, the subject matter of any one of Examples A.24 to A.37 may include, wherein the callback function initiated by the message passing system is selected based on a type of a packet received via the communications link, and wherein the type of the packet is identified from information within the packet.

In Example A.39, the subject matter of any one of Examples A.24 to A.38 may include, wherein the message passing system is integrated into one of: a processor, a package on which a processor resides, or a chassis in which a processor resides.

In Example A.40, the subject matter of any one of Examples A.24 to A.39 may include, wherein presenting the determined set of dependencies includes presenting: a first dependence vector that includes an action that produces one or more of the data elements for a respective operand from the plurality of operands; and a second dependence vector that includes an action that accesses one or more of the data elements for the respective operand from the plurality of operands.

In Example A.41, the subject matter of any one of Examples A.24 to A.40 may include, wherein the second dependence vector includes a first action that accesses a first operand from the plurality of operands and a second action that accesses the first operand, and wherein the dependencies for the first action and the second action allow the first action and the second action to be executed concurrently.

In Example A.42, the subject matter of any one of Examples A.24 to A.41 may include, wherein a set of consumers associated with a respective producer of a data element in the first dependence vector is updated in response to a new action in the first dependence vector.

In Example A.43, the subject matter of any one of Examples A.24 to A.42 may include, wherein presenting the determined set of dependencies includes presenting consumer actions for the set of consumers associated with the respective producer in response to a query received from the respective producer.

In Example A.44, the subject matter of any one of Examples A.24 to A.43 may include, wherein a data movement software component: monitors triggering of a completion event by the respective producer, and in response to the triggering of the completion event by the respective producer, pushes data from the respective producer to the set of consumers.

In Example A.45, the subject matter of any one of Examples A.24 to A.44 may include, wherein presenting the determined set of dependencies includes updating an entry in the dependence vector in response to completion of an action.

In Example A.46, the subject matter of any one of Examples A.24 to A.45 may include, wherein the computing resource is one or more of: a hardware resource and a software resource.

Example A.47 includes subject matter including a computer-readable medium storing instructions that, when executed by a computer system, cause the computer system to: receive, by a first software component operating on the computer system, a function call including a plurality of operands, each operand in the plurality of operands comprising a set of data elements; identify, by the first software component, a plurality of actions associated with the function call and the plurality of operands; determine, by the first software component, a set of dependencies among the plurality of actions for executing the actions using a set of computing resources, wherein the determined set of dependencies includes identifying an operand from the plurality of operands that is associated with a first action from the plurality of actions and includes a common data element with a second operand from the plurality of operands that is associated with a second action from the plurality of actions; and present, by the first software component to a second software component, the set of actions and the determined set of dependencies, wherein presenting the determined set of dependencies includes presenting a dependence vector that includes an action from the plurality of actions that produces one or more of the data elements for an operand from the plurality of operands.

In Example A.48, the subject matter of Example A.47 may include, wherein the plurality of actions include one or more of: a computing task, a data transfer task, and a synchronization task.

In Example A.49, the subject matter of any one of Examples A.47 to A.48 may include, wherein the set of dependencies among the plurality of actions are determined based on a variable having a global scope within a software application containing the function.

In Example A.50, the subject matter of any one of Examples A.47 to A.49 may include, wherein determining the set of dependencies includes identifying an asynchronous completion event associated with a respective action from the plurality of actions, and wherein completion of the respective action triggers the completion event.

In Example A.51, the subject matter of any one of Examples A.47 to A.50 may include, wherein the asynchronous completion event is associated with a respective action from the plurality of actions that accesses an operand.

In Example A.52, the subject matter of any one of Examples A.47 to A.51 may include, wherein triggering the completion event associated with the action accessing the operand is performed via a callback function initiated by a storage system in communication with the computer system that performs accesses to storage.

In Example A.53, the subject matter of any one of Examples A.47 to A.52 may include, wherein the storage includes one or more of a magnetic storage device and an optical storage device.

In Example A.55, the subject matter of any one of Examples A.47 to A.54 may include, wherein the asynchronous completion event is associated with a respective action from the plurality of actions that produces an operand.

In Example A.56, the subject matter of any one of Examples A.47 to A.55 may include, wherein triggering the completion event associated with the action producing the operand is performed via a callback function initiated by a write to memory by the action producing the operand.

In Example A.57, the subject matter of any one of Examples A.47 to A.56 may include, wherein triggering the completion event associated with the action producing the operand is performed via a callback function initiated by a software component that is performing a busy-wait operation on a computing resource.

In Example A.58, the subject matter of any one of Examples A.47 to A.57 may include, wherein triggering the completion event associated with the action producing the operand is performed via a callback function initiated by an interrupt handler.

In Example A.59, the subject matter of any one of Examples A.47 to A.58 may include, wherein triggering the completion event associated with the action producing the operand is performed via a callback function initiated by a message passage system in communication with the system via a communications link.

In Example A.60, the subject matter of any one of Examples A.47 to A.59 may include, wherein the callback function initiated by the message passage system includes information from a packet received via the communications link that identifies a type of the packet.

In Example A.61, the subject matter of any one of Examples A.47 to A.60 may include, wherein the callback function initiated by the message passing system is selected based on a type of a packet received via the communications link, and wherein the type of the packet is identified from information within the packet.

In Example A.62, the subject matter of any one of Examples A.47 to A.61 may include, wherein the message passing system is integrated into one of: a processor, a package on which a processor resides, or a chassis in which a processor resides.

In Example A.63, the subject matter of any one of Examples A.47 to A.62 may include, wherein presenting the determined set of dependencies includes presenting: a first dependence vector that includes an action that produces one or more of the data elements for a respective operand from the plurality of operands; and a second dependence vector that includes an action that accesses one or more of the data elements for the respective operand from the plurality of operands.

In Example A.64, the subject matter of any one of Examples A.47 to A.63 may include, wherein the second dependence vector includes a first action that accesses a first operand from the plurality of operands and a second action that accesses the first operand, and wherein the dependencies for the first action and the second action allow the first action and the second action to be executed concurrently.

In Example A.65, the subject matter of any one of Examples A.47 to A.64 may include, wherein a set of consumers associated with a respective producer of a data element in the first dependence vector is updated in response to a new action in the first dependence vector.

In Example A.66, the subject matter of any one of Examples A.47 to A.65 may include, wherein presenting the determined set of dependencies includes presenting consumer actions for the set of consumers associated with the respective producer in response to a query received from the respective producer.

In Example A.67, the subject matter of any one of Examples A.47 to A.66 may include, wherein a data movement software component: monitors triggering of a completion event by the respective producer, and in response to the triggering of the completion event by the respective producer, pushes data from the respective producer to the set of consumers.

In Example A.68, the subject matter of any one of Examples A.47 to A.67 may include, wherein presenting the determined set of dependencies includes updating an entry in the dependence vector in response to completion of an action.

In Example A.69, the subject matter of any one of Examples A.47 to A.68 may include, wherein the computing resource is one or more of: a hardware resource and a software resource.

Example A.70 includes subject matter (such as a device, apparatus, or machine) comprising: means for receiving a function call including a plurality of operands, each operand in the plurality of operands comprising a set of data elements; means for identifying a plurality of actions associated with the function call and the plurality of operands; means for determining a set of dependencies among the plurality of actions for executing the actions using a set of computing resources, wherein the determined set of dependencies includes identifying an operand from the plurality of operands that is associated with a first action from the plurality of actions and includes a common data element with a second operand from the plurality of operands that is associated with a second action from the plurality of actions; and means for presenting the set of actions and the determined set of dependencies, wherein presenting the determined set of dependencies includes presenting a dependence vector that includes an action from the plurality of actions that produces one or more of the data elements for an operand from the plurality of operands.

In Example A.71, the subject matter of Example A.70 may include, wherein the plurality of actions include one or more of: a computing task, a data transfer task, and a synchronization task.

In Example A.72, the subject matter of any one of Examples A.70 to A.71 may include, wherein the set of dependencies among the plurality of actions are determined based on a variable having a global scope within a software application containing the function.

In Example A.73, the subject matter of any one of Examples A.70 to A.72 may include, wherein determining the set of dependencies includes identifying an asynchronous completion event associated with a respective action from the plurality of actions, and wherein completion of the respective action triggers the completion event.

In Example A.74, the subject matter of any one of Examples A.70 to A.73 may include, wherein the asynchronous completion event is associated with a respective action from the plurality of actions that accesses an operand.

In Example A.75, the subject matter of any one of Examples A.70 to A.74 may include, wherein triggering the completion event associated with the action accessing the operand is performed via a callback function initiated by a storage system in communication with the system that performs accesses to storage.

In Example A.76, the subject matter of any one of Examples A.70 to A.75 may include, wherein the storage includes one or more of a magnetic storage device and an optical storage device.

In Example A.78, the subject matter of any one of Examples A.70 to A.77 may include, wherein the asynchronous completion event is associated with a respective action from the plurality of actions that produces an operand.

In Example A.79, the subject matter of any one of Examples A.70 to A.78 may include, wherein triggering the completion event associated with the action producing the operand is performed via a callback function initiated by a write to memory by the action producing the operand.

In Example A.80, the subject matter of any one of Examples A.70 to A.79 may include, wherein triggering the completion event associated with the action producing the operand is performed via a callback function initiated by a software component that is performing a busy-wait operation on a computing resource.

In Example A.81, the subject matter of any one of Examples A.70 to A.80 may include, wherein triggering the completion event associated with the action producing the operand is performed via a callback function initiated by an interrupt handler.

In Example A.82, the subject matter of any one of Examples A.70 to A.81 may include, wherein triggering the completion event associated with the action producing the operand is performed via a callback function initiated by a message passage system in communication with the system via a communications link.

In Example A.83, the subject matter of any one of Examples A.70 to A.82 may include, wherein the callback function initiated by the message passage system includes information from a packet received via the communications link that identifies a type of the packet.

In Example A.84, the subject matter of any one of Examples A.70 to A.83 may include, wherein the callback function initiated by the message passing system is selected based on a type of a packet received via the communications link, and wherein the type of the packet is identified from information within the packet.

In Example A.85, the subject matter of any one of Examples A.70 to A.84 may include, wherein the message passing system is integrated into one of: a processor, a package on which a processor resides, or a chassis in which a processor resides.

In Example A.86, the subject matter of any one of Examples A.70 to A.85 may include, wherein presenting the determined set of dependencies includes presenting: a first dependence vector that includes an action that produces one or more of the data elements for a respective operand from the plurality of operands; and a second dependence vector that includes an action that accesses one or more of the data elements for the respective operand from the plurality of operands.

In Example A.87, the subject matter of any one of Examples A.70 to A.86 may include, wherein the second dependence vector includes a first action that accesses a first operand from the plurality of operands and a second action that accesses the first operand, and wherein the dependencies for the first action and the second action allow the first action and the second action to be executed concurrently.

In Example A.88, the subject matter of any one of Examples A.70 to A.87 may include, wherein a set of consumers associated with a respective producer of a data element in the first dependence vector is updated in response to a new action in the first dependence vector.

In Example A.89, the subject matter of any one of Examples A.70 to A.88 may include, wherein presenting the determined set of dependencies includes presenting consumer actions for the set of consumers associated with the respective producer in response to a query received from the respective producer.

In Example A.90, the subject matter of any one of Examples A.70 to A.89 may include, means for: monitoring triggering of a completion event by the respective producer, and in response to the triggering of the completion event by the respective producer, pushing data from the respective producer to the set of consumers.

In Example A.91, the subject matter of any one of Examples A.70 to A.90 may include, wherein presenting the determined set of dependencies includes updating an entry in the dependence vector in response to completion of an action.

In Example A.92, the subject matter of any one of Examples A.70 to A.91 may include, wherein the computing resource is one or more of: a hardware resource and a software resource.

Example A.93 includes at least one computer-readable medium storing instructions for causing a computer system to perform the method of any of the Examples A.24-A.46.

Example A.94 includes a system comprising means for performing the method of any of the Examples A.24-A.46.

Example B.1 includes subject matter (such as a device, apparatus, or machine) comprising: a processor; and memory coupled to the processor and storing instructions that, when executed by the processor, cause the system to: receive, by a software component operating on the system: a set of actions, an identification of a set of computing resources to associate with the set of actions, and a set of dependencies among the plurality of actions for executing the actions using the computing resources; associate the set of actions and data elements related to the set of actions, by the software component, with the set of computing resources; and order, by the software component, each respective action in the set of actions for execution on the computing resources.

In Example B.2, the subject matter of Example B.1 may include, wherein the plurality of actions include one or more of: a computing task, a data transfer task, and a synchronization task.

In Example B.3, the subject matter of any one of Examples B.1 to B.2 may include, wherein the memory further stores instructions for causing the system to receive, by the software component, a description of a hierarchy of the computing resources, and wherein the association of the set of actions and data elements with the computing resources and the ordering of the actions for execution on the computing resources are performed based on the hierarchy of computing resources.

In Example B.4, the subject matter of any one of Examples B.1 to B.3 may include, wherein association of the set of actions and data elements with the computing resources includes associating an action with a memory component from the set of computing resources, based on the hierarchy of the computing resources, to minimize a latency associated with accessing the memory component.

In Example B.5, the subject matter of any one of Examples B.1 to B.4 may include, wherein association of the set of actions and data elements with the computing resources includes mapping, based on the hierarchy of the computing resources, a set of logical memory domains across a plurality of physical memory components from the set of computing resources.

In Example B.6, the subject matter of any one of Examples B.1 to B.5 may include, wherein association of the set of actions and data elements with the computing resources includes localizing actions, based on the hierarchy of the computing resources, among a subset of the set of computing resources.

In Example B.7, the subject matter of any one of Examples B.1 to B.6 may include, wherein the description of the hierarchy of the computing resources includes an arrangement of computing resources, the arrangement one or more of: a group of central processing units, a plurality of groups of central processing units arranged as a stream, and groups of streams that share a memory domain.

In Example B.8, the subject matter of any one of Examples B.1 to B.7 may include, wherein the description of the hierarchy of the computing resources includes an arrangement of memory resources, the arrangement one or more of: an amount of memory for a type of memory resource, a partitioning of memory into variables, and tiles of variables.

In Example B.9, the subject matter of any one of Examples B.1 to B.8 may include, wherein the description of the hierarchy of the computing resources is received from one or more of: a discovery of the computing resources in the system, a specification in a file, a specification in environment variables, and a specification using APIs.

In Example B.10, the subject matter of any one of Examples B.1 to B.9 may include, wherein the identification of the set of computing resources includes an identifier for each computing resource, the identifier one or more of: an internet protocol address, a node name, a qualifier describing a communications fabric used to resource a particular set of computing resources, a qualifier that specifies a subset of computing resources to use within a node, and a qualifier that species a mode in which a subset of computing resources should operate.

In Example B.11, the subject matter of any one of Examples B.1 to B.10 may include, wherein a subset of the computing resources are identified with logical numbers, and the logical numbers define an ordered subsequence of the computing resources.

In Example B.12, the subject matter of any one of Examples B.1 to B.11 may include, wherein the identifiers of the computing resources include one or more: a memory type, an amount of a memory type that is used, and configuration information for a memory resource.

In Example B.13, the subject matter of any one of Examples B.1 to B.12 may include, wherein the identifier of the computing resources includes an amount of a memory type to be allocated based on an amount of memory that has been previously consumed.

In Example B.14, the subject matter of any one of Examples B.1 to B.13 may include, wherein the computing resources of the hierarchy are divided based on one or more of: an even distribution of computing resources among partitions of the hierarchy, and a distribution that balances capabilities of computing resources within partitions of the hierarchy.

In Example B.15, the subject matter of any one of Examples B.1 to B.14 may include, wherein the identification of the set of computing resources includes a number of memory buffers that are available for temporary use to be shared among computing tasks, and wherein allocation of the temporary buffers is one or more of: explicitly specified by the set of actions, and dynamically allocated by a runtime software component.

In Example B.16, the subject matter of any one of Examples B.1 to B.15 may include, wherein ordering the actions in the plurality of actions includes ordering the actions among a plurality of subsets of computing resources identified by the hierarchy of the computing resources, wherein each subset of computing resources is managed with a respective instance of the software component.

In Example B.17, the subject matter of any one of Examples B.1 to B.16 may include, wherein the plurality of respective instances of the software component are recursively and hierarchically instantiated.

In Example B.18, the subject matter of any one of Examples B.1 to B.17 may include, wherein ordering actions among the plurality of subsets of computing resources is performed in response to one or more of: an action completing, a plurality of actions completing, and a determination by the software component that the number actions to be executed is below a predetermined threshold.

In Example B.19, the subject matter of any one of Examples B.1 to B.18 may include, wherein at least a portion of the actions associated with a subset of computing resources are unordered.

In Example B.20, the subject matter of any one of Examples B.1 to B.19 may include, wherein the actions are statically associated and ordered for execution based on instructions received by the software component.

In Example B.21, the subject matter of any one of Examples B.1 to B.20 may include, wherein the actions are dynamically associated and ordered based on instructions received by the software component that describe one or more of: computing resource availability, computing resource proximity, costs of moving data operands from producers on which an action depends, a capability of a computing resource, and prioritizations in the instructions.

In Example B.22, the subject matter of any one of Examples B.1 to B.21 may include, where actions are dynamically associated and ordered according to a policy for distributing available actions on the computing resources in the hierarchy, wherein the policy describes one or more of: an exhaustive ordering of actions on the computing resources, a partial ordering of actions on the computing resources based on actions that have already been distributed to the computing resources but are still pending execution, and a partial ordering of actions based on actions left to be distributed.

In Example B.23, the subject matter of any one of Examples B.1 to B.22 may include, wherein dynamic association and ordering of actions includes: classifying pending actions according to a priority scheme that includes one or more of: user-specified priorities for specific actions, user-specified priorities for specific classes of actions, user-specified priorities; grouping the pending actions into a respective queue associated with each respective classification; and ordering the pending actions in each respective queue according to the respective classification for the respective queue.

In Example B.24, the subject matter of any one of Examples B.1 to B.23 may include, wherein the memory further stores instructions for causing the system to execute, by the software component, the ordered set of actions.

In Example B.25, the subject matter of any one of Examples B.1 to B.24 may include, wherein executing the ordered set of actions includes: receiving a query from a consumer of an operand regarding availability of data from a producer of the operand; transferring the data from the producer to the consumer in response to the produced data being available, wherein the query is received by one or more of: computing resources on which the producer actions execute, a software component running on computing resources on which the producer actions execute, and a centralized software component that tracks when actions have completed.

In Example B.26, the subject matter of any one of Examples B.1 to B.25 may include, wherein executing the ordered set of actions includes tracking, via an action that produces an operand, a consumer action that uses the produced operand, and transferring the data from the producer to the consumer in response to the produced data being available.

In Example B.27, the subject matter of any one of Examples B.1 to B.26 may include, wherein executing the ordered set of actions includes: attempting to execute, by the software component, an action from the ordered set of actions on a first subset of the computing resources; identifying, by the software component, a failure of the action to execute on the first subset of computing resources; and in response to identifying the failure, executing the action on a second subset of computing resources, wherein the first subset of computing resources and candidates for the second subset of computing resources are identified in a hierarchy of the computing resources received by the software component, and wherein the candidates for the second subset of computing resources are selected based on one or more of: a predetermined computing resource identified by input received by the software component a prioritized list of computing resources identified by input received by the software component, a proximate resource identified from a description of a hierarchy of the computing resources, an available computing resource, a computing resource whose capabilities enable the action to be completed sooner than another computing resource.

In Example B.28, the subject matter of any one of Examples B.1 to B.27 may include, wherein executing the ordered set of actions includes dynamically allocating and deallocating computing resources from the set of computing resources based on a demand for computing resources from the executed actions.

In Example B.29, the subject matter of any one of Examples B.1 to B.28 may include, wherein the memory further stores instructions for causing the system to present the ordered set of actions via one or more of: a computer program, an ordered sequence of application program interface calls, a set of comments for an executor software component, and a graphical display.

In Example B.30, the subject matter of any one of Examples B.1 to B.29 may include, wherein the plurality of computing resources includes one or more of: a host computing resource, a target computing resource, a central processing unit, a graphics processing unit, a field-programmable gate array, and a system-on-a-chip.

In Example B.31, the subject matter of any one of Examples B.1 to B.30 may include, wherein associating the set of actions and the data elements with the set of computing resources includes balancing loads across a plurality of memory computing sources by dynamically changing one or more of: a number of logical memory domains mapped to a physical memory domain, and a number of streams associated with a logical memory domain.

In Example B.32, the subject matter of any one of Examples B.1 to B.31 may include, wherein the memory further stores instructions for causing the system to receive, by the software component, identification of a function callable by the software component for performing one or more of: modeling costs for computation, modeling costs for data communication, modeling costs for synchronization, modeling costs for resource re-configuration, distributing data, distributing actions, ordering actions, redistributing unscheduled actions onto alternate subsystems for execution, redistributing failed actions onto alternate subsystems for execution, transforming sets of actions that are pending distribution for execution, dynamic allocation of memory, dynamic selection of storage from a pool of pre-determined memory resources, selection of memory structures to use based on properties of a computation, data movement, data synchronization, and managing completion of actions that have been scheduled.

In Example B.33, the subject matter of any one of Examples B.1 to B.32 may include, wherein the function callable by the software component is for modeling costs based on one or more of the following characteristics: a number of elements in memory operands, a shape of memory operands, a layout of memory operands, capabilities of computing resources used to execute an action, characteristics of computing resources used to execute an action, a type of an interconnect used transmit data from a producer to its consumer, and a performance characteristic of an interconnect used transmit data from a producer to its consumer.

In Example B.34, the subject matter of any one of Examples B.1 to B.33 may include, wherein the characteristics for the function callable by the software component are provided by one or more: a fixed table that is part of the software component, a user-supplied table, a table populated with profiling data collected from current and past executions, a fixed routine which evaluates a metric based on inputs and dynamic conditions, and a user-supplied routine which evaluates a metric based on inputs and dynamic conditions.

In Example B.35, the subject matter of any one of Examples B.1 to B.34 may include, wherein the function callable by the software component is for transforming sets of actions by performing one or more of: decomposition of an original action into a set of actions of finer granularity which cover functionality equivalent to the original action, aggregation of a set of actions into a single action of coarser granularity, conversion of an action from one implementation to another implementation of equivalent functionality, specialization of a set of actions into a simpler set of actions, and pre-work for a set of actions.

In Example B.36, the subject matter of any one of Examples B.1 to B.35 may include, wherein the function callable by the software component is for transforming sets of actions via aggregation based on one or more of: suitability and efficiency of aggregation for a particular computing target, similarity of computation among actions, size and shape of data, and locality of data.

In Example B.37, the subject matter of any one of Examples B.1 to B.36 may include, wherein function callable by the software component is for pre-work for a set of actions, and wherein the pre-work includes one or more of: error checking, selection of a particular implementation, pre-processing of a subset of available operands, preconditioning and reformatting of data, preparation for transmission of input operands, and preparation for transmission of output operands.

In Example B.38, the subject matter of any one of Examples B.1 to B.37 may include, wherein the function callable by the software component is for the specialization of a set of actions into a simpler set of actions, and wherein the specialization is performed based on one or more of: operands of the set of actions, conditions of the set of computing resources, a type of an action to be performed, characteristics of a computing resource on which an action is to be performed.

In Example B.39, the subject matter of any one of Examples B.1 to B.38 may include, wherein the function callable by the software component is for moving data from a source storage area to a destination storage area, and wherein the moved data is not contiguous.

In Example B.40, the subject matter of any one of Examples B.1 to B.39 may include, wherein the non-contiguous data is marshalled into a contiguous chunk of data at the source.

In Example B.41, the subject matter of any one of Examples B.1 to B.40 may include, wherein a contiguous superset of the data is sent to the destination and a subset of data is extracted at the destination.

In Example B.42, the subject matter of any one of Examples B.1 to B.41 may include, wherein the function callable by the software component is for moving data from a source storage area to a destination storage area, wherein the moved data is not contiguous, and non-contiguous data is marshalled using one or more of: a function provided by the tuner runtime, a function for optimizing performance and efficiency, a user-provided function for performing marshaling at the source, and a user-provided function for performing marshaling at the destination.

In Example B.43, the subject matter of any one of Examples B.1 to B.42 may include, wherein the non-contiguous data is marshalled using a function for optimizing performance and efficiency based on one or more of: data layout, data size and shape, a characteristic of a computing resource that is sending the data, and a characteristic of a computing resource that is receiving the data.

In Example B.44, the subject matter of any one of Examples B.1 to B.43 may include, wherein the data is moved from one source storage area to another destination storage area in response to one or more of: operands being generated by a producing action, on demand to a request by a consuming action for data, and optimization criteria being met, and wherein the optimization criteria includes one or more of: any communication link being available, a preferred communication link being available, a communication link being available that will minimize consumption of time, a communication link being available that will minimize consumption of energy, and buffering resources being available at a receiving end of a communications link.

In Example B.45, the subject matter of any one of Examples B.1 to B.44 may include, wherein associating the set of actions and the data elements with the set of computing resources includes selecting a hardware computing resource based on an identifier of the hardware computing resource received by the software component via one or more of: a file, an environment variable, an application programming interface, and a node identifier.

In Example B.46, the subject matter of any one of Examples B.1 to B.45 may include, wherein associating the set of actions and the data elements with the set of computing resources includes mapping a plurality of logical devices to hardware computing resources based on an order of occurrence of the hardware computing devices in the set of computing resources received by the software component.

In Example B.47, the subject matter of any one of Examples B.1 to B.46 may include, wherein associating the set of actions and the data elements with the set of computing resources includes selecting a memory computing resource from the set of computing resources, wherein the memory computing resource is selected based on one more of: a type of the memory computing resource, a size of memory to be used within the memory computing resource, and a current utilization of the memory computing resource.

Example B.48 includes subject matter (such as a method, means for performing acts, machine readable medium including instructions that when performed by a machine cause the machine to performs acts, or an apparatus to perform) comprising: receiving, by a software component operating on a computer system: a set of actions, an identification of a set of computing resources to associate with the set of actions, and a set of dependencies among the plurality of actions for executing the actions using the computing resources; associating the set of actions and data elements related to the set of actions, by the software component, with the set of computing resources; and ordering, by the software component, each respective action in the set of actions for execution on the computing resources.

In Example B.49, the subject matter of Example B.48 may include, wherein the plurality of actions include one or more of: a computing task, a data transfer task, and a synchronization task.

In Example B.50, the subject matter of any one of Examples B.48 to B.49 may include, receiving, by the software component, a description of a hierarchy of the computing resources, and wherein the association of the set of actions and data elements with the computing resources and the ordering of the actions for execution on the computing resources are performed based on the hierarchy of computing resources.

In Example B.51, the subject matter of any one of Examples B.48 to B.50 may include, wherein association of the set of actions and data elements with the computing resources includes associating an action with a memory component from the set of computing resources, based on the hierarchy of the computing resources, to minimize a latency associated with accessing the memory component.

In Example B.52, the subject matter of any one of Examples B.48 to B.51 may include, wherein association of the set of actions and data elements with the computing resources includes mapping, based on the hierarchy of the computing resources, a set of logical memory domains across a plurality of physical memory components from the set of computing resources.

In Example B.53, the subject matter of any one of Examples B.48 to B.52 may include, wherein association of the set of actions and data elements with the computing resources includes localizing actions, based on the hierarchy of the computing resources, among a subset of the set of computing resources.

In Example B.54, the subject matter of any one of Examples B.48 to B.53 may include, wherein the description of the hierarchy of the computing resources includes an arrangement of computing resources, the arrangement one or more of: a group of central processing units, a plurality of groups of central processing units arranged as a stream, and groups of streams that share a memory domain.

In Example B.55, the subject matter of any one of Examples B.48 to B.54 may include, wherein the description of the hierarchy of the computing resources includes an arrangement of memory resources, the arrangement one or more of: an amount of memory for a type of memory resource, a partitioning of memory into variables, and tiles of variables.

In Example B.56, the subject matter of any one of Examples B.48 to B.55 may include, wherein the description of the hierarchy of the computing resources is received from one or more of: a discovery of the computing resources in the system, a specification in a file, a specification in environment variables, and a specification using APIs.

In Example B.57, the subject matter of any one of Examples B.48 to B.56 may include, wherein the identification of the set of computing resources includes an identifier for each computing resource, the identifier one or more of: an internet protocol address, a node name, a qualifier describing a communications fabric used to resource a particular set of computing resources, a qualifier that specifies a subset of computing resources to use within a node, and a qualifier that species a mode in which a subset of computing resources should operate.

In Example B.58, the subject matter of any one of Examples B.48 to B.57 may include, wherein a subset of the computing resources are identified with logical numbers, and the logical numbers define an ordered subsequence of the computing resources.

In Example B.59, the subject matter of any one of Examples B.48 to B.58 may include, wherein the identifiers of the computing resources include one or more: a memory type, an amount of a memory type that is used, and configuration information for a memory resource.

In Example B.60, the subject matter of any one of Examples B.48 to B.59 may include, wherein the identifier of the computing resources includes an amount of a memory type to be allocated based on an amount of memory that has been previously consumed.

In Example B.61, the subject matter of any one of Examples B.48 to B.60 may include, wherein the computing resources of the hierarchy are divided based on one or more of: an even distribution of computing resources among partitions of the hierarchy, and a distribution that balances capabilities of computing resources within partitions of the hierarchy.

In Example B.62, the subject matter of any one of Examples B.48 to B.61 may include, wherein the identification of the set of computing resources includes a number of memory buffers that are available for temporary use to be shared among computing tasks, and wherein allocation of the temporary buffers is one or more of: explicitly specified by the set of actions, and dynamically allocated by a runtime software component.

In Example B.63, the subject matter of any one of Examples B.48 to B.62 may include, wherein ordering the actions in the plurality of actions includes ordering the actions among a plurality of subsets of computing resources identified by the hierarchy of the computing resources, wherein each subset of computing resources is managed with a respective instance of the software component.

In Example B.64, the subject matter of any one of Examples B.48 to B.63 may include, wherein the plurality of respective instances of the software component are recursively and hierarchically instantiated.

In Example B.65, the subject matter of any one of Examples B.48 to B.64 may include, wherein ordering actions among the plurality of subsets of computing resources is performed in response to one or more of: an action completing, a plurality of actions completing, and a determination by the software component that the number actions to be executed is below a predetermined threshold.

In Example B.66, the subject matter of any one of Examples B.48 to B.65 may include, wherein at least a portion of the actions associated with a subset of computing resources are unordered.

In Example B.67, the subject matter of any one of Examples B.48 to B.66 may include, wherein the actions are statically associated and ordered for execution based on instructions received by the software component.

In Example B.68, the subject matter of any one of Examples B.48 to B.67 may include, wherein the actions are dynamically associated and ordered based on instructions received by the software component that describe one or more of: computing resource availability, computing resource proximity, costs of moving data operands from producers on which an action depends, a capability of a computing resource, and prioritizations in the instructions.

In Example B.69, the subject matter of any one of Examples B.48 to B.68 may include, where actions are dynamically associated and ordered according to a policy for distributing available actions on the computing resources in the hierarchy, wherein the policy describes one or more of: an exhaustive ordering of actions on the computing resources, a partial ordering of actions on the computing resources based on actions that have already been distributed to the computing resources but are still pending execution, and a partial ordering of actions based on actions left to be distributed.

In Example B.70, the subject matter of any one of Examples B.48 to B.69 may include, wherein dynamic association and ordering of actions includes: classifying pending actions according to a priority scheme that includes one or more of: user-specified priorities for specific actions, user-specified priorities for specific classes of actions, user-specified priorities; grouping the pending actions into a respective queue associated with each respective classification; and ordering the pending actions in each respective queue according to the respective classification for the respective queue.

In Example B.71, the subject matter of any one of Examples B.48 to B.70 may include, executing, by the software component, the ordered set of actions.

In Example B.72, the subject matter of any one of Examples B.48 to B.71 may include, wherein executing the ordered set of actions includes: receiving a query from a consumer of an operand regarding availability of data from a producer of the operand; transferring the data from the producer to the consumer in response to the produced data being available, wherein the query is received by one or more of: computing resources on which the producer actions execute, a software component running on computing resources on which the producer actions execute, and a centralized software component that tracks when actions have completed.

In Example B.73, the subject matter of any one of Examples B.48 to B.72 may include, wherein executing the ordered set of actions includes tracking, via an action that produces an operand, a consumer action that uses the produced operand, and transferring the data from the producer to the consumer in response to the produced data being available.

In Example B.74, the subject matter of any one of Examples B.48 to B.73 may include, wherein executing the ordered set of actions includes: attempting to execute, by the software component, an action from the ordered set of actions on a first subset of the computing resources; identifying, by the software component, a failure of the action to execute on the first subset of computing resources; and in response to identifying the failure, executing the action on a second subset of computing resources, wherein the first subset of computing resources and candidates for the second subset of computing resources are identified in a hierarchy of the computing resources received by the software component, and wherein the candidates for the second subset of computing resources are selected based on one or more of: a predetermined computing resource identified by input received by the software component a prioritized list of computing resources identified by input received by the software component, a proximate resource identified from a description of a hierarchy of the computing resources, an available computing resource, a computing resource whose capabilities enable the action to be completed sooner than another computing resource.

In Example B.75, the subject matter of any one of Examples B.48 to B.74 may include, wherein executing the ordered set of actions includes dynamically allocating and deallocating computing resources from the set of computing resources based on a demand for computing resources from the executed actions.

In Example B.76, the subject matter of any one of Examples B.48 to B.75 may include, presenting the ordered set of actions via one or more of: a computer program, an ordered sequence of application program interface calls, a set of comments for an executor software component, and a graphical display.

In Example B.77, the subject matter of any one of Examples B.48 to B.76 may include, wherein the plurality of computing resources includes one or more of: a host computing resource, a target computing resource, a central processing unit, a graphics processing unit, a field-programmable gate array, and a system-on-a-chip.

In Example B.78, the subject matter of any one of Examples B.48 to B.77 may include, wherein associating the set of actions and the data elements with the set of computing resources includes balancing loads across a plurality of memory computing sources by dynamically changing one or more of: a number of logical memory domains mapped to a physical memory domain, and a number of streams associated with a logical memory domain.

In Example B.79, the subject matter of any one of Examples B.48 to B.78 may include, receiving, by the software component, identification of a function callable by the software component for performing one or more of: modeling costs for computation, modeling costs for data communication, modeling costs for synchronization, modeling costs for resource re-configuration, distributing data, distributing actions, ordering actions, redistributing unscheduled actions onto alternate subsystems for execution, redistributing failed actions onto alternate subsystems for execution, transforming sets of actions that are pending distribution for execution, dynamic allocation of memory, dynamic selection of storage from a pool of pre-determined memory resources, selection of memory structures to use based on properties of a computation, data movement, data synchronization, and managing completion of actions that have been scheduled.

In Example B.80, the subject matter of any one of Examples B.48 to B.79 may include, wherein the function callable by the software component is for modeling costs based on one or more of the following characteristics: a number of elements in memory operands, a shape of memory operands, a layout of memory operands, capabilities of computing resources used to execute an action, characteristics of computing resources used to execute an action, a type of an interconnect used transmit data from a producer to its consumer, and a performance characteristic of an interconnect used transmit data from a producer to its consumer.

In Example B.81, the subject matter of any one of Examples B.48 to B.80 may include, wherein the characteristics for the function callable by the software component are provided by one or more of: a fixed table that is part of the software component, a user-supplied table, a table populated with profiling data collected from current and past executions, a fixed routine which evaluates a metric based on inputs and dynamic conditions, and a user-supplied routine which evaluates a metric based on inputs and dynamic conditions.

In Example B.82, the subject matter of any one of Examples B.48 to B.81 may include, wherein the function callable by the software component is for transforming sets of actions by performing one or more of: decomposition of an original action into a set of actions of finer granularity which cover functionality equivalent to the original action, aggregation of a set of actions into a single action of coarser granularity, conversion of an action from one implementation to another implementation of equivalent functionality, specialization of a set of actions into a simpler set of actions, and pre-work for a set of actions.

In Example B.83, the subject matter of any one of Examples B.48 to B.82 may include, wherein the function callable by the software component is for transforming sets of actions via aggregation based on one or more of: suitability and efficiency of aggregation for a particular computing target, similarity of computation among actions, size and shape of data, and locality of data.

In Example B.84, the subject matter of any one of Examples B.48 to B.83 may include, wherein function callable by the software component is for pre-work for a set of actions, and wherein the pre-work includes one or more of: error checking, selection of a particular implementation, pre-processing of a subset of available operands, preconditioning and reformatting of data, preparation for transmission of input operands, and preparation for transmission of output operands.

In Example B.85, the subject matter of any one of Examples B.48 to B.84 may include, wherein the function callable by the software component is for the specialization of a set of actions into a simpler set of actions, and wherein the specialization is performed based on one or more of: operands of the set of actions, conditions of the set of computing resources, a type of an action to be performed, characteristics of a computing resource on which an action is to be performed.

In Example B.86, the subject matter of any one of Examples B.48 to B.85 may include, wherein the function callable by the software component is for moving data from a source storage area to a destination storage area, and wherein the moved data is not contiguous.

In Example B.87, the subject matter of any one of Examples B.48 to B.86 may include, wherein the non-contiguous data is marshalled into a contiguous chunk of data at the source.

In Example B.88, the subject matter of any one of Examples B.48 to B.87 may include, wherein a contiguous superset of the data is sent to the destination and a subset of data is extracted at the destination.

In Example B.89, the subject matter of any one of Examples B.48 to B.88 may include, wherein the function callable by the software component is for moving data from a source storage area to a destination storage area, wherein the moved data is not contiguous, and non-contiguous data is marshalled using one or more of: a function provided by the tuner runtime, a function for optimizing performance and efficiency, a user-provided function for performing marshaling at the source, and a user-provided function for performing marshaling at the destination.

In Example B.90, the subject matter of any one of Examples B.48 to B.89 may include, wherein the non-contiguous data is marshalled using a function for optimizing performance and efficiency based on one or more of: data layout, data size and shape, a characteristic of a computing resource that is sending the data, and a characteristic of a computing resource that is receiving the data.

In Example B.91, the subject matter of any one of Examples B.48 to B.90 may include, wherein the data is moved from one source storage area to another destination storage area in response to one or more of: operands being generated by a producing action, on demand to a request by a consuming action for data, and optimization criteria being met, and wherein the optimization criteria includes one or more of: any communication link being available, a preferred communication link being available, a communication link being available that will minimize consumption of time, a communication link being available that will minimize consumption of energy, and buffering resources being available at a receiving end of a communications link.

In Example B.92, the subject matter of any one of Examples B.48 to B.91 may include, wherein associating the set of actions and the data elements with the set of computing resources includes selecting a hardware computing resource based on an identifier of the hardware computing resource received by the software component via one or more of: a file, an environment variable, an application programming interface, and a node identifier.

In Example B.93, the subject matter of any one of Examples B.48 to B.92 may include, wherein associating the set of actions and the data elements with the set of computing resources includes mapping a plurality of logical devices to hardware computing resources based on an order of occurrence of the hardware computing devices in the set of computing resources received by the software component.

In Example B.94, the subject matter of any one of Examples B.48 to B.93 may include, wherein associating the set of actions and the data elements with the set of computing resources includes selecting a memory computing resource from the set of computing resources, wherein the memory computing resource is selected based on one more of: a type of the memory computing resource, a size of memory to be used within the memory computing resource, and a current utilization of the memory computing resource.

Example B.95 includes subject matter including a computer-readable medium storing instructions that, when executed by a computer system, cause the computer system to: receive, by a software component operating on the computer system: a set of actions, an identification of a set of computing resources to associate with the set of actions, and a set of dependencies among the plurality of actions for executing the actions using the computing resources; associate the set of actions and data elements related to the set of actions, by the software component, with the set of computing resources; and order, by the software component, each respective action in the set of actions for execution on the computing resources.

In Example B.96, the subject matter of Example B.95 may include, wherein the plurality of actions include one or more of: a computing task, a data transfer task, and a synchronization task.

In Example B.97, the subject matter of any one of Examples B.95 to B.96 may include, wherein the medium further stores instructions for causing the computer system to receive, by the software component, a description of a hierarchy of the computing resources, and wherein the association of the set of actions and data elements with the computing resources and the ordering of the actions for execution on the computing resources are performed based on the hierarchy of computing resources.

In Example B.98, the subject matter of any one of Examples B.95 to B.97 may include, wherein association of the set of actions and data elements with the computing resources includes associating an action with a memory component from the set of computing resources, based on the hierarchy of the computing resources, to minimize a latency associated with accessing the memory component.

In Example B.99, the subject matter of any one of Examples B.95 to B.98 may include, wherein association of the set of actions and data elements with the computing resources includes mapping, based on the hierarchy of the computing resources, a set of logical memory domains across a plurality of physical memory components from the set of computing resources.

In Example B.100, the subject matter of any one of Examples B.95 to B.99 may include, wherein association of the set of actions and data elements with the computing resources includes localizing actions, based on the hierarchy of the computing resources, among a subset of the set of computing resources.

In Example B.101, the subject matter of any one of Examples B.95 to B.100 may include, wherein the description of the hierarchy of the computing resources includes an arrangement of computing resources, the arrangement one or more of: a group of central processing units, a plurality of groups of central processing units arranged as a stream, and groups of streams that share a memory domain.

In Example B.102, the subject matter of any one of Examples B.95 to B.101 may include, wherein the description of the hierarchy of the computing resources includes an arrangement of memory resources, the arrangement one or more of: an amount of memory for a type of memory resource, a partitioning of memory into variables, and tiles of variables.

In Example B.103, the subject matter of any one of Examples B.95 to B.102 may include, wherein the description of the hierarchy of the computing resources is received from one or more of: a discovery of the computing resources in the system, a specification in a file, a specification in environment variables, and a specification using APIs.

In Example B.104, the subject matter of any one of Examples B.95 to B.103 may include, wherein the identification of the set of computing resources includes an identifier for each computing resource, the identifier one or more of: an internet protocol address, a node name, a qualifier describing a communications fabric used to resource a particular set of computing resources, a qualifier that specifies a subset of computing resources to use within a node, and a qualifier that species a mode in which a subset of computing resources should operate.

In Example B.105, the subject matter of any one of Examples B.95 to B.104 may include, wherein a subset of the computing resources are identified with logical numbers, and the logical numbers define an ordered subsequence of the computing resources.

In Example B.106, the subject matter of any one of Examples B.95 to B.105 may include, wherein the identifiers of the computing resources include one or more: a memory type, an amount of a memory type that is used, and configuration information for a memory resource.

In Example B.107, the subject matter of any one of Examples B.95 to B.106 may include, wherein the identifier of the computing resources includes an amount of a memory type to be allocated based on an amount of memory that has been previously consumed.

In Example B.108, the subject matter of any one of Examples B.95 to B.107 may include, wherein the computing resources of the hierarchy are divided based on one or more of: an even distribution of computing resources among partitions of the hierarchy, and a distribution that balances capabilities of computing resources within partitions of the hierarchy.

In Example B.109, the subject matter of any one of Examples B.95 to B.108 may include, wherein the identification of the set of computing resources includes a number of memory buffers that are available for temporary use to be shared among computing tasks, and wherein allocation of the temporary buffers is one or more of: explicitly specified by the set of actions, and dynamically allocated by a runtime software component.

In Example B.110, the subject matter of any one of Examples B.95 to B.109 may include, wherein ordering the actions in the plurality of actions includes ordering the actions among a plurality of subsets of computing resources identified by the hierarchy of the computing resources, wherein each subset of computing resources is managed with a respective instance of the software component.

In Example B.111, the subject matter of any one of Examples B.95 to B.110 may include, wherein the plurality of respective instances of the software component are recursively and hierarchically instantiated.

In Example B.112, the subject matter of any one of Examples B.95 to B.111 may include, wherein ordering actions among the plurality of subsets of computing resources is performed in response to one or more of: an action completing, a plurality of actions completing, and a determination by the software component that the number actions to be executed is below a predetermined threshold.

In Example B.113, the subject matter of any one of Examples B.95 to B.112 may include, wherein at least a portion of the actions associated with a subset of computing resources are unordered.

In Example B.114, the subject matter of any one of Examples B.95 to B.113 may include, wherein the actions are statically associated and ordered for execution based on instructions received by the software component.

In Example B.115, the subject matter of any one of Examples B.95 to B.114 may include, wherein the actions are dynamically associated and ordered based on instructions received by the software component that describe one or more of: computing resource availability, computing resource proximity, costs of moving data operands from producers on which an action depends, a capability of a computing resource, and prioritizations in the instructions.

In Example B.116, the subject matter of any one of Examples B.95 to B.115 may include, where actions are dynamically associated and ordered according to a policy for distributing available actions on the computing resources in the hierarchy, wherein the policy describes one or more of: an exhaustive ordering of actions on the computing resources, a partial ordering of actions on the computing resources based on actions that have already been distributed to the computing resources but are still pending execution, and a partial ordering of actions based on actions left to be distributed.

In Example B.117, the subject matter of any one of Examples B.95 to B.116 may include, wherein dynamic association and ordering of actions includes: classifying pending actions according to a priority scheme that includes one or more of: user-specified priorities for specific actions, user-specified priorities for specific classes of actions, user-specified priorities; grouping the pending actions into a respective queue associated with each respective classification; and ordering the pending actions in each respective queue according to the respective classification for the respective queue.

In Example B.118, the subject matter of any one of Examples B.95 to B.117 may include, wherein the medium further stores instructions for causing the computer system to execute, by the software component, the ordered set of actions.

In Example B.119, the subject matter of any one of Examples B.95 to B.118 may include, wherein executing the ordered set of actions includes: receiving a query from a consumer of an operand regarding availability of data from a producer of the operand; transferring the data from the producer to the consumer in response to the produced data being available, wherein the query is received by one or more of: computing resources on which the producer actions execute, a software component running on computing resources on which the producer actions execute, and a centralized software component that tracks when actions have completed.

In Example B.120, the subject matter of any one of Examples B.95 to B.119 may include, wherein executing the ordered set of actions includes tracking, via an action that produces an operand, a consumer action that uses the produced operand, and transferring the data from the producer to the consumer in response to the produced data being available.

In Example B.121, the subject matter of any one of Examples B.95 to B.120 may include, wherein executing the ordered set of actions includes: attempting to execute, by the software component, an action from the ordered set of actions on a first subset of the computing resources; identifying, by the software component, a failure of the action to execute on the first subset of computing resources; and in response to identifying the failure, executing the action on a second subset of computing resources, wherein the first subset of computing resources and candidates for the second subset of computing resources are identified in a hierarchy of the computing resources received by the software component, and wherein the candidates for the second subset of computing resources are selected based on one or more of: a predetermined computing resource identified by input received by the software component a prioritized list of computing resources identified by input received by the software component, a proximate resource identified from a description of a hierarchy of the computing resources, an available computing resource, a computing resource whose capabilities enable the action to be completed sooner than another computing resource.

In Example B.122, the subject matter of any one of Examples B.95 to B.121 may include, wherein executing the ordered set of actions includes dynamically allocating and deallocating computing resources from the set of computing resources based on a demand for computing resources from the executed actions.

In Example B.123, the subject matter of any one of Examples B.95 to B.122 may include, wherein the medium further stores instructions for causing the computer system to present the ordered set of actions via one or more of: a computer program, an ordered sequence of application program interface calls, a set of comments for an executor software component, and a graphical display.

In Example B.124, the subject matter of any one of Examples B.95 to B.123 may include, wherein the plurality of computing resources includes one or more of: a host computing resource, a target computing resource, a central processing unit, a graphics processing unit, a field-programmable gate array, and a system-on-a-chip.

In Example B.125, the subject matter of any one of Examples B.95 to B.124 may include, wherein associating the set of actions and the data elements with the set of computing resources includes balancing loads across a plurality of memory computing sources by dynamically changing one or more of: a number of logical memory domains mapped to a physical memory domain, and a number of streams associated with a logical memory domain.

In Example B.126, the subject matter of any one of Examples B.95 to B.125 may include, wherein the medium further stores instructions for causing the computer system to receive, by the software component, identification of a function callable by the software component for performing one or more of: modeling costs for computation, modeling costs for data communication, modeling costs for synchronization, modeling costs for resource re-configuration, distributing data, distributing actions, ordering actions, redistributing unscheduled actions onto alternate subsystems for execution, redistributing failed actions onto alternate subsystems for execution, transforming sets of actions that are pending distribution for execution, dynamic allocation of memory, dynamic selection of storage from a pool of pre-determined memory resources, selection of memory structures to use based on properties of a computation, data movement, data synchronization, and managing completion of actions that have been scheduled.

In Example B.127, the subject matter of any one of Examples B.95 to B.126 may include, wherein the function callable by the software component is for modeling costs based on one or more of the following characteristics: a number of elements in memory operands, a shape of memory operands, a layout of memory operands, capabilities of computing resources used to execute an action, characteristics of computing resources used to execute an action, a type of an interconnect used transmit data from a producer to its consumer, and a performance characteristic of an interconnect used transmit data from a producer to its consumer.

In Example B.128, the subject matter of any one of Examples B.95 to B.127 may include, wherein the characteristics for the function callable by the software component are provided by one or more: a fixed table that is part of the software component, a user-supplied table, a table populated with profiling data collected from current and past executions, a fixed routine which evaluates a metric based on inputs and dynamic conditions, and a user-supplied routine which evaluates a metric based on inputs and dynamic conditions.

In Example B.129, the subject matter of any one of Examples B.95 to B.128 may include, wherein the function callable by the software component is for transforming sets of actions by performing one or more of: decomposition of an original action into a set of actions of finer granularity which cover functionality equivalent to the original action, aggregation of a set of actions into a single action of coarser granularity, conversion of an action from one implementation to another implementation of equivalent functionality, specialization of a set of actions into a simpler set of actions, and pre-work for a set of actions.

In Example B.130, the subject matter of any one of Examples B.95 to B.129 may include, wherein the function callable by the software component is for transforming sets of actions via aggregation based on one or more of: suitability and efficiency of aggregation for a particular computing target, similarity of computation among actions, size and shape of data, and locality of data.

In Example B.131, the subject matter of any one of Examples B.95 to B.130 may include, wherein function callable by the software component is for pre-work for a set of actions, and wherein the pre-work includes one or more of: error checking, selection of a particular implementation, pre-processing of a subset of available operands, preconditioning and reformatting of data, preparation for transmission of input operands, and preparation for transmission of output operands.

In Example B.132, the subject matter of any one of Examples B.95 to B.131 may include, wherein the function callable by the software component is for the specialization of a set of actions into a simpler set of actions, and wherein the specialization is performed based on one or more of: operands of the set of actions, conditions of the set of computing resources, a type of an action to be performed, characteristics of a computing resource on which an action is to be performed.

In Example B.133, the subject matter of any one of Examples B.95 to B.132 may include, wherein the function callable by the software component is for moving data from a source storage area to a destination storage area, and wherein the moved data is not contiguous.

In Example B.134, the subject matter of any one of Examples B.95 to B.133 may include, wherein the non-contiguous data is marshalled into a contiguous chunk of data at the source.

In Example B.135, the subject matter of any one of Examples B.95 to B.134 may include, wherein a contiguous superset of the data is sent to the destination and a subset of data is extracted at the destination.

In Example B.136, the subject matter of any one of Examples B.95 to B.135 may include, wherein the function callable by the software component is for moving data from a source storage area to a destination storage area, wherein the moved data is not contiguous, and non-contiguous data is marshalled using one or more of: a function provided by the tuner runtime, a function for optimizing performance and efficiency, a user-provided function for performing marshaling at the source, and a user-provided function for performing marshaling at the destination.

In Example B.137, the subject matter of any one of Examples B.95 to B.136 may include, wherein the non-contiguous data is marshalled using a function for optimizing performance and efficiency based on one or more of: data layout, data size and shape, a characteristic of a computing resource that is sending the data, and a characteristic of a computing resource that is receiving the data.

In Example B.138, the subject matter of any one of Examples B.95 to B.137 may include, wherein the data is moved from one source storage area to another destination storage area in response to one or more of: operands being generated by a producing action, on demand to a request by a consuming action for data, and optimization criteria being met, and wherein the optimization criteria includes one or more of: any communication link being available, a preferred communication link being available, a communication link being available that will minimize consumption of time, a communication link being available that will minimize consumption of energy, and buffering resources being available at a receiving end of a communications link.

In Example B.139, the subject matter of any one of Examples B.95 to B.138 may include, wherein associating the set of actions and the data elements with the set of computing resources includes selecting a hardware computing resource based on an identifier of the hardware computing resource received by the software component via one or more of: a file, an environment variable, an application programming interface, and a node identifier.

In Example B.140, the subject matter of any one of Examples B.95 to B.139 may include, wherein associating the set of actions and the data elements with the set of computing resources includes mapping a plurality of logical devices to hardware computing resources based on an order of occurrence of the hardware computing devices in the set of computing resources received by the software component.

In Example B.141, the subject matter of any one of Examples B.95 to B.140 may include, wherein associating the set of actions and the data elements with the set of computing resources includes selecting a memory computing resource from the set of computing resources, wherein the memory computing resource is selected based on one more of: a type of the memory computing resource, a size of memory to be used within the memory computing resource, and a current utilization of the memory computing resource.

Example B.142 includes subject matter (such as a device, apparatus, or machine) comprising: means for receiving: a set of actions, an identification of a set of computing resources to associate with the set of actions, and a set of dependencies among the plurality of actions for executing the actions using the computing resources; means for associating the set of actions and data elements related to the set of actions, by the software component, with the set of computing resources; and means for ordering each respective action in the set of actions for execution on the computing resources.

In Example B.143, the subject matter of Example B.142 may include, wherein the plurality of actions include one or more of: a computing task, a data transfer task, and a synchronization task.

In Example B.144, the subject matter of any one of Examples B.142 to B.143 may include, means for receiving a description of a hierarchy of the computing resources, and wherein the association of the set of actions and data elements with the computing resources and the ordering of the actions for execution on the computing resources are performed based on the hierarchy of computing resources.

In Example B.145, the subject matter of any one of Examples B.142 to B.144 may include, wherein association of the set of actions and data elements with the computing resources includes associating an action with a memory component from the set of computing resources, based on the hierarchy of the computing resources, to minimize a latency associated with accessing the memory component.

In Example B.146, the subject matter of any one of Examples B.142 to B.145 may include, wherein association of the set of actions and data elements with the computing resources includes mapping, based on the hierarchy of the computing resources, a set of logical memory domains across a plurality of physical memory components from the set of computing resources.

In Example B.147, the subject matter of any one of Examples B.142 to B.146 may include, wherein association of the set of actions and data elements with the computing resources includes localizing actions, based on the hierarchy of the computing resources, among a subset of the set of computing resources.

In Example B.148, the subject matter of any one of Examples B.142 to B.147 may include, wherein the description of the hierarchy of the computing resources includes an arrangement of computing resources, the arrangement one or more of: a group of central processing units, a plurality of groups of central processing units arranged as a stream, and groups of streams that share a memory domain.

In Example B.149, the subject matter of any one of Examples B.142 to B.148 may include, wherein the description of the hierarchy of the computing resources includes an arrangement of memory resources, the arrangement one or more of: an amount of memory for a type of memory resource, a partitioning of memory into variables, and tiles of variables.

In Example B.150, the subject matter of any one of Examples B.142 to B.149 may include, wherein the description of the hierarchy of the computing resources is received from one or more of: a discovery of the computing resources in the system, a specification in a file, a specification in environment variables, and a specification using APIs.

In Example B.151, the subject matter of any one of Examples B.142 to B.150 may include, wherein the identification of the set of computing resources includes an identifier for each computing resource, the identifier one or more of: an internet protocol address, a node name, a qualifier describing a communications fabric used to resource a particular set of computing resources, a qualifier that specifies a subset of computing resources to use within a node, and a qualifier that species a mode in which a subset of computing resources should operate.

In Example B.152, the subject matter of any one of Examples B.142 to B.151 may include, wherein a subset of the computing resources are identified with logical numbers, and the logical numbers define an ordered subsequence of the computing resources.

In Example B.153, the subject matter of any one of Examples B.142 to B.152 may include, wherein the identifiers of the computing resources include one or more: a memory type, an amount of a memory type that is used, and configuration information for a memory resource.

In Example B.154, the subject matter of any one of Examples B.142 to B.153 may include, wherein the identifier of the computing resources includes an amount of a memory type to be allocated based on an amount of memory that has been previously consumed.

In Example B.155, the subject matter of any one of Examples B.142 to B.154 may include, wherein the computing resources of the hierarchy are divided based on one or more of: an even distribution of computing resources among partitions of the hierarchy, and a distribution that balances capabilities of computing resources within partitions of the hierarchy.

In Example B.156, the subject matter of any one of Examples B.142 to B.155 may include, wherein the identification of the set of computing resources includes a number of memory buffers that are available for temporary use to be shared among computing tasks, and wherein allocation of the temporary buffers is one or more of: explicitly specified by the set of actions, and dynamically allocated by a runtime software component.

In Example B.157, the subject matter of any one of Examples B.142 to B.156 may include, wherein ordering the actions in the plurality of actions includes ordering the actions among a plurality of subsets of computing resources identified by the hierarchy of the computing resources, wherein each subset of computing resources is managed with a respective instance of the software component.

In Example B.158, the subject matter of any one of Examples B.142 to B.157 may include, wherein the plurality of respective instances of the software component are recursively and hierarchically instantiated.

In Example B.159, the subject matter of any one of Examples B.142 to B.158 may include, wherein ordering actions among the plurality of subsets of computing resources is performed in response to one or more of: an action completing, a plurality of actions completing, and a determination by the software component that the number actions to be executed is below a predetermined threshold.

In Example B.160, the subject matter of any one of Examples B.142 to B.159 may include, wherein at least a portion of the actions associated with a subset of computing resources are unordered.

In Example B.161, the subject matter of any one of Examples B.142 to B.160 may include, wherein the actions are statically associated and ordered for execution based on instructions received by the software component.

In Example B.162, the subject matter of any one of Examples B.142 to B.161 may include, wherein the actions are dynamically associated and ordered based on instructions received by the software component that describe one or more of: computing resource availability, computing resource proximity, costs of moving data operands from producers on which an action depends, a capability of a computing resource, and prioritizations in the instructions.

In Example B.163, the subject matter of any one of Examples B.142 to B.162 may include, where actions are dynamically associated and ordered according to a policy for distributing available actions on the computing resources in the hierarchy, wherein the policy describes one or more of: an exhaustive ordering of actions on the computing resources, a partial ordering of actions on the computing resources based on actions that have already been distributed to the computing resources but are still pending execution, and a partial ordering of actions based on actions left to be distributed.

In Example B.164, the subject matter of any one of Examples B.142 to B.163 may include, wherein dynamic association and ordering of actions includes: classifying pending actions according to a priority scheme that includes one or more of: user-specified priorities for specific actions, user-specified priorities for specific classes of actions, user-specified priorities; grouping the pending actions into a respective queue associated with each respective classification; and ordering the pending actions in each respective queue according to the respective classification for the respective queue.

In Example B.165, the subject matter of any one of Examples B.142 to B.164 may include, means for executing the ordered set of actions.

In Example B.166, the subject matter of any one of Examples B.142 to B.165 may include, wherein executing the ordered set of actions includes: receiving a query from a consumer of an operand regarding availability of data from a producer of the operand; transferring the data from the producer to the consumer in response to the produced data being available, wherein the query is received by one or more of: computing resources on which the producer actions execute, a software component running on computing resources on which the producer actions execute, and a centralized software component that tracks when actions have completed.

In Example B.167, the subject matter of any one of Examples B.142 to B.166 may include, wherein executing the ordered set of actions includes tracking, via an action that produces an operand, a consumer action that uses the produced operand, and transferring the data from the producer to the consumer in response to the produced data being available.

In Example B.168, the subject matter of any one of Examples B.142 to B.167 may include, wherein executing the ordered set of actions includes: attempting to execute, by the software component, an action from the ordered set of actions on a first subset of the computing resources; identifying, by the software component, a failure of the action to execute on the first subset of computing resources; and in response to identifying the failure, executing the action on a second subset of computing resources, wherein the first subset of computing resources and candidates for the second subset of computing resources are identified in a hierarchy of the computing resources received by the software component, and wherein the candidates for the second subset of computing resources are selected based on one or more of: a predetermined computing resource identified by input received by the software component a prioritized list of computing resources identified by input received by the software component, a proximate resource identified from a description of a hierarchy of the computing resources, an available computing resource, a computing resource whose capabilities enable the action to be completed sooner than another computing resource.

In Example B.169, the subject matter of any one of Examples B.142 to B.168 may include, wherein executing the ordered set of actions includes dynamically allocating and deallocating computing resources from the set of computing resources based on a demand for computing resources from the executed actions.

In Example B.170, the subject matter of any one of Examples B.142 to B.169 may include, means for presenting the ordered set of actions via one or more of: a computer program, an ordered sequence of application program interface calls, a set of comments for an executor software component, and a graphical display.

In Example B.171, the subject matter of any one of Examples B.142 to B.170 may include, wherein the plurality of computing resources includes one or more of: a host computing resource, a target computing resource, a central processing unit, a graphics processing unit, a field-programmable gate array, and a system-on-a-chip.

In Example B.172, the subject matter of any one of Examples B.142 to B.171 may include, wherein associating the set of actions and the data elements with the set of computing resources includes balancing loads across a plurality of memory computing sources by dynamically changing one or more of: a number of logical memory domains mapped to a physical memory domain, and a number of streams associated with a logical memory domain.

In Example B.173, the subject matter of any one of Examples B.142 to B.172 may include, means for receiving identification of a function for performing one or more of: modeling costs for computation, modeling costs for data communication, modeling costs for synchronization, modeling costs for resource re-configuration, distributing data, distributing actions, ordering actions, redistributing unscheduled actions onto alternate subsystems for execution, redistributing failed actions onto alternate subsystems for execution, transforming sets of actions that are pending distribution for execution, dynamic allocation of memory, dynamic selection of storage from a pool of pre-determined memory resources, selection of memory structures to use based on properties of a computation, data movement, data synchronization, and managing completion of actions that have been scheduled.

In Example B.174, the subject matter of any one of Examples B.142 to B.173 may include, wherein the function is for modeling costs based on one or more of the following characteristics: a number of elements in memory operands, a shape of memory operands, a layout of memory operands, capabilities of computing resources used to execute an action, characteristics of computing resources used to execute an action, a type of an interconnect used transmit data from a producer to its consumer, and a performance characteristic of an interconnect used transmit data from a producer to its consumer.

In Example B.175, the subject matter of any one of Examples B.142 to B.174 may include, wherein the characteristics for the function are provided by one or more: a fixed table that is part of the software component, a user-supplied table, a table populated with profiling data collected from current and past executions, a fixed routine which evaluates a metric based on inputs and dynamic conditions, and a user-supplied routine which evaluates a metric based on inputs and dynamic conditions.

In Example B.176, the subject matter of any one of Examples B.142 to B.175 may include, wherein the function is for transforming sets of actions by performing one or more of: decomposition of an original action into a set of actions of finer granularity which cover functionality equivalent to the original action, aggregation of a set of actions into a single action of coarser granularity, conversion of an action from one implementation to another implementation of equivalent functionality, specialization of a set of actions into a simpler set of actions, and pre-work for a set of actions.

In Example B.177, the subject matter of any one of Examples B.142 to B.176 may include, wherein the function is for transforming sets of actions via aggregation based on one or more of: suitability and efficiency of aggregation for a particular computing target, similarity of computation among actions, size and shape of data, and locality of data.

In Example B.178, the subject matter of any one of Examples B.142 to B.177 may include, wherein function is for pre-work for a set of actions, and wherein the pre-work includes one or more of: error checking, selection of a particular implementation, pre-processing of a subset of available operands, preconditioning and reformatting of data, preparation for transmission of input operands, and preparation for transmission of output operands.

In Example B.179, the subject matter of any one of Examples B.142 to B.178 may include, wherein the function is for the specialization of a set of actions into a simpler set of actions, and wherein the specialization is performed based on one or more of: operands of the set of actions, conditions of the set of computing resources, a type of an action to be performed, characteristics of a computing resource on which an action is to be performed.

In Example B.180, the subject matter of any one of Examples B.142 to B.179 may include, wherein the function is for moving data from a source storage area to a destination storage area, and wherein the moved data is not contiguous.

In Example B.181, the subject matter of any one of Examples B.142 to B.180 may include, wherein the non-contiguous data is marshalled into a contiguous chunk of data at the source.

In Example B.182, the subject matter of any one of Examples B.142 to B.181 may include, wherein a contiguous superset of the data is sent to the destination and a subset of data is extracted at the destination.

In Example B.183, the subject matter of any one of Examples B.142 to B.182 may include, wherein the function is for moving data from a source storage area to a destination storage area, wherein the moved data is not contiguous, and non-contiguous data is marshalled using one or more of: a function provided by the tuner runtime, a function for optimizing performance and efficiency, a user-provided function for performing marshaling at the source, and a user-provided function for performing marshaling at the destination.

In Example B.184, the subject matter of any one of Examples B.142 to B.183 may include, wherein the non-contiguous data is marshalled using a function for optimizing performance and efficiency based on one or more of: data layout, data size and shape, a characteristic of a computing resource that is sending the data, and a characteristic of a computing resource that is receiving the data.

In Example B.185, the subject matter of any one of Examples B.142 to B.184 may include, wherein the data is moved from one source storage area to another destination storage area in response to one or more of: operands being generated by a producing action, on demand to a request by a consuming action for data, and optimization criteria being met, and wherein the optimization criteria includes one or more of: any communication link being available, a preferred communication link being available, a communication link being available that will minimize consumption of time, a communication link being available that will minimize consumption of energy, and buffering resources being available at a receiving end of a communications link.

In Example B.186, the subject matter of any one of Examples B.142 to B.185 may include, wherein associating the set of actions and the data elements with the set of computing resources includes selecting a hardware computing resource based on an identifier of the hardware computing resource received via one or more of: a file, an environment variable, an application programming interface, and a node identifier.

In Example B.187, the subject matter of any one of Examples B.142 to B.186 may include, wherein associating the set of actions and the data elements with the set of computing resources includes mapping a plurality of logical devices to hardware computing resources based on an order of occurrence of the hardware computing devices in the received set of computing resources.

In Example B.188, the subject matter of any one of Examples B.142 to B.187 may include, wherein associating the set of actions and the data elements with the set of computing resources includes selecting a memory computing resource from the set of computing resources, wherein the memory computing resource is selected based on one more of: a type of the memory computing resource, a size of memory to be used within the memory computing resource, and a current utilization of the memory computing resource.

Example B.189 includes at least one computer-readable medium storing instructions for causing a computer system to perform the method of any of the Examples B.48-B.94.

Example B.190 includes a system comprising means for performing the method of any of the Examples B.49-B.94.

Example C.1 includes subject matter (such as a device, apparatus, or machine) comprising: a processor; and memory coupled to the processor and storing instructions that, when executed by the processor, cause the system to: receive, by a software component operating on the system, via an application programming interface, instructions regarding a callee function that include a description of properties associated with arguments for the callee function; create a persistent representation of the callee function, by the software component, based on the received description of the callee function; receive, by the software component via the application programming interface, instructions from a source describing a set of properties for a data collection; create a persistent representation of the data collection, by the software component, based on the set of properties for the data collection; receive, by the software component via the application programming interface, an updated property for the data collection; and in response to receiving the updated property for the data collection: update the persistent representation of the callee function, by the software component, by associating the persistent representation of the callee function with the updated property of the data collection; and update the persistent representation of the data collection, by the software component, by associating the persistent representation the data collection with the updated property of the data collection.

In Example C.2, the subject matter of Example C.1 may include, wherein the data collection is an operand of an action that includes one or more of: a computing task, a data transfer task, and a synchronization task.

In Example C.3, the subject matter of any one of Examples C.1 to C.2 may include, wherein the data collection includes one or more of: a variable, a buffer, and an array.

In Example C.4, the subject matter of any one of Examples C.1 to C.3 may include, wherein the set of properties for the data collection are selected from one or more of: a memory buffer that subsumes the data collection and that persists the properties of that data collection, a caller of the callee function, and a callee of the callee function.

In Example C.5, the subject matter of any one of Examples C.1 to C.4 may include, wherein the description of the properties associated with arguments for the callee function is received from an interface that is one or more of: part of a declaration of the callee function, a wrapper function around the callee function that adds descriptive parameters, and a function that registers properties of the callee function and the callee function's arguments.

In Example C.6, the subject matter of any one of Examples C.1 to C.5 may include, wherein the description of the properties associated with arguments for the callee function includes one or more of: descriptions that are applied to the callee function as a whole, and descriptions that are applied to individual parameters that serve as operands to the callee function.

In Example C.7, the subject matter of any one of Examples C.1 to C.6 may include, wherein the set of properties for the data collection are based on: the persistent representation of the data collection, the persistent representation of the callee function, and a data collection associated with an operand of a caller function.

In Example C.8, the subject matter of any one of Examples C.1 to C.7 may include, wherein the memory further stores instructions for causing the system to: determine whether the data collection is writeable; and based on the determination whether the data collection is writeable, determine an optimization including one or more of: executing a first action that refers to the data collection concurrently with a second action that only reads the data collection, and marking the data collection as modified to indicate the data collection is in need of being written back to memory and transferred to consumers of data from the data collection.

In Example C.9, the subject matter of any one of Examples C.1 to C.8 may include, wherein operands associated with the data collection are inferred to be read only in response to a declaration that the data collection is never writeable by one or more of: the description of properties associated with arguments for the callee function, the set of properties for the data collection, and properties specified by a caller function for an operand that corresponds to the data collection.

In Example C.10, the subject matter of any one of Examples C.1 to C.9 may include, wherein updating the properties of the data collection includes enforcing the properties of the data collection for a single use of the data collection.

In Example C.11, the subject matter of any one of Examples C.1 to C.10 may include, wherein updating the properties of the data collection is performed in response to a referencing of an operand associated with an action.

In Example C.12, the subject matter of any one of Examples C.1 to C.11 may include, wherein updating the properties of the data collection further includes tracking a series of updates to the data collection.

In Example C.13, the subject matter of any one of Examples C.1 to C.12 may include, wherein updating the properties of the data collection is performed in response to a request to modify the properties of the data collection received via the application programming interface, wherein properties classified as mutable are permitted to be updated, and properties classified as immutable, will produce an error, by the software component, in response to an attempt to update the immutable properties.

In Example C.14, the subject matter of any one of Examples C.1 to C.13 may include, wherein the memory further stores instructions for causing the system to: receive, by the software component via the application programming interface, a query regarding the properties of the data collection; and in response to the query, transmit the properties of the data collection via the application programming interface.

In Example C.15, the subject matter of any one of Examples C.1 to C.14 may include, wherein the memory further stores instructions for causing the system to: receive, by the software component via the application programming interface, a query regarding an operand associated with an action; and in response to the query, transmit information pertaining to the operand via the application programming interface.

In Example C.16, the subject matter of any one of Examples C.1 to C.15 may include, wherein the operand is associated with a computing task, and the information pertaining to the operand includes a total number of data collections associated with the computing task.

In Example C.17, the subject matter of any one of Examples C.1 to C.16 may include, wherein the operand is associated with a computing task, and the information pertaining to the operand provides data layout information that includes the number of dimensions, size, shape, arrangement, stride, regularity and sparsity of data collections specified by the operand.

In Example C.18, the subject matter of any one of Examples C.1 to C.17 may include, wherein the memory further stores instructions for causing the system to derive information regarding the data collection.

In Example C.19, the subject matter of any one of Examples C.1 to C.18 may include, wherein deriving information regarding the data collection includes generating a description for a plurality of data collections within the data collection.

In Example C.20, the subject matter of any one of Examples C.1 to C.19 may include, wherein information is derived for a first data collection and a second data collection, and wherein the information derived for the first data collection and the second data collection includes one of: a determination that the first and second data collections do not overlap, a determination that the first and second data collections match exactly, a determination that the first data collection subsumes the second data collection, and a determination that the first and second data collections partially overlap.

In Example C.21, the subject matter of any one of Examples C.1 to C.20 may include, wherein the set of properties for the data collection include one or more of: writeability of the data collection, whether local storage needs to be updated on a write, whether a partial result needs to be combined with other distributed operations, whether access is atomic, whether access requires strict ordering, a reference pattern, a hardware characteristic, a type of memory associated with the data collection, a memory allocation policy, a size of the data collection, and a state of the data collection.

In Example C.22, the subject matter of any one of Examples C.1 to C.21 may include, wherein the set of properties for the data collection includes a list of logical domains in which the data collection is instantiated.

In Example C.23, the subject matter of any one of Examples C.1 to C.22 may include, wherein the set of properties for the data collection describe a plurality of logical instances for the data collection mapped to a single physical memory space.

In Example C.24, the subject matter of any one of Examples C.1 to C.23 may include, wherein the set of properties for the data collection identify a logical instance from a plurality of logical instances for the data collection that contains a last-written version of data.

In Example C.25, the subject matter of any one of Examples C.1 to C.24 may include, wherein the set of properties for the data collection indicate whether a new instance of the data collection should be added in response to a logical domain being added.

In Example C.26, the subject matter of any one of Examples C.1 to C.25 may include, wherein the set of properties for the data collection identifies a software routine for handling non-contiguous data in the data collection.

In Example C.27, the subject matter of any one of Examples C.1 to C.26 may include, wherein creating the data collection includes pre-pinning a portion of memory in the data collection based on the instructions.

In Example C.28, the subject matter of any one of Examples C.1 to C.27 may include, wherein updating the properties of the data collection includes dynamically pinning a portion of memory in the data collection based on the instructions describing the set of properties for the data collection.

Example C.29 includes subject matter (such as a method, means for performing acts, machine readable medium including instructions that when performed by a machine cause the machine to performs acts, or an apparatus to perform) comprising: receiving, by a software component operating on a computer system, via an application programming interface, instructions regarding a callee function that include a description of properties associated with arguments for the callee function; creating a persistent representation of the callee function, by the software component, based on the received description of the callee function; receiving, by the software component via the application programming interface, instructions from a source describing a set of properties for a data collection; creating a persistent representation of the data collection, by the software component, based on the set of properties for the data collection; receiving, by the software component via the application programming interface, an updated property for the data collection; and in response to receiving the updated property for the data collection: updating the persistent representation of the callee function, by the software component, by associating the persistent representation of the callee function with the updated property of the data collection; and updating the persistent representation of the data collection, by the software component, by associating the persistent representation the data collection with the updated property of the data collection.

In Example C.30, the subject matter of Example C.29 may include, wherein the data collection is an operand of an action that includes one or more of: a computing task, a data transfer task, and a synchronization task.

In Example C.31, the subject matter of any one of Examples C.29 to C.30 may include, wherein the data collection includes one or more of: a variable, a buffer, and an array.

In Example C.32, the subject matter of any one of Examples C.29 to C.31 may include, wherein the set of properties for the data collection are selected from one or more of: a memory buffer that subsumes the data collection and that persists the properties of that data collection, a caller of the callee function, and a callee of the callee function.

In Example C.33, the subject matter of any one of Examples C.29 to C.32 may include, wherein the description of the properties associated with arguments for the callee function is received from an interface that is one or more of: part of a declaration of the callee function, a wrapper function around the callee function that adds descriptive parameters, and a function that registers properties of the callee function and the callee function's arguments.

In Example C.34, the subject matter of any one of Examples C.29 to C.33 may include, wherein the description of the properties associated with arguments for the callee function includes one or more of: descriptions that are applied to the callee function as a whole, and descriptions that are applied to individual parameters that serve as operands to the callee function.

In Example C.35, the subject matter of any one of Examples C.29 to C.34 may include, wherein the set of properties for the data collection are based on: the persistent representation of the data collection, the persistent representation of the callee function, and a data collection associated with an operand of a caller function.

In Example C.36, the subject matter of any one of Examples C.29 to C.35 may include, determining whether the data collection is writeable; and based on the determination whether the data collection is writeable, determining an optimization including one or more of: executing a first action that refers to the data collection concurrently with a second action that only reads the data collection, and marking the data collection as modified to indicate the data collection is in need of being written back to memory and transferred to consumers of data from the data collection.

In Example C.37, the subject matter of any one of Examples C.29 to C.36 may include, wherein operands associated with the data collection are inferred to be read only in response to a declaration that the data collection is never writeable by one or more of: the description of properties associated with arguments for the callee function, the set of properties for the data collection, and properties specified by a caller function for an operand that corresponds to the data collection.

In Example C.38, the subject matter of any one of Examples C.29 to C.37 may include, wherein updating the properties of the data collection includes enforcing the properties of the data collection for a single use of the data collection.

In Example C.39, the subject matter of any one of Examples C.29 to C.38 may include, wherein updating the properties of the data collection is performed in response to a referencing of an operand associated with an action.

In Example C.40, the subject matter of any one of Examples C.29 to C.39 may include, wherein updating the properties of the data collection further includes tracking a series of updates to the data collection.

In Example C.41, the subject matter of any one of Examples C.29 to C.40 may include, wherein updating the properties of the data collection is performed in response to a request to modify the properties of the data collection received via the application programming interface, wherein properties classified as mutable are permitted to be updated, and properties classified as immutable, will produce an error, by the software component, in response to an attempt to update the immutable properties.

In Example C.42, the subject matter of any one of Examples C.29 to C.41 may include, receiving, by the software component via the application programming interface, a query regarding the properties of the data collection; and in response to the query, transmitting the properties of the data collection via the application programming interface.

In Example C.43, the subject matter of any one of Examples C.29 to C.42 may include, receiving, by the software component via the application programming interface, a query regarding an operand associated with an action; and in response to the query, transmitting information pertaining to the operand via the application programming interface.

In Example C.44, the subject matter of any one of Examples C.29 to C.43 may include, wherein the operand is associated with a computing task, and the information pertaining to the operand includes a total number of data collections associated with the computing task.

In Example C.45, the subject matter of any one of Examples C.29 to C.44 may include, wherein the operand is associated with a computing task, and the information pertaining to the operand provides data layout information that includes the number of dimensions, size, shape, arrangement, stride, regularity and sparsity of data collections specified by the operand.

In Example C.46, the subject matter of any one of Examples C.29 to C.45 may include, deriving information regarding the data collection.

In Example C.47, the subject matter of any one of Examples C.29 to C.46 may include, wherein deriving information regarding the data collection includes generating a description for a plurality of data collections within the data collection.

In Example C.48, the subject matter of any one of Examples C.29 to C.47 may include, wherein information is derived for a first data collection and a second data collection, and wherein the information derived for the first data collection and the second data collection includes one of: a determination that the first and second data collections do not overlap, a determination that the first and second data collections match exactly, a determination that the first data collection subsumes the second data collection, and a determination that the first and second data collections partially overlap.

In Example C.49, the subject matter of any one of Examples C.29 to C.48 may include, wherein the set of properties for the data collection include one or more of: writeability of the data collection, whether local storage needs to be updated on a write, whether a partial result needs to be combined with other distributed operations, whether access is atomic, whether access requires strict ordering, a reference pattern, a hardware characteristic, a type of memory associated with the data collection, a memory allocation policy, a size of the data collection, and a state of the data collection.

In Example C.50, the subject matter of any one of Examples C.29 to C.49 may include, wherein the set of properties for the data collection includes a list of logical domains in which the data collection is instantiated.

In Example C.51, the subject matter of any one of Examples C.29 to C.50 may include, wherein the set of properties for the data collection describe a plurality of logical instances for the data collection mapped to a single physical memory space.

In Example C.52, the subject matter of any one of Examples C.29 to C.51 may include, wherein the set of properties for the data collection identify a logical instance from a plurality of logical instances for the data collection that contains a last-written version of data.

In Example C.53, the subject matter of any one of Examples C.29 to C.52 may include, wherein the set of properties for the data collection indicate whether a new instance of the data collection should be added in response to a logical domain being added.

In Example C.54, the subject matter of any one of Examples C.29 to C.53 may include, wherein the set of properties for the data collection identifies a software routine for handling non-contiguous data in the data collection.

In Example C.55, the subject matter of any one of Examples C.29 to C.54 may include, wherein creating the data collection includes pre-pinning a portion of memory in the data collection based on the instructions.

In Example C.56, the subject matter of any one of Examples C.29 to C.55 may include, wherein updating the properties of the data collection includes dynamically pinning a portion of memory in the data collection based on the instructions describing the set of properties for the data collection.

Example C.57 includes subject matter including a computer-readable medium storing instructions that, when executed by a computer system, cause the computer system to: receive, by a software component operating on the computer system, via an application programming interface, instructions regarding a callee function that include a description of properties associated with arguments for the callee function; create a persistent representation of the callee function, by the software component, based on the received description of the callee function; receive, by the software component via the application programming interface, instructions from a source describing a set of properties for a data collection; create a persistent representation of the data collection, by the software component, based on the set of properties for the data collection; receive, by the software component via the application programming interface, an updated property for the data collection; and in response to receiving the updated property for the data collection: update the persistent representation of the callee function, by the software component, by associating the persistent representation of the callee function with the updated property of the data collection; and update the persistent representation of the data collection, by the software component, by associating the persistent representation the data collection with the updated property of the data collection.

In Example C.58, the subject matter of Example C.57 may include, wherein the data collection is an operand of an action that includes one or more of: a computing task, a data transfer task, and a synchronization task.

In Example C.59, the subject matter of any one of Examples C.57 to C.58 may include, wherein the data collection includes one or more of: a variable, a buffer, and an array.

In Example C.60, the subject matter of any one of Examples C.57 to C.59 may include, wherein the set of properties for the data collection are selected from one or more of: a memory buffer that subsumes the data collection and that persists the properties of that data collection, a caller of the callee function, and a callee of the callee function.

In Example C.61, the subject matter of any one of Examples C.57 to C.60 may include, wherein the description of the properties associated with arguments for the callee function is received from an interface that is one or more of: part of a declaration of the callee function, a wrapper function around the callee function that adds descriptive parameters, and a function that registers properties of the callee function and the callee function's arguments.

In Example C.62, the subject matter of any one of Examples C.57 to C.61 may include, wherein the description of the properties associated with arguments for the callee function includes one or more of: descriptions that are applied to the callee function as a whole, and descriptions that are applied to individual parameters that serve as operands to the callee function.

In Example C.63, the subject matter of any one of Examples C.57 to C.62 may include, wherein the set of properties for the data collection are based on: the persistent representation of the data collection, the persistent representation of the callee function, and a data collection associated with an operand of a caller function.

In Example C.64, the subject matter of any one of Examples C.57 to C.63 may include, wherein the memory further stores instructions for causing the system to: determine whether the data collection is writeable; and based on the determination whether the data collection is writeable, determine an optimization including one or more of: executing a first action that refers to the data collection concurrently with a second action that only reads the data collection, and marking the data collection as modified to indicate the data collection is in need of being written back to memory and transferred to consumers of data from the data collection.

In Example C.65, the subject matter of any one of Examples C.57 to C.64 may include, wherein operands associated with the data collection are inferred to be read only in response to a declaration that the data collection is never writeable by one or more of: the description of properties associated with arguments for the callee function, the set of properties for the data collection, and properties specified by a caller function for an operand that corresponds to the data collection.

In Example C.66, the subject matter of any one of Examples C.57 to C.65 may include, wherein updating the properties of the data collection includes enforcing the properties of the data collection for a single use of the data collection.

In Example C.67, the subject matter of any one of Examples C.57 to C.66 may include, wherein updating the properties of the data collection is performed in response to a referencing of an operand associated with an action.

In Example C.68, the subject matter of any one of Examples C.57 to C.67 may include, wherein updating the properties of the data collection further includes tracking a series of updates to the data collection.

In Example C.69, the subject matter of any one of Examples C.57 to C.68 may include, wherein updating the properties of the data collection is performed in response to a request to modify the properties of the data collection received via the application programming interface, wherein properties classified as mutable are permitted to be updated, and properties classified as immutable, will produce an error, by the software component, in response to an attempt to update the immutable properties.

In Example C.70, the subject matter of any one of Examples C.57 to C.69 may include, wherein the memory further stores instructions for causing the system to: receive, by the software component via the application programming interface, a query regarding the properties of the data collection; and in response to the query, transmit the properties of the data collection via the application programming interface.

In Example C.71, the subject matter of any one of Examples C.57 to C.70 may include, wherein the memory further stores instructions for causing the system to: receive, by the software component via the application programming interface, a query regarding an operand associated with an action; and in response to the query, transmit information pertaining to the operand via the application programming interface.

In Example C.72, the subject matter of any one of Examples C.57 to C.71 may include, wherein the operand is associated with a computing task, and the information pertaining to the operand includes a total number of data collections associated with the computing task.

In Example C.73, the subject matter of any one of Examples C.57 to C.72 may include, wherein the operand is associated with a computing task, and the information pertaining to the operand provides data layout information that includes the number of dimensions, size, shape, arrangement, stride, regularity and sparsity of data collections specified by the operand.

In Example C.74, the subject matter of any one of Examples C.57 to C.73 may include, wherein the memory further stores instructions for causing the system to derive information regarding the data collection.

In Example C.75, the subject matter of any one of Examples C.57 to C.74 may include, wherein deriving information regarding the data collection includes generating a description for a plurality of data collections within the data collection.

In Example C.76, the subject matter of any one of Examples C.57 to C.75 may include, wherein information is derived for a first data collection and a second data collection, and wherein the information derived for the first data collection and the second data collection includes one of: a determination that the first and second data collections do not overlap, a determination that the first and second data collections match exactly, a determination that the first data collection subsumes the second data collection, and a determination that the first and second data collections partially overlap.

In Example C.77, the subject matter of any one of Examples C.57 to C.76 may include, wherein the set of properties for the data collection include one or more of: writeability of the data collection, whether local storage needs to be updated on a write, whether a partial result needs to be combined with other distributed operations, whether access is atomic, whether access requires strict ordering, a reference pattern, a hardware characteristic, a type of memory associated with the data collection, a memory allocation policy, a size of the data collection, and a state of the data collection.

In Example C.78, the subject matter of any one of Examples C.57 to C.77 may include, wherein the set of properties for the data collection includes a list of logical domains in which the data collection is instantiated.

In Example C.79, the subject matter of any one of Examples C.57 to C.78 may include, wherein the set of properties for the data collection describe a plurality of logical instances for the data collection mapped to a single physical memory space.

In Example C.80, the subject matter of any one of Examples C.57 to C.79 may include, wherein the set of properties for the data collection identify a logical instance from a plurality of logical instances for the data collection that contains a last-written version of data.

In Example C.81, the subject matter of any one of Examples C.57 to C.80 may include, wherein the set of properties for the data collection indicate whether a new instance of the data collection should be added in response to a logical domain being added.

In Example C.82, the subject matter of any one of Examples C.57 to C.81 may include, wherein the set of properties for the data collection identifies a software routine for handling non-contiguous data in the data collection.

In Example C.83, the subject matter of any one of Examples C.57 to C.82 may include, wherein creating the data collection includes pre-pinning a portion of memory in the data collection based on the instructions.

In Example C.84, the subject matter of any one of Examples C.57 to C.83 may include, wherein updating the properties of the data collection includes dynamically pinning a portion of memory in the data collection based on the instructions describing the set of properties for the data collection.

Example C.85 includes subject matter (such as a device, apparatus, or machine) comprising: means for receiving, via an application programming interface, instructions regarding a callee function that include a description of properties associated with arguments for the callee function; means for creating a persistent representation of the callee function based on the received description of the callee function; means for receiving, via the application programming interface, instructions from a source describing a set of properties for a data collection; means for creating a persistent representation of the data collection based on the set of properties for the data collection; means for receiving, via the application programming interface, an updated property for the data collection; and means for, in response to receiving the updated property for the data collection: updating the persistent representation of the callee function by associating the persistent representation of the callee function with the updated property of the data collection; and updating the persistent representation of the data collection by associating the persistent representation the data collection with the updated property of the data collection.

In Example C.86, the subject matter of Example C.85 may include, wherein the data collection is an operand of an action that includes one or more of: a computing task, a data transfer task, and a synchronization task.

In Example C.87, the subject matter of any one of Examples C.85 to C.86 may include, wherein the data collection includes one or more of: a variable, a buffer, and an array.

In Example C.88, the subject matter of any one of Examples C.85 to C.87 may include, wherein the set of properties for the data collection are selected from one or more of: a memory buffer that subsumes the data collection and that persists the properties of that data collection, a caller of the callee function, and a callee of the callee function.

In Example C.89, the subject matter of any one of Examples C.85 to C.88 may include, wherein the description of the properties associated with arguments for the callee function is received from an interface that is one or more of: part of a declaration of the callee function, a wrapper function around the callee function that adds descriptive parameters, and a function that registers properties of the callee function and the callee function's arguments.

In Example C.90, the subject matter of any one of Examples C.85 to C.89 may include, wherein the description of the properties associated with arguments for the callee function includes one or more of: descriptions that are applied to the callee function as a whole, and descriptions that are applied to individual parameters that serve as operands to the callee function.

In Example C.91, the subject matter of any one of Examples C.85 to C.90 may include, wherein the set of properties for the data collection are based on: the persistent representation of the data collection, the persistent representation of the callee function, and a data collection associated with an operand of a caller function.

In Example C.92, the subject matter of any one of Examples C.85 to C.91 may include, means for: determining whether the data collection is writeable; and based on the determination whether the data collection is writeable, determining an optimization including one or more of: executing a first action that refers to the data collection concurrently with a second action that only reads the data collection, and marking the data collection as modified to indicate the data collection is in need of being written back to memory and transferred to consumers of data from the data collection.

In Example C.93, the subject matter of any one of Examples C.85 to C.92 may include, wherein operands associated with the data collection are inferred to be read only in response to a declaration that the data collection is never writeable by one or more of: the description of properties associated with arguments for the callee function, the set of properties for the data collection, and properties specified by a caller function for an operand that corresponds to the data collection.

In Example C.94, the subject matter of any one of Examples C.85 to C.93 may include, wherein updating the properties of the data collection includes enforcing the properties of the data collection for a single use of the data collection.

In Example C.95, the subject matter of any one of Examples C.85 to C.94 may include, wherein updating the properties of the data collection is performed in response to a referencing of an operand associated with an action.

In Example C.96, the subject matter of any one of Examples C.85 to C.95 may include, wherein updating the properties of the data collection further includes tracking a series of updates to the data collection.

In Example C.97, the subject matter of any one of Examples C.85 to C.96 may include, wherein updating the properties of the data collection is performed in response to a request to modify the properties of the data collection received via the application programming interface, wherein properties classified as mutable are permitted to be updated, and properties classified as immutable, will produce an error in response to an attempt to update the immutable properties.

In Example C.98, the subject matter of any one of Examples C.85 to C.97 may include, means for: receiving, via the application programming interface, a query regarding the properties of the data collection; and in response to the query, transmitting the properties of the data collection via the application programming interface.

In Example C.99, the subject matter of any one of Examples C.85 to C.98 may include, means for: receiving, via the application programming interface, a query regarding an operand associated with an action; and in response to the query, transmitting information pertaining to the operand via the application programming interface.

In Example C.100, the subject matter of any one of Examples C.85 to C.99 may include, wherein the operand is associated with a computing task, and the information pertaining to the operand includes a total number of data collections associated with the computing task.

In Example C.101, the subject matter of any one of Examples C.85 to C.100 may include, wherein the operand is associated with a computing task, and the information pertaining to the operand provides data layout information that includes the number of dimensions, size, shape, arrangement, stride, regularity and sparsity of data collections specified by the operand.

In Example C.102, the subject matter of any one of Examples C.85 to C.101 may include, means for deriving information regarding the data collection.

In Example C.103, the subject matter of any one of Examples C.85 to C.102 may include, wherein deriving information regarding the data collection includes generating a description for a plurality of data collections within the data collection.

In Example C.104, the subject matter of any one of Examples C.85 to C.103 may include, wherein information is derived for a first data collection and a second data collection, and wherein the information derived for the first data collection and the second data collection includes one of: a determination that the first and second data collections do not overlap, a determination that the first and second data collections match exactly, a determination that the first data collection subsumes the second data collection, and a determination that the first and second data collections partially overlap.

In Example C.105, the subject matter of any one of Examples C.85 to C.104 may include, wherein the set of properties for the data collection include one or more of: writeability of the data collection, whether local storage needs to be updated on a write, whether a partial result needs to be combined with other distributed operations, whether access is atomic, whether access requires strict ordering, a reference pattern, a hardware characteristic, a type of memory associated with the data collection, a memory allocation policy, a size of the data collection, and a state of the data collection.

In Example C.106, the subject matter of any one of Examples C.85 to C.105 may include, wherein the set of properties for the data collection includes a list of logical domains in which the data collection is instantiated.

In Example C.107, the subject matter of any one of Examples C.85 to C.106 may include, wherein the set of properties for the data collection describe a plurality of logical instances for the data collection mapped to a single physical memory space.

In Example C.108, the subject matter of any one of Examples C.85 to C.107 may include, wherein the set of properties for the data collection identify a logical instance from a plurality of logical instances for the data collection that contains a last-written version of data.

In Example C.109, the subject matter of any one of Examples C.85 to C.108 may include, wherein the set of properties for the data collection indicate whether a new instance of the data collection should be added in response to a logical domain being added.

In Example C.110, the subject matter of any one of Examples C.85 to C.109 may include, wherein the set of properties for the data collection identifies a software routine for handling non-contiguous data in the data collection.

In Example C.111, the subject matter of any one of Examples C.85 to C.110 may include, wherein creating the data collection includes pre-pinning a portion of memory in the data collection based on the instructions.

In Example C.112, the subject matter of any one of Examples C.85 to C.111 may include, wherein updating the properties of the data collection includes dynamically pinning a portion of memory in the data collection based on the instructions describing the set of properties for the data collection.

Example C.113 includes at least one computer-readable medium storing instructions for causing a computer system to perform the method of any of the Examples C.29-C.56.

Example C.114 includes a system comprising means for performing the method of any of the Examples C.29-C.56.

Example D.1 includes subject matter (such as a device, apparatus, or machine) comprising: a processor; and memory coupled to the processor and storing instructions that, when executed by the processor, cause the system to: receive, by a software component operating on the system, a description of a first set of data elements referenced in a first operand; receive, by the software component, a description of a second set of data elements referenced in a second operand; select, by the software component, a set of subsets of data elements that are included in both the first set of data elements and the second set of data elements, wherein selecting the set of subsets of data elements includes optimizing a size of the set of subsets of data elements; provide, by the software component via an application programming interface, the set of subsets of data elements; and in response to a reference by the second operand that modifies the set of subsets of data elements, provide, by the software component via the application programming interface, a respective mapping from each previous subset in the set of subsets to a respective new collection of subsets in the set of subsets.

In Example D.2, the subject matter of Example D.1 may include, wherein the memory further stores instructions for providing information regarding the set of subsets of data elements in response to a query.

In Example D.3, the subject matter of any one of Examples D.1 to D.2 may include, wherein the first operand comprises a first data collection of data elements, and wherein the second operand comprises a second data collection of data elements which is a proper subset of the first data collection.

In Example D.4, the subject matter of any one of Examples D.1 to D.3 may include, wherein one or more of the first data collection and the second data collection includes one or more of: a variable, an array, and a memory buffer.

In Example D.5, the subject matter of any one of Examples D.1 to D.4 may include, wherein one or more of the first data collection and the second data collection includes one or more of the following characteristics: multiple dimensions, strided data, blocked data, sparse data that is block-dense, sparse data that is regular and describable with linear functions, and irregular matrices.

In Example D.6, the subject matter of any one of Examples D.1 to D.5 may include, wherein the first operand comprises a first data collection of data elements, and the second operand comprises a second data collection of memory elements, and an intersection of the first and second data collections is neither empty, nor equal to, both the first and second data collection.

In Example D.7, the subject matter of any one of Examples D.1 to D.6 may include, wherein the memory further stores instructions for causing the system to identify a property associated with the set of subsets of data elements.

In Example D.8, the subject matter of any one of Examples D.1 to D.7 may include, wherein the property identifies data that is modified.

In Example D.9, the subject matter of any one of Examples D.1 to D.8 may include, wherein the property identifies data that is read-only.

In Example D.10, the subject matter of any one of Examples D.1 to D.9 may include, wherein the memory further stores instructions for causing the system to: receive, by the software component, an input operand; generate, by the software component, a set of subsets of data elements associated with the operand; and enforce dependences on the set of subsets that comprise the operand, wherein the dependencies are enforced based on partially-overlapping operands in an action and operands of different granularity in an action.

In Example D.11, the subject matter of any one of Examples D.1 to D.10 may include, wherein a set of mappings is provided from each previous subset in the set of subsets to each respective new subset in the set of subsets in response to a change in the set of subsets of data elements for the input operand, and wherein a representation of the dependencies is updated to reflect the new set of subsets.

Example D.12 includes subject matter (such as a method, means for performing acts, machine readable medium including instructions that when performed by a machine cause the machine to performs acts, or an apparatus to perform) comprising: receiving, by a software component operating on a computer system, a description of a first set of data elements referenced in a first operand; receiving, by the software component, a description of a second set of data elements referenced in a second operand; selecting, by the software component, a set of subsets of data elements that are included in both the first set of data elements and the second set of data elements, wherein selecting the set of subsets of data elements includes optimizing a size of the set of subsets of data elements; providing, by the software component via an application programming interface, the set of subsets of data elements; and in response to a reference by the second operand that modifies the set of subsets of data elements, providing, by the software component via the application programming interface, a respective mapping from each previous subset in the set of subsets to a respective new collection of subsets in the set of subsets.

In Example D.13, the subject matter of Example D.12 may include, providing information regarding the set of subsets of data elements in response to a query.

In Example D.14, the subject matter of any one of Examples D.12 to D.13 may include, wherein the first operand comprises a first data collection of data elements, and wherein the second operand comprises a second data collection of data elements which is a proper subset of the first data collection.

In Example D.15, the subject matter of any one of Examples D.12 to D.14 may include, wherein one or more of the first data collection and the second data collection includes one or more of: a variable, an array, and a memory buffer.

In Example D.16, the subject matter of any one of Examples D.12 to D.15 may include, wherein one or more of the first data collection and the second data collection includes one or more of the following characteristics: multiple dimensions, strided data, blocked data, sparse data that is block-dense, sparse data that is regular and describable with linear functions, and irregular matrices.

In Example D.17, the subject matter of any one of Examples D.12 to D.16 may include, wherein the first operand comprises a first data collection of data elements, and the second operand comprises a second data collection of memory elements, and an intersection of the first and second data collections is neither empty, nor equal to, both the first and second data collection.

In Example D.18, the subject matter of any one of Examples D.12 to D.17 may include, identifying a property associated with the set of subsets of data elements.

In Example D.19, the subject matter of any one of Examples D.12 to D.18 may include, wherein the property identifies data that is modified.

In Example D.20, the subject matter of any one of Examples D.12 to D.19 may include, wherein the property identifies data that is read-only.

In Example D.21, the subject matter of any one of Examples D.12 to D.20 may include, receiving, by the software component, an input operand; generating, by the software component, a set of subsets of data elements associated with the operand; and enforcing dependences on the set of subsets that comprise the operand, wherein the dependencies are enforced based on partially-overlapping operands in an action and operands of different granularity in an action.

In Example D.22, the subject matter of any one of Examples D.12 to D.21 may include, wherein a set of mappings is provided from each previous subset in the set of subsets to each respective new subset in the set of subsets in response to a change in the set of subsets of data elements for the input operand, and wherein a representation of the dependencies is updated to reflect the new set of subsets.

Example D.23 includes subject matter including a computer-readable medium storing instructions that, when executed by a computer system, cause the computer system to: receive, by a software component operating on the computer system, a description of a first set of data elements referenced in a first operand; receive, by the software component, a description of a second set of data elements referenced in a second operand; select, by the software component, a set of subsets of data elements that are included in both the first set of data elements and the second set of data elements, wherein selecting the set of subsets of data elements includes optimizing a size of the set of subsets of data elements; provide, by the software component via an application programming interface, the set of subsets of data elements; and in response to a reference by the second operand that modifies the set of subsets of data elements, provide, by the software component via the application programming interface, a respective mapping from each previous subset in the set of subsets to a respective new collection of subsets in the set of subsets.

In Example D.24, the subject matter of Example D.23 may include, wherein the medium further stores instructions for providing information regarding the set of subsets of data elements in response to a query.

In Example D.25, the subject matter of any one of Examples D.23 to D.24 may include, wherein the first operand comprises a first data collection of data elements, and wherein the second operand comprises a second data collection of data elements which is a proper subset of the first data collection.

In Example D.26, the subject matter of any one of Examples D.23 to D.25 may include, wherein one or more of the first data collection and the second data collection includes one or more of: a variable, an array, and a memory buffer.

In Example D.27, the subject matter of any one of Examples D.23 to D.26 may include, wherein one or more of the first data collection and the second data collection includes one or more of the following characteristics: multiple dimensions, strided data, blocked data, sparse data that is block-dense, sparse data that is regular and describable with linear functions, and irregular matrices.

In Example D.28, the subject matter of any one of Examples D.23 to D.27 may include, wherein the first operand comprises a first data collection of data elements, and the second operand comprises a second data collection of memory elements, and an intersection of the first and second data collections is neither empty, nor equal to, both the first and second data collection.

In Example D.29, the subject matter of any one of Examples D.23 to D.28 may include, wherein the medium further stores instructions for causing the computer system to identify a property associated with the set of subsets of data elements.

In Example D.30, the subject matter of any one of Examples D.23 to D.29 may include, wherein the property identifies data that is modified.

In Example D.31, the subject matter of any one of Examples D.23 to D.30 may include, wherein the property identifies data that is read-only.

In Example D.32, the subject matter of any one of Examples D.23 to D.31 may include, wherein the medium further stores instructions for causing the computer system to: receive, by the software component, an input operand; generate, by the software component, a set of subsets of data elements associated with the operand; and enforce dependences on the set of subsets that comprise the operand, wherein the dependencies are enforced based on partially-overlapping operands in an action and operands of different granularity in an action.

In Example D.33, the subject matter of any one of Examples D.23 to D.32 may include, wherein a set of mappings is provided from each previous subset in the set of subsets to each respective new subset in the set of subsets in response to a change in the set of subsets of data elements for the input operand, and wherein a representation of the dependencies is updated to reflect the new set of subsets.

Example D.34 includes subject matter (such as a device, apparatus, or machine) comprising: means receiving a description of a first set of data elements referenced in a first operand; means for receiving a description of a second set of data elements referenced in a second operand; means for selecting a set of subsets of data elements that are included in both the first set of data elements and the second set of data elements, wherein selecting the set of subsets of data elements includes optimizing a size of the set of subsets of data elements; means for providing, via an application programming interface, the set of subsets of data elements; and means for providing, in response to a reference by the second operand that modifies the set of subsets of data elements, via the application programming interface, a respective mapping from each previous subset in the set of subsets to a respective new collection of subsets in the set of subsets.

In Example D.35, the subject matter of Example D.34 may include, means for providing information regarding the set of subsets of data elements in response to a query.

In Example D.36, the subject matter of any one of Examples D.34 to D.35 may include, wherein the first operand comprises a first data collection of data elements, and wherein the second operand comprises a second data collection of data elements which is a proper subset of the first data collection.

In Example D.37, the subject matter of any one of Examples D.34 to D.36 may include, wherein one or more of the first data collection and the second data collection includes one or more of: a variable, an array, and a memory buffer.

In Example D.38, the subject matter of any one of Examples D.34 to D.37 may include, wherein one or more of the first data collection and the second data collection includes one or more of the following characteristics: multiple dimensions, strided data, blocked data, sparse data that is block-dense, sparse data that is regular and describable with linear functions, and irregular matrices.

In Example D.39, the subject matter of any one of Examples D.34 to D.38 may include, wherein the first operand comprises a first data collection of data elements, and the second operand comprises a second data collection of memory elements, and an intersection of the first and second data collections is neither empty, nor equal to, both the first and second data collection.

In Example D.40, the subject matter of any one of Examples D.34 to D.39 may include, means for causing the system to identify a property associated with the set of subsets of data elements.

In Example D.41, the subject matter of any one of Examples D.34 to D.40 may include, wherein the property identifies data that is modified.

In Example D.42, the subject matter of any one of Examples D.34 to D.41 may include, wherein the property identifies data that is read-only.

In Example D.43, the subject matter of any one of Examples D.34 to D.42 may include, means for: receiving an input operand; generating, a set of subsets of data elements associated with the operand; and enforcing dependences on the set of subsets that comprise the operand, wherein the dependencies are enforced based on partially-overlapping operands in an action and operands of different granularity in an action.

In Example D.44, the subject matter of any one of Examples D.34 to D.43 may include, wherein a set of mappings is provided from each previous subset in the set of subsets to each respective new subset in the set of subsets in response to a change in the set of subsets of data elements for the input operand, and wherein a representation of the dependencies is updated to reflect the new set of subsets.

Example D.45 includes at least one computer-readable medium storing instructions for causing a computer system to perform the method of any of the Examples D.12-D.22.

Example D.46 includes a system comprising means for performing the method of any of the Examples D.12-D.22.

Each of these non-limiting examples can stand on its own, or can be combined with one or more of the other examples in any permutation or combination.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are legally entitled.

What is claimed is:

1. A system for managing task concurrency on computer platforms, the system comprising:
   a processor; and
   memory coupled to the processor and storing instructions that, when executed by the processor, cause the system to:
   receive, by a software component operating on the system, an updated property for a data collection; and
   in response to receiving the updated property for the data collection:

update a persistent representation of a callee function, by the software component, by associating the persistent representation of the callee function with the updated property of the data collection; and update a persistent representation of the data collection, by the software component, by associating the persistent representation the data collection with the updated property of the data collection, wherein instructions regarding the callee function include a description of properties associated with arguments for the callee function, the description of properties associated with arguments for the callee function used to create the persistent representation of the callee function, and wherein instructions from a source describe a set of properties for the data collection, the set of properties used to create the persistent representation of the data collection.

2. The system of claim 1, wherein the data collection includes one or more of: a variable, a buffer, and an array.

3. The system of claim 1, wherein updating the properties of the data collection includes enforcing the properties of the data collection for a single use of the data collection.

4. The system of claim 1, wherein updating the properties of the data collection is performed in response to a referencing of an operand associated with an action.

5. The system of claim 1, wherein updating the properties of the data collection further includes tracking a series of updates to the data collection.

6. The system of claim 1, wherein updating the properties of the data collection is performed in response to a request to modify the properties of the data collection received, wherein properties classified as mutable are permitted to be updated, and properties classified as immutable, will produce an error, by the software component, in response to an attempt, to update the immutable properties.

7. The system of claim 1, wherein the memory further stores instructions for causing the system to:

receive, by the software component, a query regarding the properties of the data collection; and in response to the query, transmit the properties of the data collection.

8. The system of claim 1, wherein the memory further stores instructions for causing the system to:

receive, by the software component, a query regarding an operand associated with an action; and in response to the query, transmit information pertaining to the operand.

9. The system of claim 8, wherein the operand is associated with a computing task, and the information pertaining to the operand includes a total number of data collections associated with the computing task.

10. The system of claim 8, wherein the operand is associated with a computing task, and the information pertaining to the operand provides data layout information that includes the number of dimensions, size, shape, arrangement, stride, regularity and sparsity of data collections specified by the operand.

11. The system of claim 1, wherein the memory further stores instructions for causing the system to derive information regarding the data collection.

12. The system of claim 11, wherein deriving information regarding the data collection includes generating a description for a plurality of data collections within the data collection.

13. The system of claim 11, wherein information is derived for a first data collection and a second data collection, and wherein the information derived for the first data collection and, the second data collection includes one of: a determination that the first and second data collections do not overlap, a determination that the first and second data collections match exactly, a determination that the first data collection subsumes the second data collection, and a determination that the first and second data collections partially overlap.

14. The system of claim 1, wherein the set of properties for the data collection include one or more of: writeability of the data collection, whether local storage needs to be updated on a write, whether a partial result needs to be combined with other distributed operations, whether access is atomic, whether access requires strict ordering, a reference pattern, a hardware characteristic, a type of memory associated with the data collection, a memory allocation policy, a size of the data collection and a state of the data collection.

15. The system of claim 1, wherein the set of properties for the data collection includes a list of logical domains in which the data collection is instantiated.

16. The system of claim 1, wherein the set of properties for the data collection describe a plurality of logical instances for the data collection mapped to a single physical memory space.

17. The system of claim 1, wherein the set of properties for the data collection identify a logical instance from a plurality of logical instances for the data collection that contains a last-written version of data.

18. The system of claim 1, wherein the set of properties for the data collection indicate whether a new instance of the data collection should be added in response to a logical domain being added.

19. The system of claim 1, wherein the set of properties for the data collection identifies a software routine for handling non-contiguous data in the data collection.

20. The system of claim 1, wherein creating the data collection includes pre-pinning a portion of memory in the data collection based on the instructions.

21. The system of claim 1, wherein updating the properties of the data collection includes dynamically pinning a portion of memory in the data collection based on the instructions describing the set of properties for the data collection.

22. A method of managing task concurrency on computer platforms, the method comprising:

receiving, by a software component operating on a computer system, an updated property for a data collection; and in response to receiving the updated property for the data collection:

updating a persistent representation of a callee function, by the software component, by associating the persistent representation of the callee function with the updated property of the data collection; and updating a persistent representation of the data collection, by the software component, by associating the persistent representation the data collection with the updated property of the data collection, wherein instructions regarding the callee function include a description of properties associated with arguments for the callee function, the description of properties associated with arguments for the callee function used to create the persistent representation of the callee function, and wherein instructions from a source describe a set of properties for the data collection, the set of properties used to create the persistent representation of the data collection.

23. The method of claim 22, further comprising:

receiving, by the software component, a query regarding an operand associated with an action; and in response to the query, transmitting information pertaining to the operand.

24. The method of claim 23, wherein the operand is associated with a computing task, and the information pertaining to the operand includes a total number of data collections associated with the computing task.

25. The method of claim 23, wherein the operand is associated with a computing task, and the information pertaining to the operand provides data layout information that includes the number of dimensions, size, shape, arrangement, stride, regularity and sparsity of data collections specified by the operand.

* * * * *

UNITED STATES PATENT AND TRADEMARK OFFICE
CERTIFICATE OF CORRECTION

PATENT NO. : 10,977,093 B2
APPLICATION NO. : 16/554072
DATED : April 13, 2021
INVENTOR(S) : Chris Newburn It is certified that error appears in the above-identified patent and that said Letters Patent is hereby corrected as shown below:

In the Claims

In Column 75, Line 36, in Claim 6, delete "attempt," and insert --attempt-- therefor In Column 76, Line 2, in Claim 13, delete "and," and insert --and-- therefor In Column 76, Line 17, in Claim 14, after "collection", insert --,--

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*